United States Patent
Zhang et al.

(10) Patent No.: US 11,671,602 B2
(45) Date of Patent: Jun. 6, 2023

(54) SIGNALING FOR REFERENCE PICTURE RESAMPLING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/519,365

(22) Filed: Nov. 4, 2021

(65) Prior Publication Data

US 2022/0060712 A1    Feb. 24, 2022

Related U.S. Application Data

(63) Continuation of application No. PCT/CN2020/089740, filed on May 12, 2020.

(30) Foreign Application Priority Data

May 12, 2019    (WO) ................ PCT/CN2019/086513

(51) Int. Cl.
*H04N 19/132*    (2014.01)
*H04N 19/159*    (2014.01)
(Continued)

(52) U.S. Cl.
CPC ......... *H04N 19/132* (2014.11); *H04N 19/159* (2014.11); *H04N 19/172* (2014.11); *H04N 19/196* (2014.11); *H04N 19/70* (2014.11)

(58) Field of Classification Search
CPC .......................... H04N 19/105; H04N 19/172
See application file for complete search history.

(56) References Cited

U.S. PATENT DOCUMENTS 9,509,999 B2    11/2016    Seregin et al.
9,992,493 B2    6/2018    Chen et al.
(Continued)

FOREIGN PATENT DOCUMENTS

| CN | 106464891 A | 2/2017 |
|----|-------------|--------|
| CN | 107925772 A | 4/2018 |
| JP | 2013058873 A | 3/2013 |

OTHER PUBLICATIONS

Chen et al. ("AHG 19: Adaptive Resolution Change," (JVET-N0279) Joint Video Experts Team (JVET) of ITU-T SG 16 WP 3 and ISO/IEC JTC 1/SC 29/WG 11, 14th Meeting: Geneva, CH, Mar. 19-27, 2019.*

(Continued)

*Primary Examiner* — Fabio S Lima
(74) *Attorney, Agent, or Firm* — Perkins Coie LLP

(57) ABSTRACT

Devices, systems and methods for digital video coding, which includes reference picture resampling, are described. An example method for video processing includes performing a conversion between a video comprising one or more video segments comprising one or more video units and a bitstream representation of the video, wherein the bitstream representation conforms to a format rule and comprises information related to an adaptive resolution conversion (ARC) process, wherein the format rule specifies the applicability of the ARC process to a video segment, wherein an indication that the one or more video units of the video segment are coded with different resolutions is included in the bitstream representation in a syntax structure that is different from a header syntax structure, a decoder parameter (Continued)

set, a video parameter set, a picture parameter set, a sequence parameter set, and an adaptation parameter set.

20 Claims, 34 Drawing Sheets

(51) Int. Cl.
    *H04N 19/172*  (2014.01)
    *H04N 19/196*  (2014.01)
    *H04N 19/70*   (2014.01)

(56) References Cited

U.S. PATENT DOCUMENTS

| | | | |
|---|---|---|---|
| 2007/0280350 A1* | 12/2007 | Mathew | H04N 19/187 |
| | | | 375/240.03 |
| 2016/0100189 A1 | 4/2016 | Pang et al. | |
| 2016/0234516 A1* | 8/2016 | Hendry | H04N 21/23439 |
| 2016/0255350 A1* | 9/2016 | Kang | H04N 19/436 |
| | | | 375/240.02 |
| 2016/0373771 A1* | 12/2016 | Hendry | H04N 19/70 |
| 2017/0310961 A1 | 10/2017 | Liu et al. | |
| 2019/0158885 A1* | 5/2019 | Mora | H04N 19/117 |
| 2019/0200023 A1* | 6/2019 | Hanhart | H04N 19/503 |
| 2020/0177922 A1* | 6/2020 | Chujoh | H04N 19/85 |
| 2020/0213618 A1* | 7/2020 | Sun | H04N 19/105 |
| 2020/0374547 A1* | 11/2020 | Gao | H04N 19/513 |
| 2021/0084291 A1* | 3/2021 | Chang | H04N 19/109 |
| 2021/0136399 A1* | 5/2021 | Li | H04N 19/70 |

OTHER PUBLICATIONS

Wenger et al. ("[AHG19] On Signaling of Adaptive Resolution Change, "(JVET-N0052) Joint Video Experts Team (JVET) of ITU-T SG 16 WP 3 and ISO/IEC JTC 1/SC 29/WG 11 14th Meeting: Geneva, CH, Mar. 19-27, 2019.*
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-31001, 2017.
Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0632, 2018.
Davies, Thomas. "Resolution Switching for Coding Efficiency and Resilience," Joint Collaborative Team on Video Coding (JCT-VC) of ITU-T SG16 WP3 and ISO/IEC JTC1/SC29/WG11 6th Meeting: Turin, IT, Jul. 14-22, 2011, document JCTVC-F158, 2011.
Davies, Thomas. "AHG18: Design Considerations for Adaptive Resolution Coding (ARC)," Joint Collaborative Team on Video Coding (JCT-VC) of ITU-T SG16 WP3 and ISO/IEC JTC1/SC29/WG11 8th Meeting: San José, CA, USA, Feb. 1-10, 2012, document JCTVC-H0234, 2012.
Han et al. "CE4.1.3: Affine Motion Compensation Prediction," Joint Video Exploration Team (JVET) of ITU-T SG 16 WP 3 and ISO/IEC JTC 1/SC 29/WG 11 11th Meeting: Ljubljana, SI, Jul. 10-18, 2018, document JVET-K0337, 2018.
Hannuksela et al. "Use Cases and Proposed Design Choices for Adaptive Resolution Changing (ARC)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0259, 2019.
Hannuksela et al. "AHG12: On Grouping of Tiles," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0261, 2019.
Hannuksela et al. "AHG12: Sub-Picture Layers for Realizing Independently Coded Picture Regions," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0045, 2019.
Hannuksela et al. "AHG19: On Adaptive Resolution Changing," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0048, 2019.
Hendry et al. "On Adaptive Resolution Change (ARC) for VVC," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0135, 2019.
Hendry et al. "AHG19: Adaptive Resolution Change (ARC) Support in VVC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0118, 2019.
Hu et al. "CE5: Coding Tree Block Based Adaptive Loop Filter (CE5-4)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0415, 2019.
"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.
Lee et al. "CE4: Simplification of the Common Base for Affine Merge (Test 4.2.6)," Joint Video Experts Team (JVET) of ITU-T SG 16 WP 3 and ISO/IEC JTC 1/SC 29/WG 11 12th Meeting: Macau, CN, Oct. 8-12, 2018, document JVET-L0142, 2018.
Lee et al. "Cross-Check of JCTVC-L0279 on Motion Data Compression," Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013, document JCTVC-L0368, 2013.
Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, document JCTVC-Y1002, 2016.
JEM-7.0: https://jvet.hhi.fraunhofer.de/svn/svn_HMJEMSoftware/tags/ HM-16.6-JEM-7.0.
International Search Report and Written Opinion from International Patent Application No. PCT/CN2020/089740 dated Jul. 29, 2020 (10 pages).
International Search Report and Written Opinion from International Patent Application No. PCT/CN2020/089741 dated Jul. 30, 2020 (11 pages).

* cited by examiner

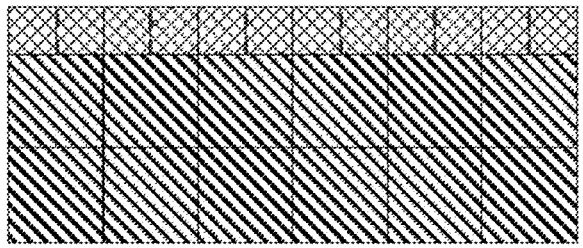
FIG. 6C
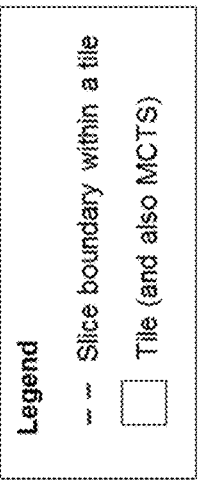
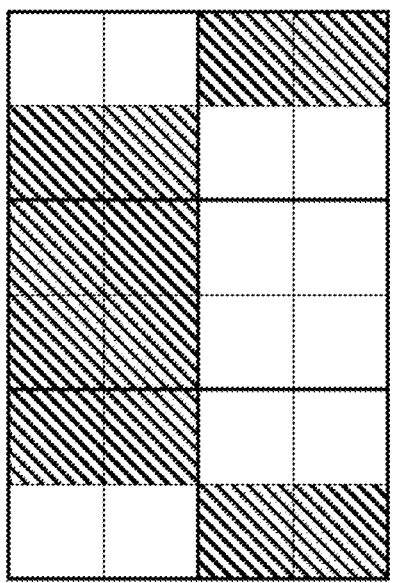
FIG. 6B
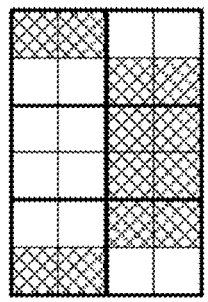
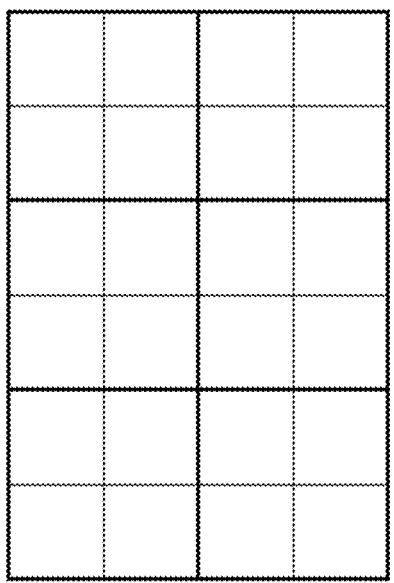
FIG. 6A
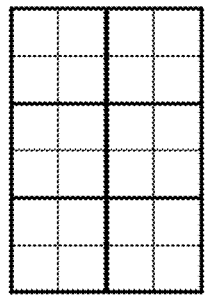

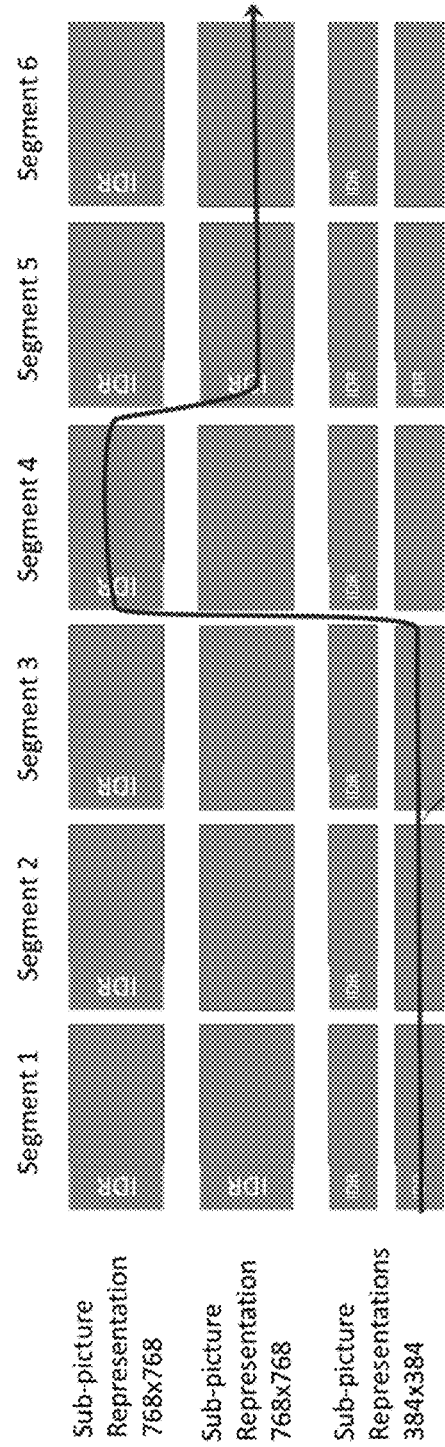

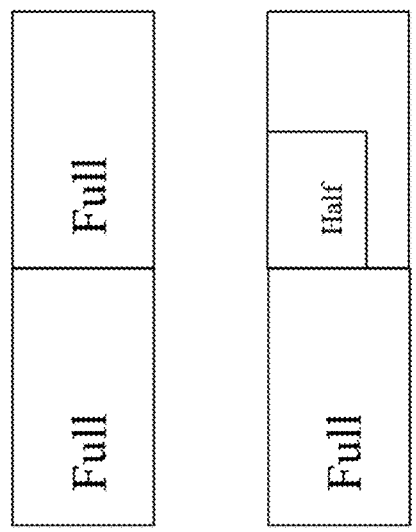
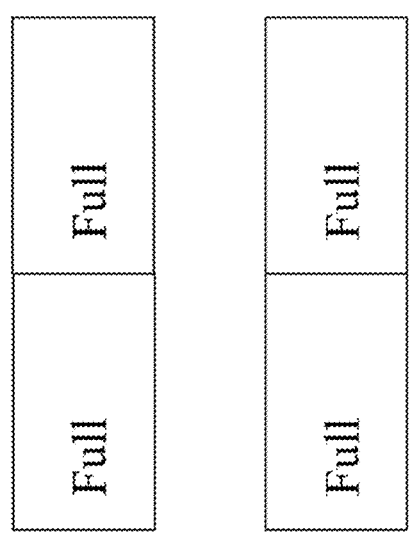
FIG. 13

2410

2412 — Determining that (a) a resolution of a first reference picture of a first temporally neighboring block of a current video block of a video is identical to a resolution of a current picture comprising the current video block, and (b) a resolution of a second reference picture of a second temporally neighboring block of the current video block is different from the resolution of the current picture 2414 — Performing a conversion between the current video block and a bitstream representation of the video by disabling, due to the determining, use of motion information of the second temporally neighboring block in a prediction of the first temporally neighboring block

┌─────────────────────────────────────────┐  2422
│ Determining that (a) a resolution of a first reference picture of a first │
│ temporally neighboring block of a current video block of a video is different │
│ from a resolution of a current picture comprising the current video block, and │
│ (b) a resolution of a second reference picture of a second temporally │
│ neighboring block of the current video block is identical to the resolution of │
│                    the current picture                    │
└─────────────────────────────────────────┘
                     │
┌─────────────────────────────────────────┐  2424
│ Performing a conversion between the current video block and a bitstream │
│ representation of the video by disabling, due to the determining, use of │
│ motion information of the second temporally neighboring block in a │
│        prediction of the first temporally neighboring block         │
└─────────────────────────────────────────┘
```

FIG. 24C

```
                    ┌─ 2450
                    │
┌─────────────────────────────────────┐  ┌─ 2452
│ Identifying, for a prediction of a current video block of a video, a collocated
│ block based on a determination that a dimension of a collocated reference
│ picture comprising the collocated block is identical to a dimension of a
│ current picture comprising the current video block
└─────────────────────────────────────┘

┌─────────────────────────────────────┐  ┌─ 2454
│ Performing, using the collocated block, a conversion between the current
│ video block and a bitstream representation of the video
└─────────────────────────────────────┘
```

FIG. 24F

… # SIGNALING FOR REFERENCE PICTURE RESAMPLING

CROSS-REFERENCE TO RELATED APPLICATION

This application is a continuation of International Application No. PCT/CN2020/089740, filed on May 12, 2020, which claims the priority to and benefits of International Patent Application No. PCT/CN2019/086513 filed on May 12, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to reference picture resampling for video coding. The described methods may be applied to both the existing video coding standards (e.g., High Efficiency Video Coding (HEVC)) and future video coding standards or video codecs.

In one representative aspect, the disclosed technology may be used to provide a method for video processing. This method includes performing a conversion between a video comprising one or more video segments comprising one or more video units and a bitstream representation of the video, wherein the bitstream representation conforms to a format rule and comprises information related to an adaptive resolution conversion (ARC) process, wherein the format rule specifies the applicability of the ARC process to a video segment, wherein an indication that the one or more video units of the video segment are coded with different resolutions is included in the bitstream representation in a syntax structure that is different from a header syntax structure, a decoder parameter set (DPS), a video parameter set (VPS), a picture parameter set (PPS), a sequence parameter set (SPS) and an adaptation parameter set (APS).

In another representative aspect, the disclosed technology may be used to provide a method for video processing. This method includes performing a conversion between a video comprising one or more video segments comprising one or more video units and a bitstream representation of the video, wherein the bitstream representation conforms to a format rule and comprises information related to an adaptive resolution conversion (ARC) process, wherein a dimension of the one or more video units that is coded with an exponential-Golomb code of order K is signaled in the bitstream representation, wherein K is a positive integer, wherein the format rule specifies the applicability of the ARC process to a video segment, and wherein an indication that the one or more video units of the video segment are coded with different resolutions is included in the bitstream representation in a syntax structure.

In yet another representative aspect, the disclosed technology may be used to provide a method for video processing. This method includes performing a conversion between a video comprising one or more video segments comprising one or more video units and a bitstream representation of the video, wherein the bitstream representation conforms to a format rule and comprises information related to an adaptive resolution conversion (ARC) process, wherein a height (H) and a width (W) are signaled in the bitstream representation, wherein H and W are positive integers and are constrained, wherein the format rule specifies the applicability of an adaptive resolution conversion (ARC) process to a video segment, and wherein an indication that the one or more video units of the video segment are coded with different resolutions is included in the bitstream representation in a syntax structure.

In yet another representative aspect, the disclosed technology may be used to provide a method for video processing. This method includes determining that (a) a resolution of a first reference picture of a first temporally neighboring block of a current video block of a video is identical to a resolution of a current picture comprising the current video block, and (b) a resolution of a second reference picture of a second temporally neighboring block of the current video block is different from the resolution of the current picture, and performing a conversion between the current video block and a bitstream representation of the video by disabling, due to the determining, use of motion information of the second temporally neighboring block in a prediction of the first temporally neighboring block.

In yet another representative aspect, the disclosed technology may be used to provide a method for video processing. This method includes determining that (a) a resolution of a first reference picture of a first temporally neighboring block of a current video block of a video is different from a resolution of a current picture comprising the current video block, and (b) a resolution of a second reference picture of a second temporally neighboring block of the current video block is identical to the resolution of the current picture, and performing a conversion between the current video block and a bitstream representation of the video by disabling, due to the determining, use of motion information of the second temporally neighboring block in a prediction of the first temporally neighboring block.

In yet another representative aspect, the disclosed technology may be used to provide a method for video processing. This method includes determining, for a current video block of a video, that a resolution of a reference picture comprising a video block associated with the current video block is different from a resolution of a current picture comprising the current video block, and performing a conversion between the current video block and a bitstream representation of the video by disabling, due to the determining, a prediction process based on the video block in the reference picture.

In yet another representative aspect, the disclosed technology may be used to provide a method for video processing. This method includes making a decision, based on at least one dimension of a picture, regarding whether the picture is permitted to be used as a collocated reference picture for a current video block of a current picture, and performing, based on the decision, a conversion between the current video block of a video and a bitstream representation of the video.

In yet another representative aspect, the disclosed technology may be used to provide a method for video processing. This method includes identifying, for a prediction of a current video block of a video, a collocated block based on a determination that a dimension of a collocated reference picture comprising the collocated block is identical to a dimension of a current picture comprising the current video block, and performing, using the collocated block, a conversion between the current video block and a bitstream representation of the video.

In yet another representative aspect, the disclosed technology may be used to provide a method for video processing. This method includes determining, for a current video block of a video, that a reference picture associated with the current video block has a resolution different from a resolution of a current picture comprising the current video block, performing, as part of a conversion between the current video block and a bitstream representation of the video, an up-sampling operation or a down-sampling operation on one or more reference samples of the reference picture, and motion information for the current video block or coding information for the current video block.

In yet another representative aspect, the disclosed technology may be used to provide a method for video processing. This method includes determining, for a conversion between a current video block of a video and a bitstream representation of the video, that a height or a width of a current picture comprising the current video block is different from a height or a width of a collocated reference picture associated with the current video block, and performing, based on the determining, an up-sampling operation or a down-sampling operation on a buffer storing one or more motion vectors of the collocated reference picture.

In yet another representative aspect, the disclosed technology may be used to provide a method for video processing. This method includes deriving, based on a dimension of a current picture comprising a current video block of a video and a dimension of a collocated picture associated with the current video block, an information for an alternative temporal motion vector prediction (ATMVP) process applied to the current video block, and performing, using the temporal motion vector, a conversion between the current video block and a bitstream representation of the video.

In yet another representative aspect, the disclosed technology may be used to provide a method for video processing. This method includes configuring, for an application of an adaptive resolution conversion (ARC) process to a current video block of a video, a bitstream representation of the video, wherein information related to the ARC process is signaled in the bitstream representation, wherein a current picture comprising the current video block has a first resolution, and wherein the ARC process comprises resampling a portion of the current video block at a second resolution different from the first resolution, and performing, based on the configuring, a conversion between the current video block and the bitstream representation of the current video block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 6A-6C show examples of motion-constrained tile set (MCTS)-based region-wise mixed-resolution (RWMR) viewport-dependent 360 streaming.

FIG. 7 shows an example of collocated sub-picture representations of different intra random access point (IRAP) intervals and different sizes.

FIG. 8 shows an example of segments received when a viewing orientation change causes a resolution change at the start of a segment.

FIG. 13 shows an example of tile group based resampling for ARC.

FIGS. 24A-24J show flowcharts of example methods for video processing.

DETAILED DESCRIPTION

Figures 1, 2:
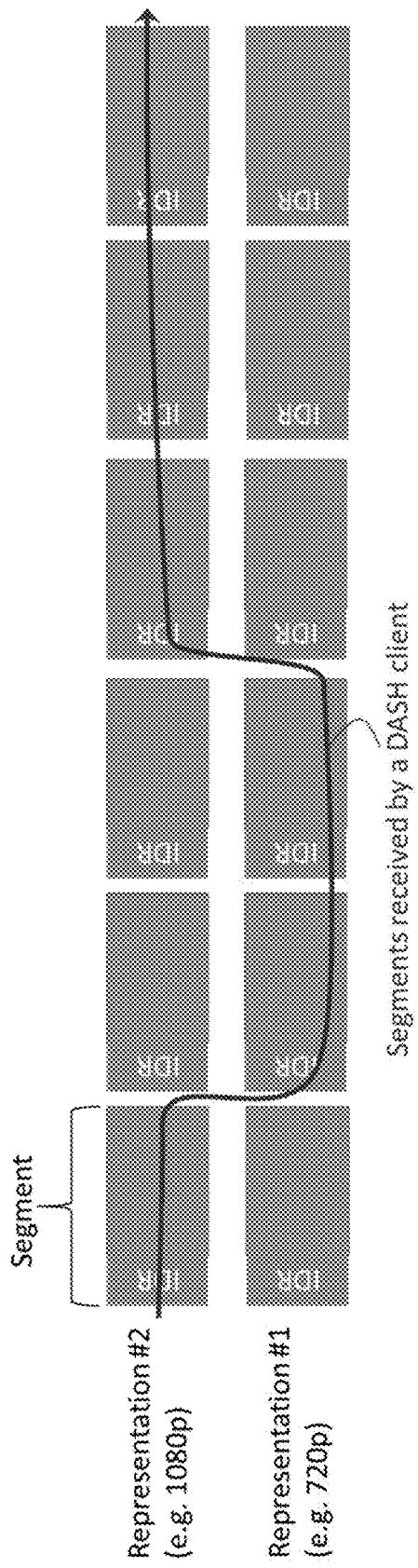
FIG. 1 shows an example of adaptive stream of two representations of the same content coded at different resolutions.
FIG. 2 shows another example of adaptive stream of two representations of the same content coded at different resolutions, where segments use either closed Group of Pictures (GOP) or open GOP prediction structures.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Video Coding Introduction

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

AVC and HEVC does not have the ability to change resolution without having to introduce an IDR or intra random access point (IRAP) picture; such ability can be referred to as adaptive resolution change (ARC). There are use cases or application scenarios that would benefit from an ARC feature, including the following:

Rate adaption in video telephony and conferencing: For adapting the coded video to the changing network conditions, when the network condition gets worse so that available bandwidth becomes lower, the encoder may adapt to it by encoding smaller resolution pictures. Currently, changing picture resolution can be done only after an IRAP picture; this has several issues. An TRAP picture at reasonable quality will be much larger than an inter-coded picture and will be correspondingly more complex to decode: this costs time and resource. This is a problem if the resolution change is requested by the decoder for loading reasons. It can also break low-latency buffer conditions, forcing an audio re-sync, and the end-to-end delay of the stream will increase, at least temporarily. This can give a poor user experience.

Active speaker changes in multi-party video conferencing: For multi-party video conferencing, it is common that the active speaker is shown in bigger video size than the video for the rest of conference participants. When the active speaker changes, picture resolution for each participant may also need to be adjusted. The need to have ARC feature becomes more important when such change in active speaker happens frequently.

Fast start in streaming: For streaming application, it is common that the application would buffer up to certain length of decoded picture before start displaying. Starting the bitstream with smaller resolution would allow the application to have enough pictures in the buffer to start displaying faster.

Adaptive stream switching in streaming: The Dynamic Adaptive Streaming over HTTP (DASH) specification includes a feature named @mediaStreamStructureId. This enables switching between different representations at open-GOP random access points with non-decodable leading pictures, e.g., CRA pictures with associated RASL pictures in HEVC. When two different representations of the same video have different bitrates but the same spatial resolution while they have the same value of @mediaStreamStructureId, switching between the two representations at a CRA picture with associated RASL pictures can be performed, and the RASL pictures associated with the switching-at CRA pictures can be decoded with acceptable quality hence enabling seamless switching. With ARC, the @mediaStreamStructureId feature would also be usable for switching between DASH representations with different spatial resolutions.

ARC is also known as Dynamic resolution conversion.

ARC may also be regarded as a special case of Reference Picture Resampling (RPR) such as H.263 Annex P.

1.1. Reference Picture Resampling in 11.263 Annex P

This mode describes an algorithm to warp the reference picture prior to its use for prediction. It can be useful for resampling a reference picture having a different source format than the picture being predicted. It can also be used for global motion estimation, or estimation of rotating motion, by warping the shape, size, and location of the reference picture. The syntax includes warping parameters to be used as well as a resampling algorithm. The simplest level of operation for the reference picture resampling mode is an implicit factor of 4 resampling as only an FIR filter needs to be applied for the upsampling and downsampling processes. In this case, no additional signaling overhead is required as its use is understood when the size of a new picture (indicated in the picture header) is different from that of the previous picture.

1.2. Contributions on ARC to VVC 1.2.1. JVET-M0135

A preliminary design of ARC as described below, with some parts taken from JCTVC-F158, is suggested to be a place holder just to trigger the discussion.

1.2.1.1 Description of Basic Tools

The basic tools constraints for supporting ARC are as follows:

The spatial resolution may differ from the nominal resolution by a factor 0.5, applied to both dimensions. The spatial resolution may increase or decrease, yielding scaling ratios of 0.5 and 2.0.

The aspect ratios and chroma formats of the video format are not changed.

The cropping areas are scaled in proportion to spatial resolutions.

The reference pictures are simply re-scaled as needed and inter prediction is applied as usual.

1.2.1.2 Scaling Operations

It is proposed to use simple, zero-phase separable down- and up-scaling filters. Note that these filters are for prediction only; a decoder may use more sophisticated scaling for output purposes.

The following 1:2 down-scaling filter is used, which has zero phase and 5 taps:

(−1, 9, 16, 9, −1)/32

The down-sampling points are at even sample positions and are co-sited. The same filter is used for luma and chroma.

For 2:1 up-sampling, additional samples at odd grid positions are generated using the half-pel motion compensation interpolation filter coefficients in the latest VVC WD.

The combined up- and down-sampling will not change phase or the position of chroma sampling points.

1.2.1.3 Resolution Description in Parameter Set

The signaling of picture resolution in the SPS is changed as shown below, with deletions marked with double brackets (e.g., [[a]] denotes the deletion of the character "a") both in the description below and in the remainder of the document.

Sequence Parameter Set RBSP Syntax and Semantics

| | Descriptor |
|---|---|
| seq_parameter_set_rbsp( ) { | |
| ... | |
| [[ pic_width_in_luma_samples ]] | [[ ue(v) ]] |
| [[ pic_height_in_luma_samples ]] | [[ ue(v) ]] |
| num_pic_size_in_luma_samples_minus1 | ue(v) |
| for( i = 0; i <= num_pic_size_in_luma_samples_minus1; i++ ) { | |
| pic_width_in_luma_samples[ i ] | ue(v) |
| pic_height_in_luma_samples[ i ] | ue(v) |
| } | |
| ... | |
| } | |

[[pic_width_in_luma_samples specifies the width of each decoded picture in units of luma samples. pic_width_in_luma_samples shall not be equal to 0 and shall be an integer multiple of MinCbSizeY.

pic_height_in_luma_samples specifies the height of each decoded picture in units of luma samples. pic_height_in_luma_samples shall not be equal to 0 and shall be an integer multiple of MinCbSizeY.]]

num_pic_size_in_luma_samples_minus1 plus 1 specifies the number of picture sizes (width and height) in units of luma samples that may be present in the coded video sequence.

pic_width_in_luma_samples[i] specifies the i-th width of decoded pictures in units of luma samples that may be present in the coded video sequence. pic_width_in_luma_samples[i] shall not be equal to 0 and shall be an integer multiple of MinCbSizeY.

pic_height_in_luma_samples[i] specifies the i-th height of decoded pictures in units of luma samples that may be present in the coded video sequence. pic_height_in_luma_samples[i] shall not be equal to 0 and shall be an integer multiple of MinCbSizeY.

Picture Parameter Set RBSP Syntax and Semantics

| | Descriptor |
|---|---|
| pic_parameter_set_rbsp( ) { | |
| ... | |
| pic_size_idx | ue(v) |
| ... | |
| } | | pic_size_idx specifies the index to the i-th picture size in the sequence parameter set. The width of pictures that refer to the picture parameter set is pic_width_in_luma_samples[pic_size_idx] in luma samples. Likewise, the height of pictures that refer to the picture parameter set is pic_height_in_luma_samples[pic_size_idx] in luma samples.

1.2.2. JVET-M0259

1.2.2.1. Background: Sub-Pictures

The terms sub-picture track is defined as follows in Omnidirectional Media Format (OMAF): track that is with spatial relationships to other track(s) and that represents that represents a spatial subset of the original video content, which has been split into spatial subsets before video encoding at the content production side. A sub-picture track for HEVC can be constructed by rewriting the parameter sets and slice segment headers for a motion-constrained tile set so that it becomes a self-standing HEVC bitstream. A sub-picture Representation can be defined as a DASH Representation that carries a sub-picture track.

JVET-M0261 used the term sub-picture as a spatial partitioning unit for VVC, summarized as follows:

1. Pictures are divided into sub-pictures, tile groups and tiles.
2. A sub-picture is a rectangular set of tile groups that starts with a tile group that has tile_group_address equal to 0.
3. Each sub-picture may refer to its own PPS and may hence have its own tile partitioning.
4. Sub-pictures are treated like pictures in the decoding process.
5. The reference pictures for decoding the sub-picture are generated by extracting the area collocating with the current sub-picture from the reference pictures in the decoded picture buffer. The extracted area shall be a decoded sub-picture, i.e. inter prediction takes place between sub-pictures of the same size and the same location within the picture.
6. A tile group is a sequence of tiles in tile raster scan of a sub-picture.

In this contribution we refer to the term sub-picture as defined in JVET-M0261. However, a track that encapsulates a sub-picture sequence as defined in JVET-M0261 has very similar properties as a sub-picture track defined in OMAF, the examples given below apply in both cases.

1.2.2.2. Use Cases

1.2.2.2.1. Adaptive Resolution Change in Streaming

Requirement for the Support of Adaptive Streaming

Section 5.13 ("Support for Adaptive Streaming") of MPEG N17074 includes the following requirement for VVC:

The standard shall support fast representation switching in the case of adaptive streaming services that offer multiple representations of the same content, each having different properties (e.g. spatial resolution or sample bit depth). The standard shall enable the use of efficient prediction structures (e.g. so-called open groups of pictures) without compromising from the fast and seamless representation switching capability between representations of different properties, such as different spatial resolutions.

Example of the Open GOP Prediction Structure with Representation Switching

Content generation for adaptive bitrate streaming includes generations of different Representations, which can have different spatial resolutions. The client requests Segments from the Representations and can hence decide at which resolution and bitrate the content is received. At the client, the Segments of different Representations are concatenated, decoded, and played. The client should be able to achieve seamless playout with one decoder instance. Closed GOP structures (starting with an IDR picture) are conventionally used as illustrated in FIG. 1.

Open GOP prediction structures (starting with CRA pictures) enable better compression performance than the respective closed GOP prediction structures. For example, an average bitrate reduction of 5.6% in terms of luma Bjontegaard delta bitrate was achieved in with an IRAP picture interval of 24 pictures.

Open GOP prediction structures reportedly also reduce subjectively visible quality pumping.

A challenge in the use of open GOPs in streaming is that RASL pictures cannot be decoded with correct reference pictures after switching Representations. We describe this challenge below in relation to the Representations presented in FIG. 2.

Figure 3:
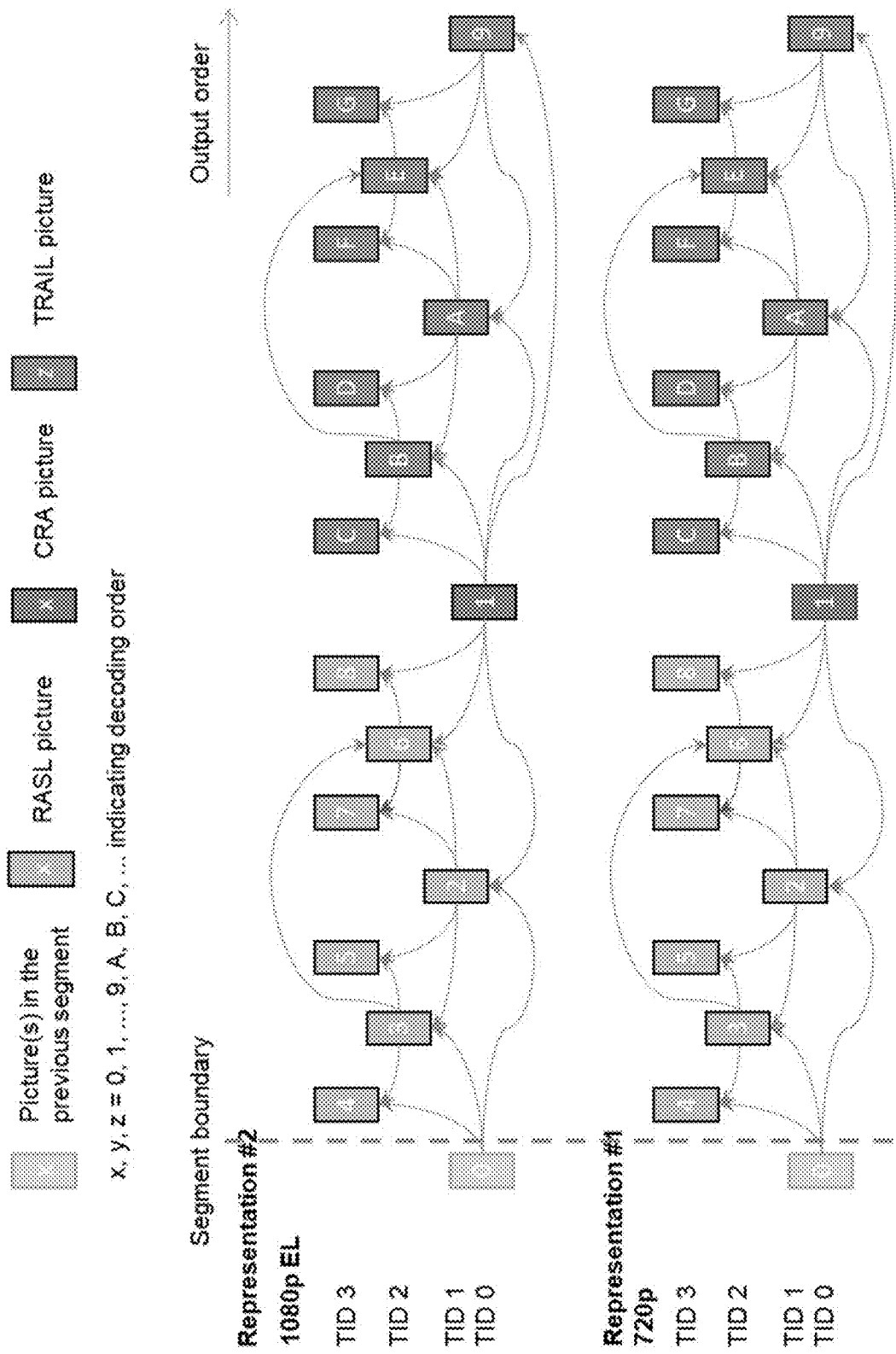
FIG. 3 shows an example of open GOP prediction structures of the two representations.

The Segments starting with a CRA picture contain RASL pictures for which at least one reference picture is in the previous Segment. This is illustrated in FIG. 3, where picture 0 in both bitstreams resides in the previous Segment and is used as reference for predicting the RASL pictures.

Figure 4:
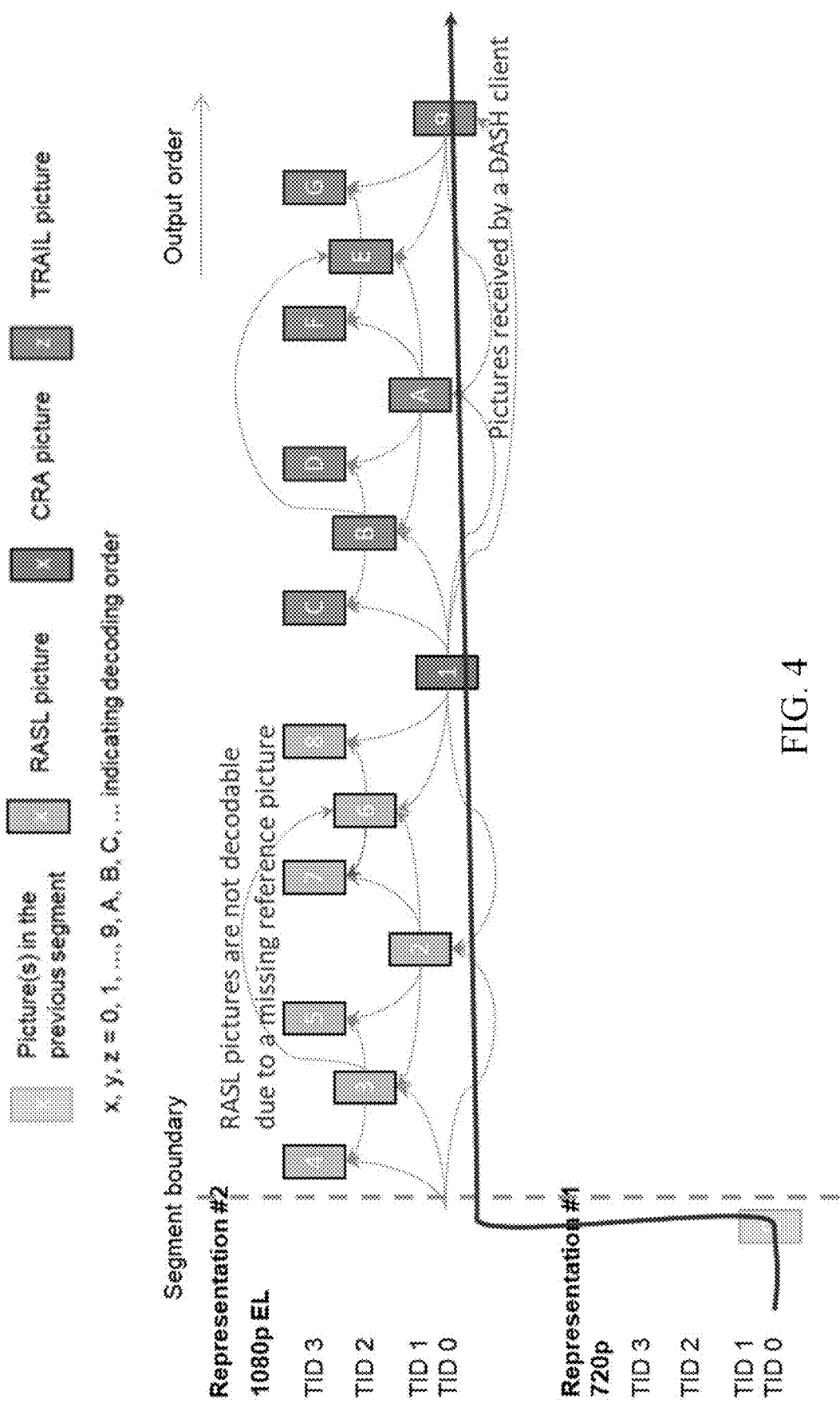
FIG. 4 shows an example of representation switching at an open GOP position.

The Representation switching marked with a dashed rectangle in FIG. 2 is illustrated in FIG. 4. It can be observed that the reference picture ("picture 0") for RASL pictures has not been decoded. Consequently, RASL pictures are not decodable and there will be a gap in the playout of the video.

Figure 5:
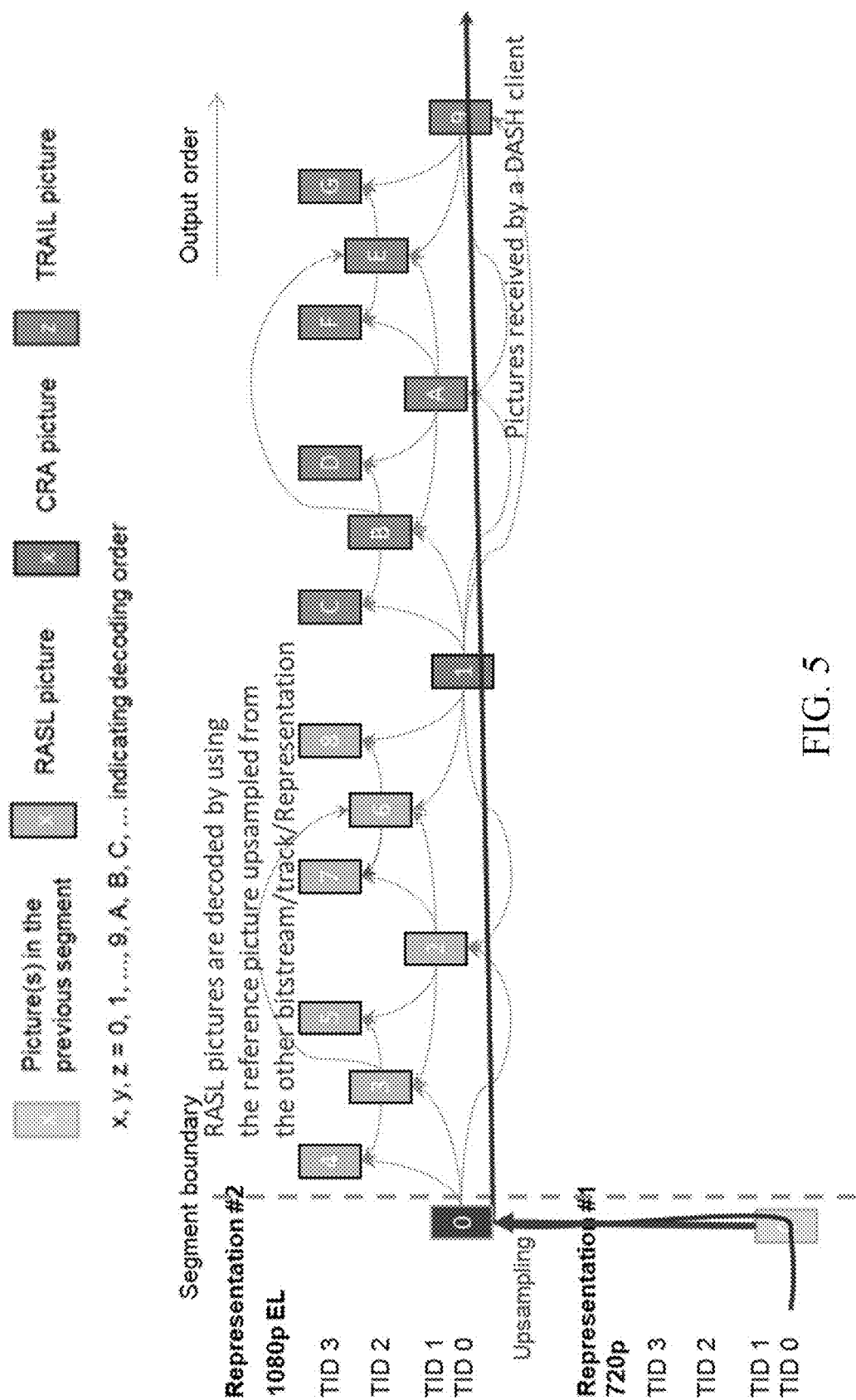
FIG. 5 shows an example of using resampled reference pictures from another bitstream as a reference for decoding Random Access Skipped Leading (RASL) pictures.

However, it has been found to be subjectively acceptable to decode RASL pictures with resampled reference pictures, as described by embodiments of the present invention. Resampling of "picture 0" and using it as a reference picture for decoding the RASL pictures is illustrated in FIG. 5.

1.2.2.2.2. Viewport Change in Region-Wise Mixed-Resolution (RWMR) 360° Video Streaming Background: HEVC-Based RWMR Streaming RWMR 360° streaming offers an increased effective spatial resolution on the viewport. Schemes where tiles covering the viewport originate from a 6K (6144×3072) ERP picture or an equivalent CMP resolution, illustrated in FIG. 6, with "4K" decoding capacity (HEVC Level 5.1) were included in clauses D.6.3 and D.6.4 of OMAF and also adopted in the VR Industry Forum Guidelines. Such resolutions are asserted to be suitable for head-mounted displays using quad-HD (2560×1440) display panel.

Encoding: The content is encoded at two spatial resolutions with cube face size 1536×1536 and 768×768, respectively. In both bitstreams a 6×4 tile grid is used and a motion-constrained tile set (MCTS) is coded for each tile position.

Encapsulation: Each MCTS sequence is encapsulated as a sub-picture track and made available as a sub-picture Representation in DASH.

Selection of streamed MCTSs: 12 MCTSs from the high-resolution bitstream are selected and the complementary 12 MCTSs are extracted from the low-resolution bitstream. Thus, a hemi-sphere (180°×180°) of the streamed content originates from the high-resolution bitstream.

Merging MCTSs to a bitstream to be decoded: The received MCTSs of a single time instance are merged into a coded picture of 1920×4608, which conforms to HEVC Level 5.1. Another option for the merged picture is to have 4 tile columns of width 768, two tile columns of width 384, and three tile rows of height 768 luma samples, resulting into a picture of 3840×2304 luma samples.

Background: Several Representations of Different IRAP Intervals for Viewport-Dependent 360° Streaming When viewing orientation changes in HEVC-based viewport-dependent 360° streaming, a new selection of sub-picture Representations can take effect at the next TRAP-aligned Segment boundary. Sub-picture Representations are merged to coded pictures for decoding, and hence the VCL NAL unit types are aligned in all selected sub-picture Representations.

To provide a trade-off between the response time to react to viewing orientation changes and the rate-distortion performance when the viewing orientation is stable, multiple versions of the content can be coded at different TRAP intervals. This is illustrated in FIG. 7 for one set of collocated sub-picture Representations for encoding presented in FIG. 6.

FIG. 8 presents an example where the sub-picture location is first selected to be received at the lower resolution (384×384). A change in the viewing orientation causes a new selection of the sub-picture locations to be received at the higher resolution (768×768). In this example the viewing orientation change happens so that Segment 4 is received from the short-IRAP-interval sub-picture Representations. After that, the viewing orientation is stable and thus, the long-IRAP-interval version can be used starting from Segment 5 onwards.

Problem Statement

Figure 9:
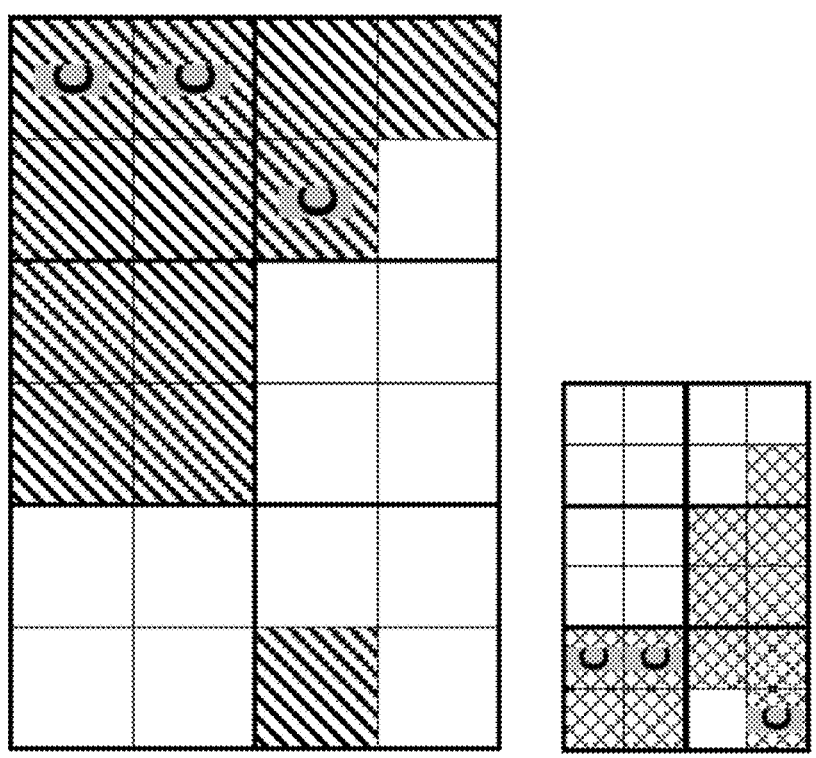
FIG. 9 shows an example of a viewing orientation change.

Since the viewing orientation moves gradually in typical viewing situations, the resolution changes in only a subset of the sub-picture locations in RWMR viewport-dependent streaming. FIG. 9 illustrates a viewing orientation change from FIG. 6 slightly upwards and towards the right cube face. Cube face partitions that have a different resolution as earlier are indicated with "C". It can be observed that the resolution changed in 6 out of 24 cube face partitions. However, as discussed above, Segments starting with an TRAP picture need to be received for all 24 cube face partitions in response to the viewing orientation change. Updating all sub-picture locations with Segments starting with an IRAP picture is inefficient in terms of streaming rate-distortion performance.

In addition, the ability to use open GOP prediction structures with sub-picture Representations of RWMR 360° streaming is desirable to improve rate-distortion performance and to avoid visible picture quality pumping caused by closed GOP prediction structures.

Proposed Design Goals

The following design goals are proposed:
1. The VVC design should allow merging of a sub-picture originating from a random-access picture and another sub-picture originating from a non-random-access picture into the same coded picture conforming to VVC.
2. The VVC design should enable the use of open GOP prediction structure in sub-picture representations without compromising from the fast and seamless representation switching capability between sub-picture representations of different properties, such as different spatial resolutions, while enabling merging of sub-picture representations into a single VVC bitstream.

Figure 10:
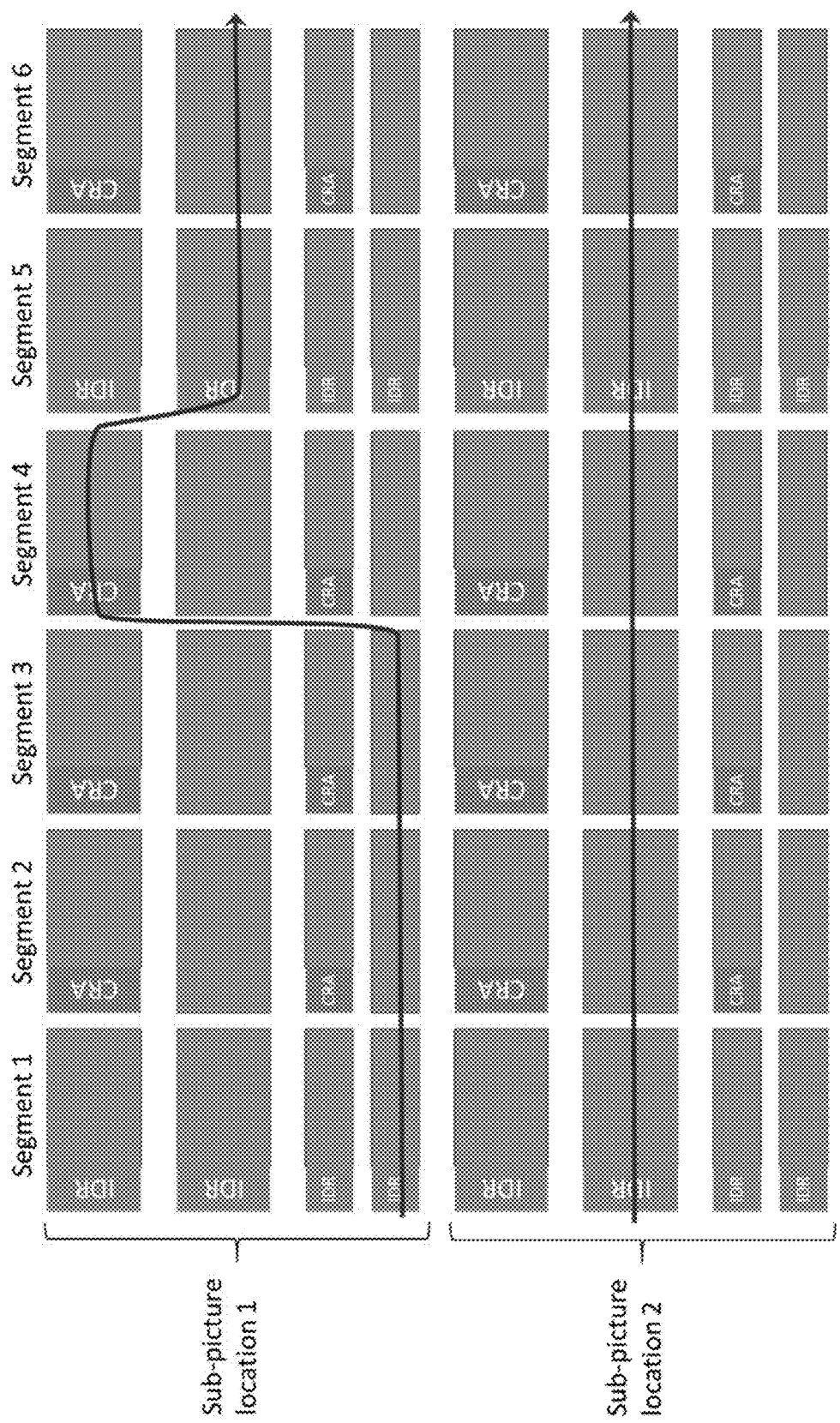
FIG. 10 shows an example of sub-picture representations for two sub-picture locations.

The design goals can be illustrated with FIG. 10, in which sub-picture representations for two sub-picture locations are presented. For both sub-picture locations, a separate version of the content is coded for each combination among two resolutions and two random access intervals. Some of the Segments start with an open GOP prediction structure. A viewing orientation change causes the resolution of sub-picture location 1 to be switched at the start of Segment 4. Since Segment 4 starts with a CRA picture, which is associated with RASL pictures, those reference pictures of the RASL pictures that are in Segment 3 need to be resampled. It is remarked that this resampling applies to sub-picture location 1 while decoded sub-pictures of some other sub-picture locations are not resampled. In this example, the viewing orientation change does not cause changes in the resolution of sub-picture location 2 and thus decoded sub-pictures of sub-picture location 2 are not resampled. In the first picture of Segment 4, the Segment for sub-picture location 1 contains a sub-picture originating from a CRA picture, while the Segment for sub-picture location 2 contains a sub-picture originating from a non-random-access picture. It is suggested that merging of these sub-pictures into a coded picture is allowed in VVC.

1.2.2.2.3. Adaptive Resolution Change in Video Conferencing

JCTVC-F158 proposed adaptive resolution change mainly for video conferencing. The following sub-sections are copied from JCTVC-F158 and present the use cases where adaptive resolution change is asserted to be useful.

Seamless Network Adaption and Error Resilience

Applications such as video conferencing and streaming over packets networks frequently require that the encoded stream adapt to changing network conditions, especially when bit rates are too high and data is being lost. Such applications typically have a return channel allowing the encoder to detect the errors and perform adjustments. The encoder has two main tools at its disposal: bit rate reduction and changing the resolution, either temporal or spatial. Temporal resolution changes can be effectively achieved by coding using hierarchical prediction structures. However, for best quality spatial resolution changes are needed as well as part of a well-designed encoder for video communications.

Changing spatial resolution within AVC requires an IDR frame is sent and the stream is reset. This causes significant problems. An IDR frame at reasonable quality will be much larger than an Inter picture, and will be correspondingly more complex to decode: this costs time and resource. This is a problem if the resolution change is requested by the decoder for loading reasons. It can also break low-latency buffer conditions, forcing an audio re-sync, and the end-to-end delay of the stream will increase, at least temporarily. This gives a poor user experience.

To minimize these problems, the IDR is typically sent at low quality, using a similar number of bits to a P frame, and it takes a significant time to return to full quality for the given resolution. To get low enough delay, the quality can be very low indeed and there is often a visible blurring before the image is "refocused". In effect, the Intra frame is doing very little useful work in compression terms: it is just a method of re-starting the stream.

So there is a requirement for methods in HEVC which allow resolution to be changed, especially in challenging network conditions, with minimal impact on subjective experience.

Fast Start

It would be useful to have a "fast start" mode where the first frame is sent at reduced resolution and resolution is increased over the next few frames, in order to reduce delay and get to normal quality more quickly without unacceptable image blurring at the beginning.

Conference "Compose"

Video conferences also often have a feature whereby the person speaking is shown full-screen and other participants are shown in smaller resolution windows. To support this efficiently, often the smaller pictures are sent at lower resolution. This resolution is then increased when the participant becomes the speaker and is full-screened. Sending an intra frame at this point causes an unpleasant hiccup in the video stream. This effect can be quite noticeable and unpleasant if speakers alternate rapidly.

1.2.2.3. Proposed Design Goals

The following is high-level design choices are proposed for VVC version 1:
1. It is proposed to include a reference picture resampling process in VVC version 1 for the following use cases:
   Usage of efficient prediction structures (e.g. so-called open groups of pictures) in adaptive streaming without compromising from the fast and seamless representation switching capability between representations of different properties, such as different spatial resolutions.
   Adapting low-delay conversational video content to network conditions and application-originated resolution changes without significant delay or delay variation.
2. The VVC design is proposed to allow merging of a sub-picture originating from a random-access picture and another sub-picture originating from a non-random-access picture into the same coded picture conforming to VVC. This is asserted to enable efficient handling of viewing orientation changes in mixed-quality and mixed-resolution viewport-adaptive 360° streaming.
3. It is proposed to include sub-picture-wise resampling process in VVC version 1. This is asserted to enable efficient prediction structure for more efficient handling of viewing orientation changes in mixed-resolution viewport-adaptive 360° streaming.

1.2.3. JVET-N0048

The use cases and design goals for adaptive resolution changing (ARC) were discussed in detail in JVET-M0259. A summary is provided below:
1. Real-Time Communication
The following use cases for adaptive resolution change were originally included in JCTVC-F158:
   a. Seamless network adaption and error resilience (through dynamic adaptive resolution changes)
   b. Fast start (gradual increase of resolution at session start or reset)
   c. Conference "compose" (person speaking is given a higher resolution)

2. Adaptive Streaming

Section 5.13 ("Support for Adaptive Streaming") of MPEG N17074 includes the following requirement for VVC:

The standard shall support fast representation switching in the case of adaptive streaming services that offer multiple representations of the same content, each having different properties (e.g. spatial resolution or sample bit depth). The standard shall enable the use of efficient prediction structures (e.g. so-called open groups of pictures) without compromising from the fast and seamless representation switching capability between representations of different properties, such as different spatial resolutions.

JVET-M0259 discusses how to meet this requirement by resampling of reference pictures of leading pictures.

3. 360-Degree Viewport-Dependent Streaming

JVET-M0259 discusses how to address this use case by resampling certain independently coded picture regions of reference pictures of leading pictures.

This contribution proposes an adaptive resolution coding approach, which is asserted to meet all the use cases and design goals above. 360-degree viewport-dependent streaming and conference "compose" uses cases are handled by this proposal together with JVET-N0045 (proposing independent sub-picture layers).

Proposed Specification Text
Signaling
sps_max_rpr

|  | Descriptor |
| --- | --- |
| seq_parameter_set_rbsp( ) { | |
| ... | |
| sps_max_rpr | ue(v) |
| ... | | sps_max_rpr specifies the maximum number of active reference pictures in reference picture list 0 or 1 for any tile group in the CVS that have pic_width_in_luma_samples and pic_height_in_luma_samples not equal to pic_width_in_luma_samples and pic_height_in_luma_samples, respectively, of the current picture.

Picture Width and Height

|  | Descriptor |
| --- | --- |
| seq_parameter_set_rbsp( ) { | |
| ... | |
| [[ pic_width_in_luma_samples ]] | [[ ue(v) ]] |
| [[ pic_height_in_luma_samples ]] | [[ ue(v) ]] |
| max_width_in_luma_samples | ue(v) |
| max_height_in_luma_samples | ue(v) |
| ... | ue(v) |

|  | Descriptor |
| --- | --- |
| pic_parameter_set_rbsp( ) { | |
| pps_pic_parameter_set_id | ue(v) |
| pps_seq_parameter_set_id | ue(v) |
| pic_width_in_luma_samples | ue(v) |
| pic_height_in_luma_samples | ue(v) |
| ... | | max_width_in_luma_samples specifies that it is a requirement of bitstream conformance that pic_width_in_luma_samples in any active PPS for any picture of a CVS for which this SPS is active is less than or equal to max_width_in_luma_samples.

max_height_in_luma_samples specifies that it is a requirement of bitstream conformance that pic_height_in_luma_samples in any active PPS for any picture of a CVS for which this SPS is active is less than or equal to max_height_in_luma_samples.

High-Level Decoding Process

The decoding process operates as follows for the current picture CurrPic:

1. The decoding of NAL units is specified in clause 8.2.
2. The processes in clause 8.3 specify the following decoding processes using syntax elements in the tile group header layer and above:

Variables and functions relating to picture order count are derived as specified in clause 8.3.1. This needs to be invoked only for the first tile group of a picture.

At the beginning of the decoding process for each tile group of a non-IDR picture, the decoding process for reference picture lists construction specified in clause 8.3.2 is invoked for derivation of reference picture list 0 (RefPicList[0]) and reference picture list 1 (RefPicList[1]).

The decoding process for reference picture marking in clause 8.3.3 is invoked, wherein reference pictures may be marked as "unused for reference" or "used for long-term reference". This needs to be invoked only for the first tile group of a picture.

For each active reference picture in RefPicList[0] and RefPicList[1] that has pic_width_in_luma_samples or pic_height_in_luma_samples not equal to pic_width_in_luma_samples or pic_height_in_luma_samples, respectively, of CurrPic, the following applies:

The resampling process in clause X.Y.Z is invoked [Ed. (MH): details of invocation parameters to be added] with the output having the same reference picture marking and picture order count as the input.

The reference picture used as input to the resampling process is marked as "unused for reference".

3. [Ed. (YK): Add herein the invocation of the decoding processes for coding tree units, scaling, transform, in-loop filtering, etc.]
4. After all tile groups of the current picture have been decoded, the current decoded picture is marked as "used for short-term reference".

Resampling Process

SHVC resampling process (HEVC clause H.8.1.4.2) is proposed with the following additions:

. . .

If sps_ref_wraparound_enabled_flag is equal to 0, the sample value tempArray[n] with n=0 . . . 7, is derived as follows:

$$tempArray[n]=(f_L[xPhase,0]*rlPicSample_L[Clip3(0, refW-1,xRef-3),yPosRL]+f_L[xPhase,1] \\ *rlPicSample_L[Clip3(0,refW-1,xRef-2), yPosRL]+f_L[xPhase,2]*rlPicSample_L[Clip3(0, refW-1,xRef-1),yPosRL]+f_L[xPhase,3] \\ *rlPicSample_L[Clip3(0,refW-1,xRef),yPosRL]+ f_L[xPhase,4]*rlPicSample_L[Clip3(0,refW-1, xRef+1),yPosRL]+(H\text{-}38)$$

$$f_L[xPhase,5]*rlPicSample_L[Clip3(0,refW-1,xRef+2), yPosRL]+f_L[xPhase,6]*rlPicSample_L[Clip3(0, refW-1,xRef+3),yPosRL]+f_L[xPhase,7] \\ *rlPicSample_L[Clip3(0,refW-1,xRef+4), yPosRL])\!>\!>\!shift1$$

Otherwise, the sample value tempArray[n] with n=0 . . . 7, is derived as follows:

refOffset=(sps_ref_wraparound_offset_minus1+1)
 *MinCbSize$Y$ tempArray[$n$]=($f_L$[xPhase,0*]rlPicSample$_L$[Clip$H$
 (refOffset,ref$W$,xRef−3),yPosRL]+$f_L$[xPhase,1*]
 rlPicSample$_L$[Clip$H$(refOffset,ref$W$,xRef−2),
 yPosRL]+$f_L$[xPhase,2]*rlPicSample$_L$[Clip$H$
 (refOffset,ref$W$,xRef−1),yPosRL]+$f_L$[xPhase,3]
 *rlPicSample$_L$[Clip$H$(refOffset,ref$W$,xRef),
 yPosRL]+$f_L$[xPhase,4]*rlPicSample$_L$[Clip$H$
 (refOffset,ref$W$,xRef+1),yPosRL]+$f_L$[xPhase,5*]
 rlPicSample$_L$[Clip$H$(refOffset,ref$W$,xRef+2),
 yPosRL]+$f_L$[xPhase,6]*rlPicSample$_L$[Clip$H$
 (refOffset,ref$W$,xRef+3),yPosRL]+$f_L$[xPhase,7]
 *rlPicSample$_L$[Clip$H$(refOffset,ref$W$,xRef+4),
 yPosRL])>>shift1

. . .

If sps_ref_wraparound_enabled_flag is equal to 0, the sample value tempArray[n] with n=0 . . . 3, is derived as follows:

tempArray[$n$]=($f_C$[xPhase,0*]rlPicSample$_C$[Clip3(0,
 ref$WC$−1,xRef−1),yPosRL]+$f_C$[xPhase,1]
 *rlPicSample$_C$[Clip3(0,ref$WC$−1,xRef),
 yPosRL]+$f_C$[xPhase,2]*rlPicSample$_C$[Clip3(0,
 ref$WC$−1,xRef+1),yPosRL]+($H$-50)

$f_C$[xPhase,3]*rlPicSample$_C$[Clip3(0,ref$WC$−1,xRef+
 2),yPosRL])>>shift1

Otherwise, the sample value tempArray[n] with n=0 . . . 3, is derived as follows:

refOffset=(sps_ref_wraparound_offset_minus1+1)
 *MinCbSize$Y$)/SubWidth$C$ tempArray[$n$]=($f_C$[xPhase,0]*rlPicSample$_C$[Clip$H$
 (refOffset,ref$WC$,xRef−1),yPosRL]+$f_C$[xPhase,1]
 *rlPicSample$_C$[Clip$H$(refOffset,ref$WC$,xRef),
 yPosRL]+$f_C$[xPhase,2]*rlPicSample$_C$[Clip$H$
 (refOffset,ref$WC$,xRef+1),yPosRL]+$f_C$[xPhase,3]
 *rlPicSample$_C$[Clip$H$(refOffset,ref$WC$,xRef+2),
 yPosRL])>>shift1

1.2.4. JVET-N0052

Adaptive resolution change, as a concept in video compression standards, has been around since at least 1996; in particular H.263+ related proposals towards reference picture resampling (RPR, Annex P) and Reduced Resolution Update (Annex Q). It has recently gained a certain prominence, first with proposals by Cisco during the JCT-VC time, then in the context of VP9 (where it is moderately widely deployed nowadays), and more recently in the context of VVC. ARC allows reducing the number of samples required to be coded for a given picture, and upsampling the resulting reference picture to a higher resolution when such is desirable.

We consider ARC of particular interest in two scenarios:
1) Intra coded pictures, such as IDR pictures are often considerably larger than inter pictures. Downsampling pictures intended to be intra coded, regardless of reason, may provide a better input for future prediction. It's also clearly advantageous from a rate control viewpoint, at least in low delay applications.
2) When operating the codec near its breaking point, as at least some cable and satellite operators routinely seem to do, ARC may become handy even for non-intra coded pictures, such as in scene transitions without a hard transition point.
3) Looking perhaps a bit too much forward: is the concept of a fixed resolution generally defensible? With the departure of CRTs and the ubiquity of scaling engines in rendering devices, the hard bind between rendering and coding resolution is a thing of the past. Also, we note that there is certain research available that suggests that most people are not able to concentrate on fine details (associated perhaps with high resolution) when there is a lot of activity going on in the video sequence, even if that activity is elsewhere spatially. If that were true and generally accepted, fine granularity resolution changes may be a better rate control mechanism than adaptive QP. We put this point out for discussion at this time, as we lack data—feedback from those in the knows is appreciated. Of course, doing away with the concept of fixed resolution bitstreams has a myriad of system layer and implementation implications, of which (at least at the level of their existence, if not their detailed nature) we are well aware of.

Technically, ARC can be implemented as reference picture resampling. Implementing reference picture resampling has two major aspects: the resampling filters, and the signaling of the resampling information in the bitstream. This document focusses on the latter and touches the former only to the extent we have implementation experience. More study of suitable filter design is encouraged.

Overview of an Existing ARC Implementation

Figure 11:
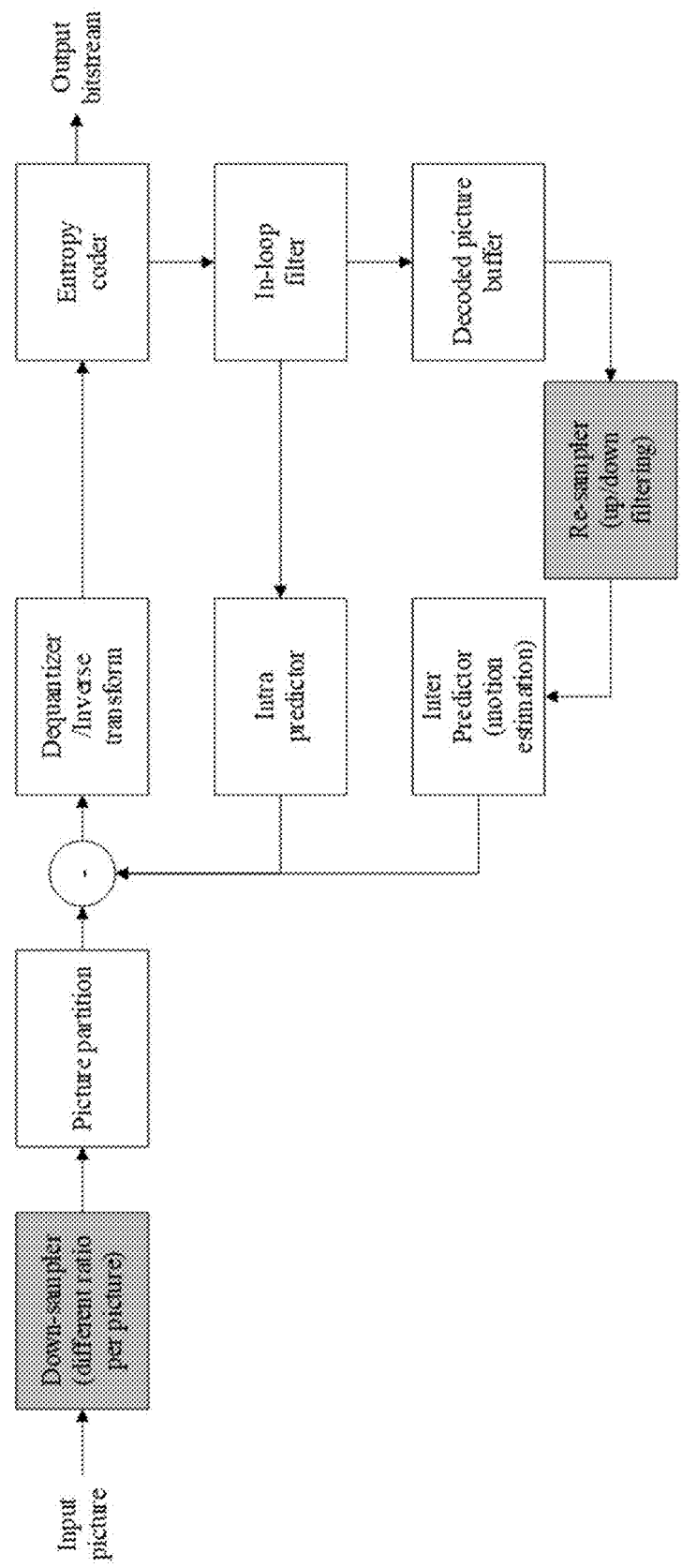
FIG. 11 shows an example of encoder modifications for adaptive resolution conversion (ARC).
Figure 12:
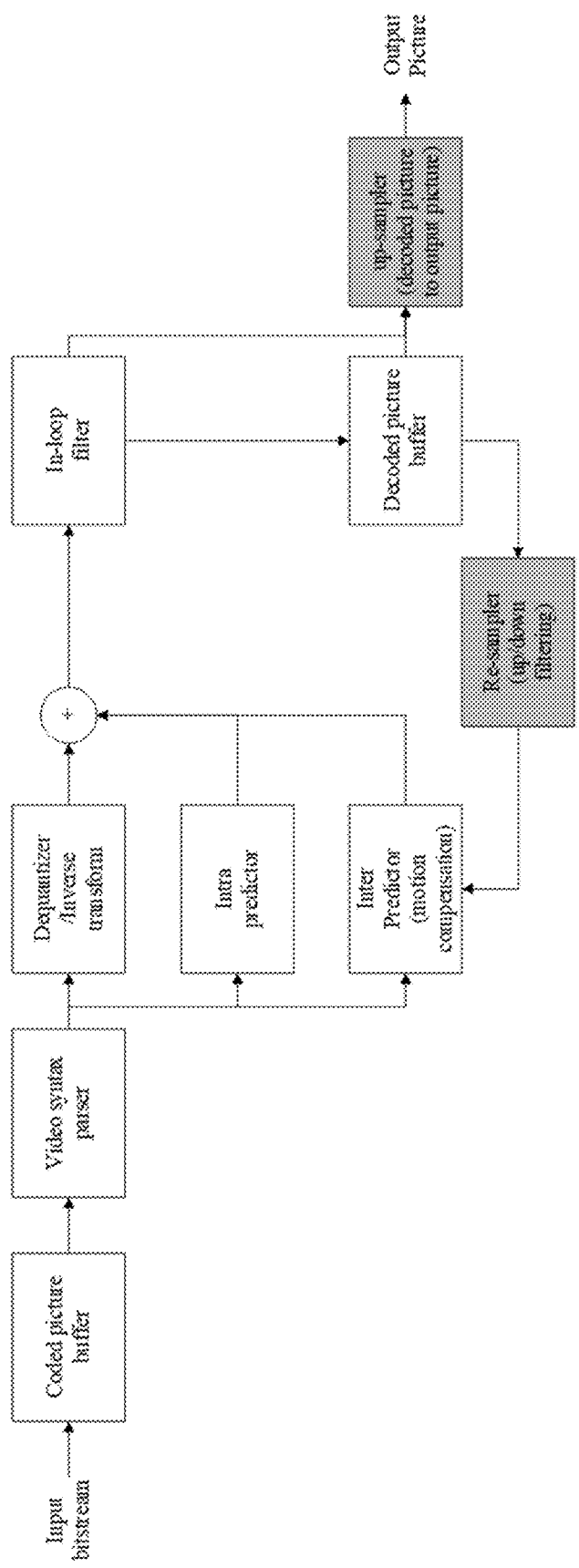
FIG. 12 shows an example of decoder modifications for ARC.

FIGS. 11 and 12 illustrate an existing ARC en-/decoder implementation, respectively. In our implementation, it is possible to change the picture width and height, on a per picture granularity irrespective of the picture type. At the encoder, the input image data is down-sampled to the selected picture size for the current picture encoding. After the first input picture is encoded as intra-picture, the decoded picture is stored in the decoded picture buffer (DPB). When the consequent picture is down-sampled with a different sampling ratio and encoded as inter-picture, the reference picture(s) in the DPB is/are up-/down-scaled according the spatial ratio between the picture size of the reference and the current picture size. At the decoder, the decoded picture is stored in the DPB without resampling. However, the reference picture in the DPB is up-/down-scaled in relation to the spatial ratio between the currently decoded picture and the reference, when used for motion compensation. The decoded picture is up-sampled to the original picture size or the desired output picture size when bumped out for display. In motion estimation/compensation process, motion vectors are scaled in relation to picture size ratio as well as picture order count difference.

Signaling of ARC Parameters

The term ARC parameters is used herein as a combination of any parameters required to make ARC work. In the easiest case, that could be a zoom factor, or an index into a table with defined zoom factors. It could be a target resolution (for example in sample or max CU size granularity), or an index into a table providing a target resolution, like what was proposed in JVET-M0135. Also included would be filter selectors or even filter parameters (all the way up to filter coefficients) of the up/down-sampling filters in use.

From the outset, we propose herein to allow, at least conceptually, different ARC parameters for different parts of a picture. We propose that the appropriate syntax structure as per the current VVC draft would be a rectangular tile group (TG). Those folks using scan-order TGs would be restricted to use ARC only to a full picture, or to the extent scan order TGs are included in a rectangular TG (we don't recall that TG nesting has been discussed so far, and perhaps it's a bad idea). That can easily be specified by a bitstream constraint.

As different TGs may have different ARC parameters, the appropriate place for ARC parameters would be either in the TG header or in a parameter set with the scope of a TG, and referenced by the TG header—the Adaptation Parameter Set in the current VVC draft, or a more detailed reference (an index) into a table in a higher parameter set. Of these three choices, we propose, at this point, to use the TG header to code a reference to a table entry including the ARC parameters, and that table be located in the SPS, with maximum table values coded in the (forthcoming) DPS. We can live with coding a zoom factor directly into the TG header, without using any parameter set values. The use of the PPS for the reference, as proposed in JVET-M0135, is counter-indicated if, as we do, the per tile group signaling of ARC parameters is a design criterion.

As for the table entries themselves, we see many options:
- coding down-sample factors, either one for both dimension or independently in X and Y dimension? That's mostly a (HW-) implementation discussion, and some would perhaps prefer an outcome where the zoom factor in X dimension is fairly flexible, but in Y dimension is fixed to 1, or has very few choices. We suggest that the syntax is the wrong place for expressing such constraints and, if they were desirable, we prefer the constraints expressed as requirements for conformance. In other words, keep the syntax flexible.
- Coding target resolutions. That's what we propose below. There could be more or less complex constraints about those resolutions in relation to the current resolution, expressed perhaps in bitstream conformance requirements.
- Down-sampling per tile group is preferred to allow for picture composition/extraction. However, it is not critical from a signaling viewpoint. If the group were making the unwise decision of allowing ARC only at picture granularity, we can always include a requirement for bitstream conformance that all TGs use the same ARC parameters.
- Control information related to ARC. In our design below, that includes the reference picture size.
- Do we need to have flexibility in filter design? Anything bigger than a handful of codepoints? If yes, put those into APS? (No, please no APS update discussion again. If down-sample filter changes and ALF stays, we propose that bitstream has to eat the overhead.)

For now, in order to keep proposed technology aligned and simple (to the extent possible), we propose
- Fixed filter design
- Target resolutions in a table in the SPS, with bitstream constraints TBD.
- Minimum/Maximum target resolution in DPS to facilitate cap exchange/negotiation.

The resulting syntax could look as follows:

Decoder Parameter Set RBSP Syntax

|  | Descriptor |
| --- | --- |
| dec_parameter_set_rbsp( ) { | |
| ... | |
| max_pic_width_in_luma_samples | ue(v) |
| max_pic_height_in_luma_samples | ue(v) |
| ... | |
| } | | max_pic_width_in_luma_samples specifies the maximum width of decoded pictures in units of luma samples in the bitstream. max_pic_width_in_luma_samples shall not be equal to 0 and shall be an integer multiple of MinCbSizeY. The value of dec_pic_width_in_luma_samples[i] cannot be greater than the value of max_pic_width_in_luma_samples. max_pic_height_in_luma_samples specifies the maximum height of decoded pictures in units of luma samples. max_pic_height_in_luma_samples shall not be equal to 0 and shall be an integer multiple of MinCbSizeY. The value of dec_pic_height_in_luma_samples[i] cannot be greater than the value of max_pic_height_in_luma_samples.

Sequence Parameter Set RBSP Syntax

|  | Descriptor |
| --- | --- |
| seq_parameter_set_rbsp( ) { | |
| ... | |
| adaptive_pic_resolution_change_flag | u(1) |
| if(adaptive_pic_resolution_change_flag) { | |
| output_pic_width_in_luma_samples | ue(v) |
| output_pic_height_in_luma_samples | ue(v) |
| reference_pic_size_present_flag | u(1) |
| if(reference_pic_size_present_flag) | |
| { | |
| reference_pic_width_in_luma_samples | ue(v) |
| reference_pic_height_in_luma_samples | ue(v) |
| } | |
| num_dec_pic_size_in_luma_samples_minus1 | ue(v) |
| for( i = 0; i <= num_dec_pic_size_in_luma_samples_minus1; i++ ) { | |
| dec_pic_width_in_luma_samples[ i ] | ue(v) |
| dec_pic_height_in_luma_samples[ i ] | ue(v) |
| } | |
| } | |
| else { | |
| pic_width_in_luma_samples | ue(v) |
| pic_height_in_luma_samples | ue(v) |
| } | |
| ... | |
| } | | adaptive_pic_resolution_change_flag equal to 1 specifies that an output picture size (output_pic_width_in_luma_samples, output_pic_height_in_luma_samples), an indication of the number of decoded picture sizes (num_dec_pic_size_in_luma_samples_minus1) and at least one decoded picture size (dec_pic_width_in_luma_samples[i], dec_pic_height_in_luma_samples[i]) are present in the SPS. A reference picture size (reference_pic_width_in_luma_samples, reference_pic_height_in_luma_samples) is present conditioned on the value of reference_pic_size_present_flag.

output_pic_width_in_luma_samples specifies the width of the output picture in units of luma samples. output_pic_width_in_luma_samples shall not be equal to 0.

output_pic_height_in_luma_samples specifies the height of the output picture in units of luma samples. output_pic_height_in_luma_samples shall not be equal to 0.

reference_pic_size_present_flag equal 1 specifies that reference_pic_width_in_luma_samples and reference_pic_height_in_luma_samples are present.

reference_pic_width_in_luma_samples specifies the width of the reference picture in units of luma samples. output_pic_width_in_luma_samples shall not be equal to 0. If not present, the value of reference_pic_width_in_luma_samples is inferred to be equal to dec_pic_width_in_luma_samples[i].

reference_pic_height_in_luma_samples specifies the height of the reference picture in units of luma samples. output_pic_height_in_luma_samples shall not be equal to 0. If not present, the value of reference_pic_height_in_luma_samples is inferred to be equal to dec_pic_height_in_luma_samples[i].

NOTE1—The size of the output picture shall be equal to the values of output_pic_width_in_luma_samples and output_pic_height_in_luma_samples. The size of the reference picture shall be equal to the values of reference_pic_width_in_luma_samples and _pic_height_in_luma_samples, when the reference picture is used for motion compensation.

num_dec_pic_size_in_luma_samples_minus1 plus 1 specifies the number of the decoded picture size (dec_pic_width_in_luma_samples[i], dec_pic_height_in_luma_samples[i]) in units of luma samples in the coded video sequence.

dec_pic_width_in_luma_samples[i] specifies the i-th width of the decoded picture sizes in units of luma samples in the coded video sequence. dec_pic_width_in_luma_samples[i] shall not be equal to 0 and shall be an integer multiple of MinCbSizeY.

dec_pic_height_in_luma_samples[i] specifies the i-th height of the decoded picture sizes in units of luma samples in the coded video sequence. dec_pic_height_in_luma_samples[i] shall not be equal to 0 and shall be an integer multiple of MinCbSizeY.

NOTE2—The i-th decoded picture size (dec_pic_width_in_luma_samples[i], dec_pic_height_in_luma_samples[i]) may be equal to the decoded picture size of the decoded picture in the coded video sequence.

Tile Group Header Syntax

|  | Descriptor |
|---|---|
| tile_group_header( ) { | |
| ... | |
| if(adaptive_pic_resolution_change_flag) { | |
|   dec_pic_size_idx | ue(v) |
| } | |
| ... | |
| } | | dec_pic_size_idx specifies that the width of the decoded picture shall be equal to pic_width_in_luma_samples [dec_pic_size_idx] and the height of the decoded picture shall be equal to pic_height_in_luma_samples [dec_pic_size_idx].

Filters

The proposed design conceptually includes four different filter sets: down-sampling filter from the original picture to the input picture, up-/down-sampling filters to rescale reference pictures for motion estimation/compensation, and up-sampling filter from the decoded picture to the output picture. The first and last ones can be left as non-normative matters. In the scope of specification, up-/down-sampling filters need to be explicitly signaled in an appropriate parameter set, or pre-defined.

Our implementation uses the down-sampling filters of SHVC (SHM ver. 12.4), which is a 12-tap and 2D separable filter, for down-sampling to resize the reference picture to be used for motion compensation. In the current implementation, only dyadic sampling is supported. Therefore, the phase of the down-sampling filter is set equal to zero by default. For up-sampling, 8-tap interpolation filters are used, with 16-phases, to shift the phase and align the luma and chroma pixel positions to the original positions.

Tables 1 & 2 provide the 8-tap filter coefficients fL[p, x] with p=0 ... 15 and x=0 ... 7 used for the luma up-sampling process, and the 4-tap filter coefficients fC[p, x] with p=0 ... 15 and x=0 ... 3 used for the chroma up-sampling process.

Table 3 provides the 12-tap filter coefficients for down-sampling process. The same filter coefficients are used for both luma and chroma for down-sampling.

TABLE 1

Luma up-sampling filter with 16 phases

| | Interpolation filter coefficients | | | | | | | |
|---|---|---|---|---|---|---|---|---|
| Phase p | fL[p, 0] | fL[p, 1] | fL[p, 2] | fL[p, 3] | fL[p, 4] | fL[p, 5] | fL[p, 6] | fL[p, 7] |
| 0 | 0 | 0 | 0 | 64 | 0 | 0 | 0 | 0 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |

TABLE 1-continued

Luma up-sampling filter with 16 phases

Interpolation filter coefficients

| Phase p | fL[p, 0] | fL[p, 1] | fL[p, 2] | fL[p, 3] | fL[p, 4] | fL[p, 5] | fL[p, 6] | fL[p, 7] |
|---|---|---|---|---|---|---|---|---|
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

TABLE 2

Chroma up-sampling filter with 16 phases

Interpolation filter coefficients

| Phase p | fC[ p, 0 ] | fC[ p, 1 ] | fC[ p, 2 ] | fC[ p, 3 ] |
|---|---|---|---|---|
| 0 | 0 | 64 | 0 | 0 |
| 1 | −2 | 62 | 4 | 0 |
| 2 | −2 | 58 | 10 | −2 |
| 3 | −4 | 56 | 14 | −2 |
| 4 | −4 | 54 | 16 | −2 |
| 5 | −6 | 52 | 20 | −2 |
| 6 | −6 | 46 | 28 | −4 |
| 7 | −4 | 42 | 30 | −4 |
| 8 | −4 | 36 | 36 | −4 |
| 9 | −4 | 30 | 42 | −4 |
| 10 | −4 | 28 | 46 | −6 |
| 11 | −2 | 20 | 52 | −6 |
| 12 | −2 | 16 | 54 | −4 |
| 13 | −2 | 14 | 56 | −4 |
| 14 | −2 | 10 | 58 | −2 |
| 15 | 0 | 4 | 62 | −2 |

TABLE 3

Down-sampling filter coefficient for luma and chroma

Down-sampling filter coefficients

| Phase p | f[p, 0] | f[p, 1] | f[p, 2] | f[p, 3] | f[p, 4] | f[p, 5] | f[p, 6] | f[p, 7] | f[p, 8] | f[p, 9] | f[p, 10] | f[p, 11] |
|---|---|---|---|---|---|---|---|---|---|---|---|---|
| 0 | 1 | −6 | −5 | 7 | 26 | 41 | 41 | 26 | 7 | −5 | −6 | 1 |

We have not experimented with other filter designs. We anticipate that (perhaps significant) subjective and objective gains can be expected when using filters adaptive to content and/or to scaling factors.

Tile Group Boundary Discussions

As it is perhaps true with a lot of tile group related work, our implementation is not quite finished with respect to tile group (TG) based ARC. Our preference is to revisit that implementation once the discussion of spatial composition and extraction, in the compressed domain, of multiple sub-pictures into a composed picture has yielded at least a working draft. That, however, does not prevent us from extrapolating the outcome to some extent, and to adapt our signaling design accordingly.

For now, we believe that the tile group header is the correct place for something like dec_pic_size_idx as proposed above, for reasons already stated. We use a single ue(v) codepoint dec_pic_size_idx, conditionally present in the tile group header, to indicate the employed ARC parameters. In order to match our implementation which is ARC per picture only, the one thing in spec-space we need to do right now is to code a single tile group only, or to make it a condition of bitstream compliance that all TG headers of a given coded picture have the same value of dec_pic_size_idx (when present).

The parameter dec_pic_size_idx can be moved into whatever header that starts a sub-picture. Our current feeling is that most likely that will continue to be a tile group header.

Beyond these syntactical considerations, some additional work is needed to enable tile group or sub-picture based ARC. The perhaps most difficult part is how to address the issue of unneeded samples in a picture where a sub-picture has been resampled to a lower size.

Consider the right portion of FIG. 13, which is made up of four sub-pictures (expressed perhaps as four rectangular tile groups in the bitstream syntax). To the left, the bottom right TG is subsampled to half the size. What do we do with the samples outside the relevant area, marked as "Half"?

Some existing video coding standards had in common that spatial extraction of parts of a picture in the compressed domain was not supported. That implied that each sample of a picture is represented by one or more syntax elements, and each syntax elements impacts at least one sample. If we want to keep that up, we would need to populate the area around the samples covered by the downsampled TG labelled "Half" somehow. H.263+ Annex P solved that problem by padding; in fact, the sample values of the padded samples could be signaled in the bitstream (within certain strict limits).

An alternative that would perhaps constitute a significant departure from previous assumptions, but may be needed in any case if we want to support sub-bitstream extraction (and composition) based on rectangular parts of a picture, would be to relax the current understanding that each sample of a reconstructed picture must be represented by something in the coded picture (even if that something is only a skipped block).

Implementation Considerations, System Implications and Profiles/Levels

We propose basic ARC to be included in the "baseline/main" profiles. Sub-profiling may be used to remove them if not needed for certain application scenarios. Certain restrictions may be acceptable. In that regard we note that certain H.263+ profiles and "recommended modes" (which pre-dated profiles) included a restriction for Annex P to be used only as "implicit factor of 4", i.e. dyadic downsampling in both dimensions. That was enough to support fast start (get the I frame over quickly) in video conferencing.

The design is such that we believe that all filtering can be done "on the fly" and that there is no, or only negligible, increases in memory bandwidth. Insofar, we do not see a need to punt ARC into exotic profiles.

We do not believe that complex tables and such can be meaningfully used in capability exchange, as it was argued in Marrakech in conjunction with JVET-M0135. The number of options is simply to big to allow for meaningful cross-vendor interop, assuming offer-answer and similar limited-depth handshakes. Insofar, realistically, to support ARC in a meaningful way in a capability exchange scenario, we have to fallback to a handful, at most interop points. For example: no ARC, ARC with implicit factor of 4, full ARC. As an alternative, we could spec the required support for all ARC, and leave the restrictions in bitstream complexity to higher level SDOs. That's a strategic discussion we should have at some point anyway (beyond what we had already in the sub-profiling and flags context).

As for levels: we believe the basic design principle needs to be that, as a condition of bitstream conformance, the sample count of an upsampled pictures must fit into level of bitstream no matter how much upsampling is signalled in bitstream, and that all samples must fit into the upsampled coded picture. We note that this was not the case in H263+; there, it was possible that certain samples were not present.

1.2.5. JVET-N0118

The following aspects are proposed:
1) A list of picture resolutions is signalled in the SPS, and an index to the list is signalled in the PPS to specify the size of an individual picture.
2) For any picture that is to be outputted, the decoded picture before resampling is cropped (as necessary) and outputted, i.e., a resampled picture is not for output, only for inter prediction reference.
3) Support 1.5× and 2× resampling ratios. No support of arbitrary resampling ratio. Further study the need of one or two more other resampling ratios.
4) Between picture-level resampling and block-level resampling, the proponents prefer block-level resampling.
   a. However, if picture-level resampling is chosen, the following aspects are proposed:
      i. When a reference picture is resampled, both the resampled version and the original, resampled version of the reference picture are stored in the DPB, and thus both would affect the DPB fullness.
      ii. A resampled reference picture is marked as "unused for reference" when the corresponding un-resampled reference picture is marked as "unused for reference".
      iii. The RPL signalling syntax is kept unchanged, while the RPL construction process is modified as follows: When a reference picture needs to be included into a RPL entry, and a version of that reference picture with the same resolution as the current picture is not in the DPB, the picture resampling process is invoked and the resampled version of that reference picture is included into the RPL entry.
      iv. The number of resampled reference pictures that may be present in the DPB should be limited, e.g., to be less than or equal to 2.
   b. Otherwise (block-level resampling is chosen), the following are suggested:
      i. To limit the worst-case decoder complexity, it is proposed that bi-prediction of a block from a reference picture with a different resolution than the current picture is disallowed.
      ii. Another option is that, when resampling and quarter-pel interpolation need to be done, the two filters are combined and the operation is applied at once.
5) Regardless of which of the picture-based and block-based resampling approaches is chosen, it is proposed that temporal motion vector scaling is applied as needed.

1.2.5.1. Implementation

The ARC software was implemented on top of VTM-4.0.1, with the following changes:

A list of supported resolutions is signalled in SPS.

The spatial resolution signalling was moved from SPS to PPS.

A picture-based resampling scheme was implemented for resampling reference pictures. After a picture is decoded, the reconstructed picture may be resampled to a different spatial resolution. The original reconstructed picture and the resampled reconstructed picture are both stored in the DPB and are available for reference by future pictures in decoding order.

The implemented resampling filters are based on the filters tested in JCTVC-H0234, as follows:
  The up-sampling filter: 4-tap+/−quarter-phase DCTIF with taps (−4, 54, 16, −2)/64
  The down-sampling filter: the h11 filter with taps (1, 0, −3, 0, 10, 16, 10, 0, −3, 0, 1)/32

When constructing the reference picture lists of the current picture (i.e., L0 and L1), only the reference pictures with the same resolution as the current picture are used. Note that the reference pictures may be available in both their original sizes or the resampled sizes.

TMVP and ATVMP may be enabled; however, when the original coding resolutions of the current picture and a reference picture are different, TMVP and ATMVP are disabled for that reference picture.

For convenience and simplicity of the starting-point software implementation, when outputting a picture, the decoder outputs the highest available resolution.

1.2.5.2. On Signaling of Picture Sizes and Picture Output

1. On the list of spatial resolutions of coded pictures in the bitstream
   Currently all coded pictures in a CVS have the same resolution. Thus it is straightforward to signal just one resolution (i.e., picture width and height) in the SPS. With ARC support, instead of one resolution, a list of picture resolutions needs to be signalled, and we propose that this list is signalled in the SPS, and an index to the list is signalled in the PPS to specify the size of an individual picture.

2. On picture output
   We propose that, for any picture that is to be outputted, the decoded picture before resampling is cropped (as necessary) and outputted, i.e., a resampled picture is not for output, only for inter prediction reference. The ARC resampling filters should be designed to optimize the use of the resampled pictures for inter prediction, and such filters may not be optimal for picture outputting/displaying purpose, while video terminal devices usually have optimized output zooming/scaling functionalities already implemented.

1.2.5.3. On Resampling

Resampling of a decoded picture can be either picture-based or block-based. For the final ARC design in VVC, we prefer block-based resampling over picture-based resampling. We recommend that these two approaches are discussed and the WET makes a decision on which of these two should be specified for ARC support in VVC.

Picture-Based Resampling

In picture-based resampling for ARC, a picture is resampled only once for a particular resolution, which is then stored in the DPB, while the un-resampled version of the same picture is also kept in the DPB.

Employing picture-based resampling for ARC has two issues: 1) additional DPB buffer is required for storing resampled reference pictures, and 2) additional memory bandwidth is required since due to increased operations of reading reference picture data from the DPB and writing reference picture data into the DPB.

Keeping only one version of a reference picture in the DPB would not a good idea for picture-based resampling. If we keep only the un-resampled version, a reference picture may need to be resampled multiple times since multiple pictures may refer to the same reference picture, and. On the other hand, if a reference picture is resampled and we only keep the resampled version, then we need to apply inverse resampling when the reference picture needs to be outputted, since it's better to output un-resampled pictures, as discussed above. This is a problem since resampling process is not a lossless operation. Take a picture A and downsample it then upsample it to get A' with the same resolution as A, A and A' would not be the same; A' would contain less information than A since some high frequency information has been lost during the downsampling and upsampling processes.

To deal with the issues of additional DPB buffer and memory bandwidth, we proposed that, if the ARC design in VVC uses picture-based resampling, the following applies:
1. When a reference picture is resampled, both the resampled version and the original, resampled version of the reference picture are stored in the DPB, and thus both would affect the DPB fullness.
2. A resampled reference picture is marked as "unused for reference" when the corresponding un-resampled reference picture is marked as "unused for reference".
3. The reference picture lists (RPLs) of each tile group contain reference pictures that have the same resolution as the current picture. While there is no need for a change to the RPL signalling syntax, the RPL construction process is modified to ensure what is said in the previous sentence, as follows: When a reference picture needs to be included into a RPL entry while a version of that reference picture with the same resolution as the current picture is not yet available, the picture resampling process is invoked and the resampled version of that reference picture is included.
4. The number of resampled reference pictures that may be present in the DPB should be limited, e.g., to be less than or equal to 2.

Furthermore, to enable temporal MV usage (e.g. merge mode and ATMVP) for the case that the temporal MV comes from the reference frame with different resolution than the current one, we propose that, scaling temporal MV to the current resolution as needed.

Block-Based ARC Resampling

In block-based resampling for ARC, a reference block is resampled whenever needed, and no resampled picture is stored in the DPB.

The main issue here is the additional decoder complexity. This is because a block in a reference picture may be referred to multiple times by multiple blocks in another picture and by blocks in multiple pictures.

When a block in a reference picture is referred to by a block in the current picture and the resolutions of the reference picture and the current picture are different, the reference block is resampled by invocation of the interpolation filter such that the reference block has the integer-pel resolution. When the motion vector is in quarter-pel, the interpolation process is invoked again to obtain the resampled reference block in the quarter-pel resolution. Therefore, for each motion compensation operation for the current block from a reference block involving different resolutions, up to two, instead of one, interpolation filtering operations are needed. Without ARC support, up to only one interpolation filter operation (i.e., for generation of the reference block in the quarter-pel resolution) is needed.

To limit the worst-case complexity, we propose that, if the ARC design in VVC uses block-based resampling, the following apply:
  Bi-prediction of a block from a reference picture with a different resolution than the current picture is disallowed.
  To be more more precise, the constraint is as follow: For the current block blkA in the current picture picA refers to a reference block blkB in a reference picture picB, when picA and picB have different resolutions, block blkA shall be a uni-predicted block.

With this constraint, the worst-case number of interpolation operations needed to decode a block is limited to two. If a block refers to a block from a different-resolution picture, the number of interpolation operations needed is two as discussed above. This is the same as in the case when the block refers to a reference block from a same-resolution picture and coded as a bi-predicted block since the number of interpolation operations is also two (i.e., one for getting the quarter-pel resolution for each reference block).

To simplify the implementation, we propose another variation that if the ARC design in VVC uses block-based resampling, the following apply:
  If the reference frame and current frame have different resolutions, the corresponding positions of every pixel of predictors are calculated first, and then the interpolation is applied only one time. That is, two interpolation operations (i.e. one for resampling and one for quarter-pel interpolation) are combined into only one interpolation operation. The sub-pel interpolation filters in the current VVC can be reused, but, in this case, the granularity of interpolation should be enlarged but the interpolation operation times are reduced from two to one.
  To enable temporal MV usage (e.g. merge mode and ATMVP) for the case that the temporal MV comes from the reference frame with different resolution than the current one, we propose that, scaling temporal MV to the current resolution as needed.

Resampling Ratios

In JVET-M0135, to start the discussion on ARC, it was proposed that for the starting point of ARC, consider only the resampling ratio of 2× (meaning 2×2 for upsampling and ½×½ for downsampling). From further discussion on this topic after the Marrakech meeting, we learned that supporting only the resampling ratio of 2× is very limited, as in some cases a smaller difference between resampled and un-resampled resolutions would be more beneficial.

Although support of arbitrary resampling ratio may be desirable, it support seemed difficult. This is because to support arbitrary resampling ratio, the number of resampling filters that have to be defined and implemented seemed to be too many and to impose a significant burden on decoder implementations.

We propose that more than one but a small number of resampling ratios should be supported, but at least 1.5× and 2× resampling ratios, and arbitrary resampling ratio is not supported.

1.2.5.4. Max DPB Buffer Size and Buffer Fullness

With ARC, the DPB may contains decoded pictures of different spatial resolutions within the same CVS. For DPB management and related aspects, counting DPB size and fullness in units decoded picture no longer works.

Below are discussions of some specific aspects that need to be addressed and possible solutions in the final VVC specification if ARC is supported (we are not proposing to adopt the possible solutions at this meeting):

1. Rather than using the value of PicSizeInSamplesY (i.e., PicSizeInSamplesY=pic_width_in_luma_samples*pic_height_in_luma_samples) for deriving MaxDpb Size (i.e., maximum number of reference picture that may present in the DPB), derivation of MaxDpb Size is based on the value of MinPicSizeInSamplesY. MinPicSizeInSampleY defined as follows:

MinPicSizeInSampleY=(Width of the smallest picture resolution in the bitstream)*(Height of the smallest resolution in the bitstream)

The derivation of MaxDpb Size is modified as follows (based on the HEVC equation):

if(MinPicSizeInSamplesY<=(MaxLumaPs>>2))

MaxDpbSize=Min(4*maxDpbPicBuf,16)

else if(MinPicSizeInSamplesY<=(MaxLumaPs>>1))

MaxDpb Size=Min(2*maxDpbPicBuf,16)

else        if(MinPicSizeInSamplesY<=((3*MaxLumaPs)>>2))

MaxDpbSize=Min((4*maxDpbPicBuf)/3,16)

else

MaxDpbSize=maxDpbPicBuf

2. Each decoded picture is associated with a value called PictureSizeUnit. PictureSizeUnit is an integer value that specifies how big a decoded picture size is relative to the MinPicSizeInSampleY. The definition of PictureSizeUnit depends on what resampling ratios are supported for ARC in VVC.

For example, if ARC supports only the resampling ratio of 2, the PictureSizeUnit is defined as follows:
    Decoded pictures having the smallest resolution in the bitstream are associated with PictureSizeUnit of 1.
    Decoded pictures having the resolution that is 2 by 2 of the smallest resolution in the bitstream is associated with PictureSizeUnit of 4 (i.e., 1*4).

For another example, if ARC supports both the resampling ratios of 1.5 and 2, the PictureSizeUnit is defined as follows:
    Decoded pictures having the smallest resolution in the bitstream is associated with PictureSizeUnit of 4.
    Decoded pictures having the resolution that is 1.5 by 1.5 of the smallest resolution in the bitstream is associated with PictureSizeUnit of 9 (i.e., 2.25*4).
    Decoded pictures having the resolution that is 2 by 2 of the smallest resolution in the bitstream is associated with PictureSizeUnit of 16 (i.e., 4*4).

For other resampling rations supported by ARC, the same principle as given by the examples above should be used to determine the value of PictureSizeUnit for each picture size.

3. Let the variable MinPictureSizeUnit be the smallest possible value of PictureSizeUnit. That is, if ARC supports only resampling ratio of 2, MinPictureSizeUnit is 1; if ARC supports resampling ratios of 1.5 and 2, MinPictureSizeUnit is 4; likewise, the same principle is used to determine the value of MinPictureSizeUnit.

4. The value range of sps_max_dec_pic_buffering_minus1[i] is specified to range from 0 to (MinPictureSizeUnit*(MaxDpbSize−1)). The variable MinPictureSizeUnit is the smallest possible value of PictureSizeUnit.

5. The DPB fullness operation is specified based on PictureSizeUnit as follows:
    The HRD is initialized at decoding unit 0, with both the CPB and the DPB being set to be empty (the DPB fullness is set equal to 0).
    When the DPB is flushed (i.e., all pictures are removed from the DPB), the DPB fullness is set equal to 0.
    When a picture is removed from the DPB, the DPB fullness is decrement by the value of PictureSizeUnit associated with the removed picture.
    When a picture is inserted into the DPB, the DPB fullness is increment by the value of PictureSizeUnit associated with the inserted picture.

1.2.5.5. Resampling Filters

In the software implementation, the implemented resampling filters were simply taken from previously available filters described in JCTVC-H0234. Other resampling filters should be tested and used if they provide better performance and/or lower complexity. We propose that various resampling filters to be tested to strike a trade-off between complexity and performance. Such tests can be done in a CE.

1.2.5.6. Miscellaneous Necessary Modifications to Existing Tools

To support ARC, some modifications and/or additional operations may be needed to some of the existing coding tools. For example, in the ARC software implementation picture-based resampling, for simplicity we disabled TMVP and ATMVP when the original coding resolutions of current picture and reference picture are different.

1.2.6. JVET-N0279

Figure 14:
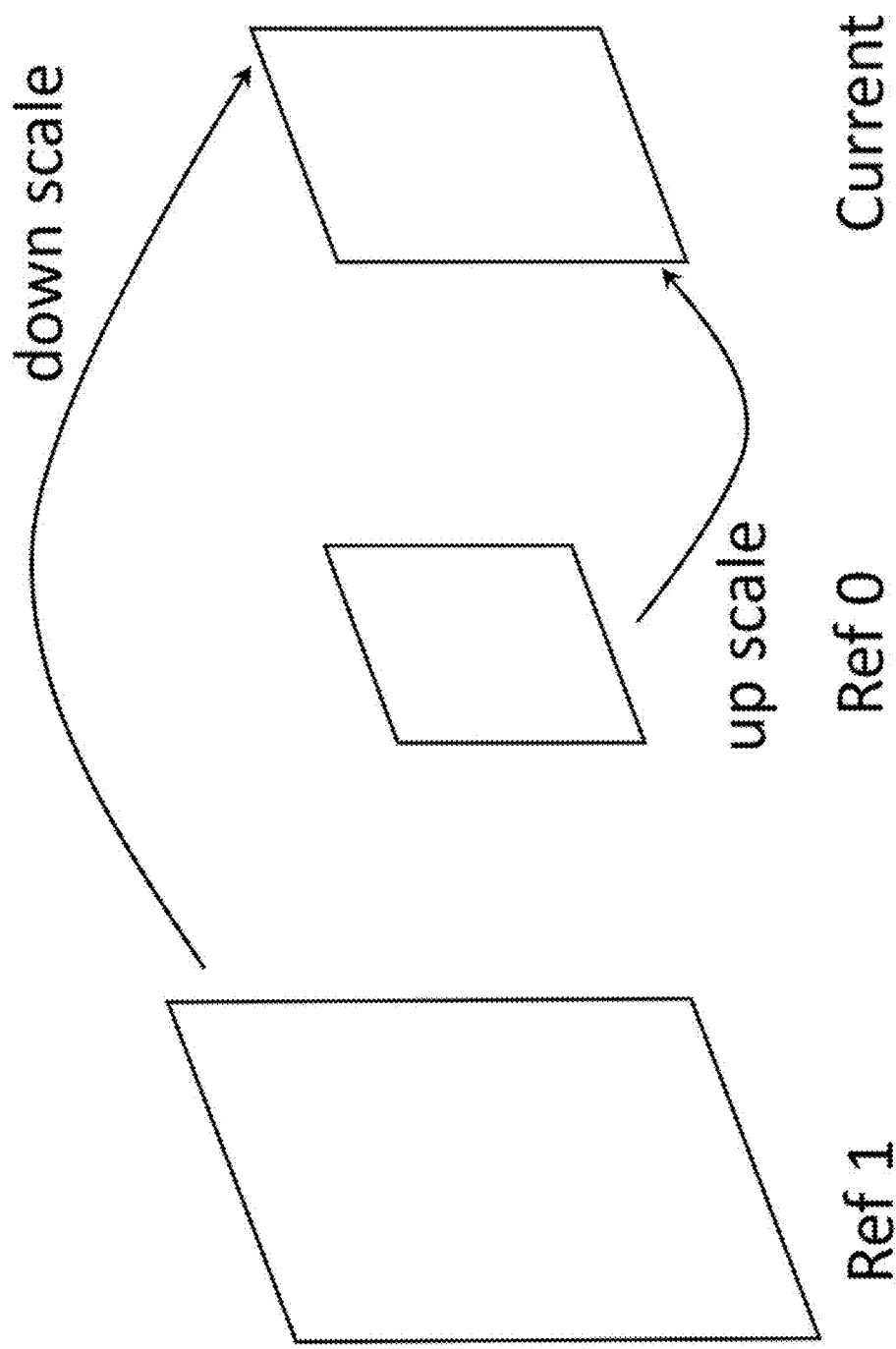
FIG. 14 shows an example of an ARC process.

According to "Requirements for a Future Video Coding Standard", "the standard shall support fast representation switching in the case of adaptive streaming services that offer multiple representations of the same content, each having different properties (e.g. spatial resolution or sample bit depth)." In real-time video communication, allowing resolution change within a coded video sequence without inserting an I picture can not only adapt the video data to dynamic channel conditions or user preference seamlessly, but also remove the beating effect caused by I pictures. A hypothetical example of adaptive resolution change is shown in FIG. 14 where the current picture is predicted from reference pictures of different sizes.

This contribution proposes high level syntax to signal adaptive resolution change as well as modifications to the current motion compensated prediction process in the VTM. These modifications are limited to motion vector scaling and subpel location derivations with no changes in the existing motion compensation interpolators. This would allow the existing motion compensation interpolators to be reused and not require new processing blocks to support adaptive resolution change which would introduce additional cost.

1.2.6.1. Adaptive Resolution Change Signalling 1.2.6.1.1. SPS

|  | Descriptor |
|---|---|
| seq_parameter_set_rbsp( ) { | |
| ... | |
| [[ pic_width_in_luma_samples ]] | [[ ue(v) ]] |
| [[ pic_height_in_luma_samples ]] | [[ ue(v) ]] |
| max_pic_width_in_luma_samples | ue(v) |
| max_pic_height_in_luma_samples | ue(v) |
| ... | |
| } | |

[[pic_width_in_luma_samples specifies the width of each decoded picture in units of luma samples. pic_width_in_luma_samples shall not be equal to 0 and shall be an integer multiple of MinCbSizeY.]]

[[pic_height_in_luma_samples specifies the height of each decoded picture in units of luma samples. pic_height_in_luma_samples shall not be equal to 0 and shall be an integer multiple of MinCbSizeY.]]

max_pic_width_in_luma_samples specifies the maximum width of decoded pictures referring to the SPS in units of luma samples. max_pic_width_in_luma_samples shall not be equal to 0 and shall be an integer multiple of MinCbSizeY.

max_pic_height_in_luma_samples specifies the maximum height of decoded pictures referring to the SPS in units of luma samples. max_pic_height_in_luma_samples shall not be equal to 0 and shall be an integer multiple of MinCbSizeY.

1.2.6.1.2. PPS

|  | Descriptor |
|---|---|
| pic_parameter_set_rbsp( ) { | |
| ... | |
| pic_size_different_from_max_flag | u(1) |
| if (pic_size_different_from_max_flag) { | |
| pic_width_in_luma_samples | ue(v) |
| pic_height_in_luma_samples | ue(v) |
| } | |
| ... | |
| } | | pic_size_different_from_max_flag equal to 1 specifies that the PPS signals different picture width or picture height from the max_pic_width_in_luma_samples and max_pic_height_in_luma_sample in the referred SPS. pic_size_different_from_max_flag equal to 0 specifies that pic_width_in_luma_samples and pic_height_in_luma_sample are the same as max_pic_width_in_luma_samples and max_pic_height_in_luma_sample in the referred SPS.

pic_width_in_luma_samples specifies the width of each decoded picture in units of luma samples. pic_width_in_luma_samples shall not be equal to 0 and shall be an integer multiple of MinCbSizeY. When pic_width_in_luma_samples is not present, it is inferred to be equal to max_pic_width_in_luma_samples pic_height_in_luma_samples specifies the height of each decoded picture in units of luma samples. pic_height_in_luma_samples shall not be equal to 0 and shall be an integer multiple of MinCbSizeY. When pic_height_in_luma_samples is not present, it is inferred to be equal to max_pic_height_in_luma_samples.

It is a requirement of bitstream conformance that horizontal and vertical scaling ratios shall be in the range of ⅛ to 2, inclusive for every active reference picture. The scaling ratios are defined as follows:

horizontal scaling ratio=((referencepic_width_in_luma_samples<<14)+(pic_width_in_luma_samples/2))/pic_width_in_luma_samples vertical scaling ratio=((referencepic_height_in_luma_samples<<14)+(pic_height_in_luma_samples/2))/pic_height_in_luma_samples

|  | Descriptor |
|---|---|
| tile_group_header( ) { | |
| ... | ue(v) |
| if ( tile_group_type != I ) { | |
| if( sps_temporal_mvp_enabled_flag ) | |
| tile_group_temporal_mvp_enabled_flag | u(1) |
| if( tile_group_type = = B ) | |
| mvd_l1_zero_flag | u(1) |
| if( tile_group_temporal_mvp_enabled_flag ) { | |
| if( tile_group_type = = B ) | |
| collocated_from_l0_flag | u(1) |
| } | |
| six_minus_max_num_merge_cand | ue(v) |
| if( sps_affine_enable_flag ) | |
| five_minus_max_num_subblock_merge_cand | ue(v) |
| } | |
| ... | |
| } | |

Reference Picture Scaling Process

When there is a resolution change within a CVS, a picture may have a different size from one or more of its reference pictures. This proposal normalizes all motion vectors to the current picture grid instead of their corresponding reference picture grids. This is asserted to be beneficial to keep the design consistent and make resolution changes transparent to the motion vector prediction process. Otherwise, neighboring motion vectors pointing to reference pictures with different sizes cannot be used directly for spatial motion vector prediction due to the different scale.

When a resolution change happens, both the motion vectors and reference blocks have to be scaled while doing motion compensated prediction. The scaling range is limited to [⅛, 2], i.e. the upscaling is limited to 1:8 and downscaling is limited to 2:1. Note that upscaling refers to the case where the reference picture is smaller than the current picture, while downscaling refers to the case where the reference picture is larger than the current picture. In the following sections, the scaling process is described in more detail.

Luma Block

The scaling factors and their fixed-point representations are defined as $$\text{hori\_scale\_fp} = \frac{(\text{width}_{ref} \ll 14) + \left(\frac{\text{width}_{cur}}{2}\right)}{\text{width}_{cur}}, \quad (1)$$

$$\text{vert\_scale\_fp} = \frac{(\text{height}_{ref} \ll 14) + \left(\frac{\text{height}_{cur}}{2}\right)}{\text{height}_{cur}}. \quad (2)$$

The scaling process includes two parts:
1. Map the upper left corner pixel of the current block to the reference picture;
2. Use the horizontal and vertical step sizes to address the reference locations of the current block's other pixels.

If the coordinate of the upper left corner pixel of the current block is (x, y), the subpel location (x', y') in the reference picture pointed to by a motion vector (mvX, mvY) in units of $1/16^{th}$ pel is specified as follows:

The horizontal location in the reference picture is $$x' = ((x<<4) + mvX) \cdot \text{hori\_scale\_fp}, \quad (3)$$

and x' is further scaled down to only keep 10 fractional bits $$x' = \text{Sign}(x') \cdot ((\text{Abs}(x') + (1<<7))>>8). \quad (4)$$

Similarly, the vertical location in the reference picture is $$y' = ((y<<4) + mvY) \cdot \text{vert\_scale\_fp}, \quad (5)$$

and y' is further scaled down to $$y' = \text{Sign}(y') \cdot ((\text{Abs}(y') + (1<<7))>>8). \quad (6)$$

At this point, the reference location of the upper left corner pixel of the current block is at (x', y'). The other reference subple/pel locations are calculated relative to (x', y') with horizontal and vertical step sizes. Those step sizes are derived with $1/1024$-pel accuracy from the above horizontal and vertical scaling factors as follows:

$$x\_\text{step} = (\text{hori\_scale\_fp} + 8) >> 4, \quad (7)$$

$$y\_\text{step} = (\text{vert\_scale\_fp} + 8) >> 4. \quad (8)$$

As an example, if a pixel in the current block is i-column and j-row away from the upper left corner pixel, its corresponding reference pixel's horizontal and vertical coordinates are derived by $$x'_i = x' + i * x\_\text{step}, \quad (9)$$

$$y'_j = +j * y\_\text{step}. \quad (10)$$

In subpel interpolation, $x'_i$ and $y'_j$ have to be broken up into full-pel parts and fractional-pel parts:
The full-pel parts for addressing reference block are equal to $$(x'_i + 32) >> 10, \quad (11)$$

$$(y'_j + 32) >> 10. \quad (12)$$

The fractional-pel parts used to select interpolation filters are equal to $$\Delta x = ((x'_i + 32) >> 6) \& 15, \quad (13)$$

$$\Delta y = ((y'_j + 32) >> 6) \& 15. \quad (14)$$

Once the full-pel and fractional-pel locations within a reference picture are determined, the existing motion compensation interpolators can be used without any additional changes. The full-pel location will be used to fetch the reference block patch from the reference picture and the fractional-pel location will be used to select the proper interpolation filter.

Chroma Block

When the chroma format is 4:2:0, chroma motion vectors have $1/32$-pel accuracy. The scaling process of chroma motion vectors and chroma reference blocks is almost the same as for luma blocks except a chroma format related adjustment.

When the coordinate of the upper left corner pixel of the current chroma block is ($x_c$, $y_c$), the initial horizontal and vertical locations in the reference chroma picture are $$x_c' = ((x_c << 5) + mvX) \cdot \text{hori\_scale\_fp}, \quad (1)$$

$$y_c' = ((y_c << 5) + mvY) \cdot \text{vert\_scale\_fp}, \quad (2)$$

where mvX and mvY are the original luma motion vector but now should be examined with $1/32$-pel accuracy.

$x_c'$ and $y_c'$ are further scaled down to keep $1/1024$ pel accuracy $$x_c' = \text{Sign}(x_c') \cdot ((\text{Abs}(x_c') + (1<<8))>>9), \quad (3)$$

$$y_c' = \text{Sign}(y_c') \cdot ((\text{Abs}(y_c') + (1<<8))>>9). \quad (4)$$

Compared to the associated luma equations, the above right shift is increased by one extra bit.

The step sizes used are the same as for luma. For a chroma pixel at (i, j) relative to the upper left corner pixel, its reference pixel's horizontal and vertical coordinates are derived by $$x_{c_i}' = x_c' + i * x\_\text{step}, \quad (5)$$

$$y_{c_j}' = y_c' + j * y\_\text{step}. \quad (6)$$

In subpel interpolation, $x_{c_i}'$ and $y_{c_j}'$ are also broken up into full-pel parts and fractional-pel parts:
The full-pel parts for addressing reference block are equal to $$(x_{c_i}' + 16) >> 10, \quad (7)$$

$$(y_{c_j}' + 16) >> 10, \quad (8)$$

The fractional-pel parts used to select interpolation filters are equal to $$\Delta x = ((x_{c_i}' + 16) >> 5) \& 31, \quad (9)$$

$$\Delta y = ((y_{c_j}' + 16) >> 5) \& 31. \quad (10)$$

Interaction with Other Coding Tools

Because of the extra complexity and memory bandwidth associated with the interaction of some coding tools with reference picture scaling, it is recommended to add the following restrictions to the VVC specification:
When tile_group_temporal_mvp_enabled_flag is equal to 1, the current picture and its collocated picture shall have the same size.
When resolution change is allowed within a sequence, decoder motion vector refinement shall be turned off.
When resolution change is allowed within a sequence, sps_bdof_enabled_flag shall be equal to 0.

1.3. Coding Tree Block (CTB)-Based Adaptive Loop Filter (ALF) in JVET-N0415

Slice-Level Temporal Filter

Adaptive parameter set (APS) was adopted in VTM4. Each APS contains one set of signalled ALF filters, up to 32 APSs are supported. In the proposal, slice-level temporal filter is tested. A tile group can re-use the ALF information from an APS to reduce the overhead. The APSs are updated as a first-in-first-out (FIFO) buffer.

CTB Based ALF

For luma component, when ALF is applied to a luma CTB, the choice among 16 fixed, 5 temporal or 1 signaled filter sets is indicated. Only the filter set index is signalled. For one slice, only one new set of 25 filters can be signaled. If a new set is signalled for a slice, all the luma CTBs in the same slice share that set. Fixed filter sets can be used to predict the new slice-level filter set and can be used as candidate filter sets for a luma CTB as well. The number of filters is 64 in total.

For chroma component, when ALF is applied to a chroma CTB, if a new filter is signalled for a slice, the CTB used the new filter, otherwise, the most recent temporal chroma filter satisfying the temporal scalability constrain is applied.

As the slice-level temporal filter, the APSs are updated as a first-in-first-out (FIFO) buffer.

1.4. Alternative Temporal Motion Vector Prediction (a.k.a. Subblock-Based Temporal Merging Candidate in VVC)

Figure 15:
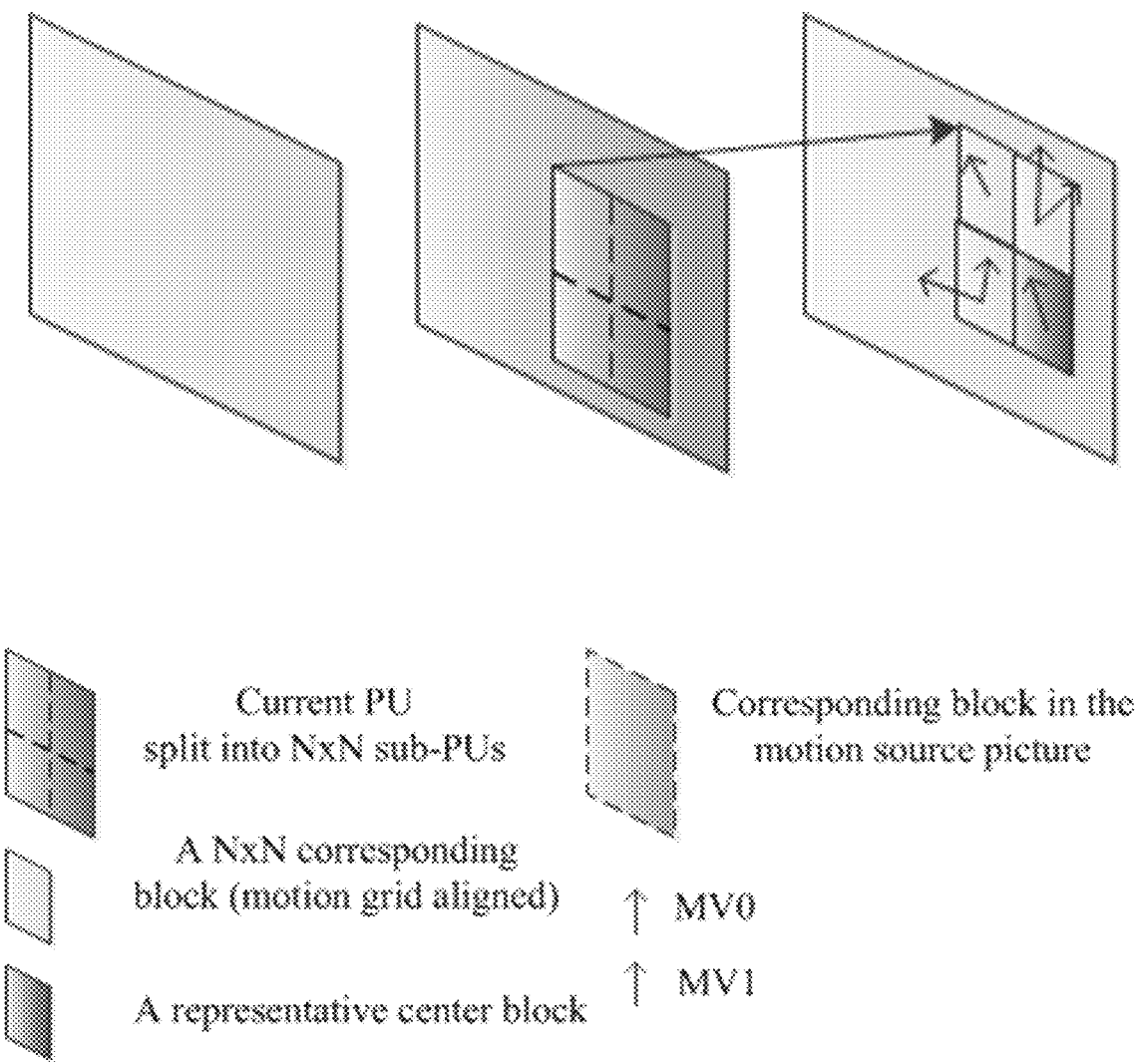
FIG. 15 shows an example of alternative temporal motion vector prediction (ATMVP) for a coding unit.

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 15, the sub-CUs are square N×N blocks (N is set to 8 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 15.

In the first step, a reference picture and the corresponding block is determined by the motion information of the spatial neighbouring blocks of the current CU. To avoid the repetitive scanning process of neighbouring blocks, the merge candidate from block A0 (the left block) in the merge candidate list of the current CU is used. The first available motion vector from block A0 referring to the collocated reference picture are set to be the temporal vector. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply.

1.5. Affine Motion Prediction

Figure 16A:
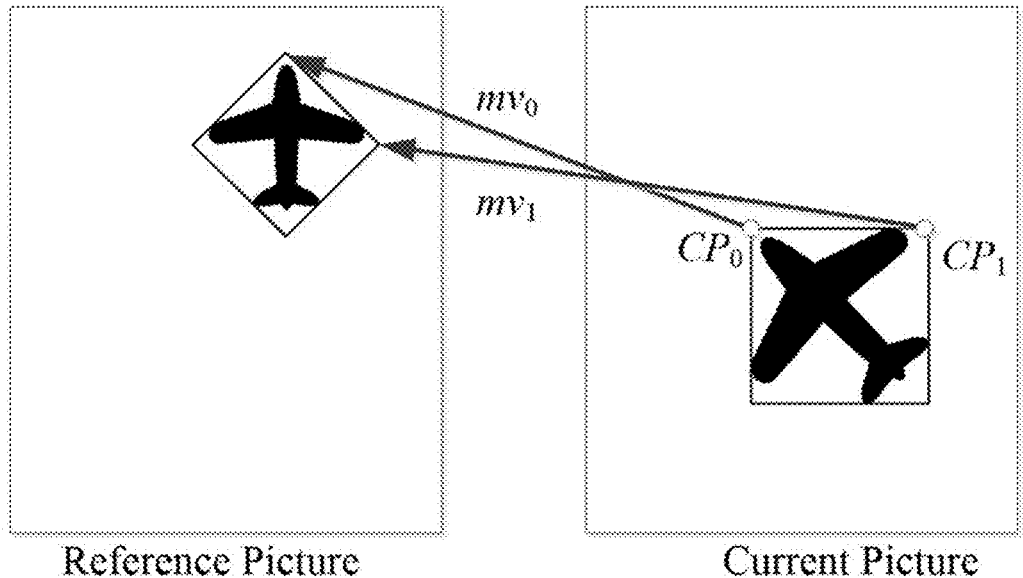
FIG. 16A and FIG. 16B show examples of a simplified affine motion model.
Figure 16B:
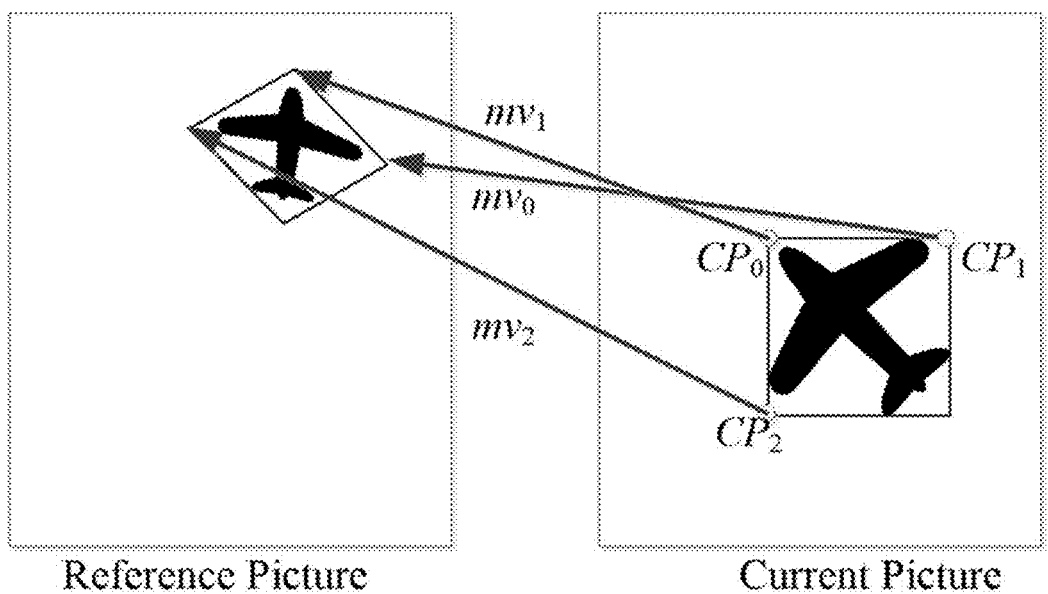

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 16, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{w}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 17:
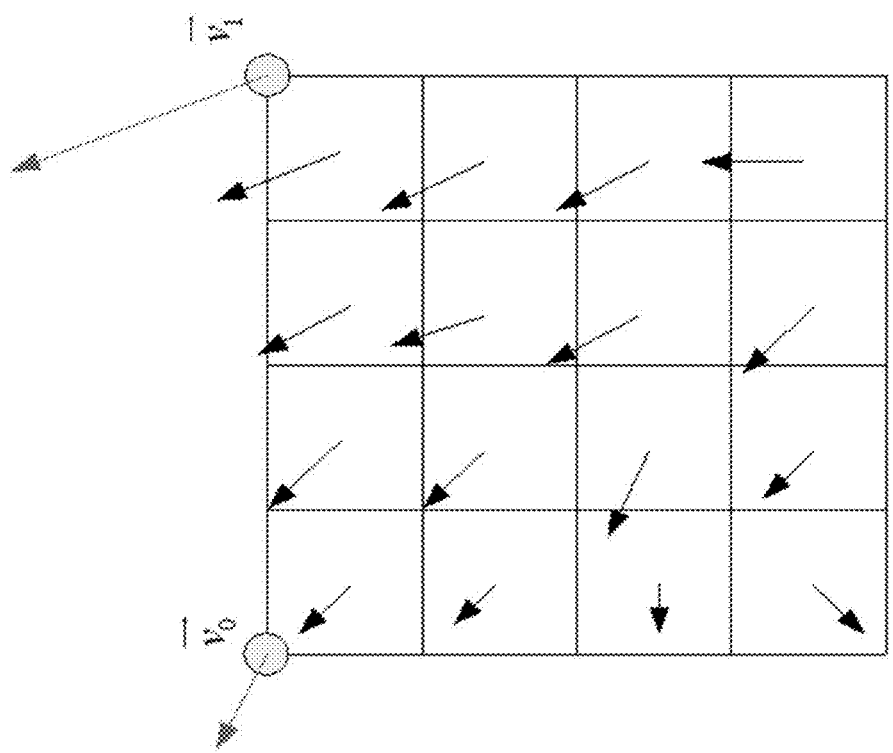
FIG. 17 shows an example of an affine motion vector field (MVF) per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 17, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

1.5.1. Signaling of Affine Prediction

Similar to the translational motion model, there are also two modes for signaling the side information due affine prediction. They are AFFINE_INTER and AFFINE_MERGE modes.

1.5.2. AF_INTER Mode

For CUs with both width and height larger than 8, AF_INTER mode can be applied. An affine flag in CU level is signalled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 18) and the estimated CPMVs are signalled. In addition, the index of affine AMVP candidate from which the estimated CPMVs are derived is further signalled.

(1) Inherited Affine Motion Predictors

Figure 19:
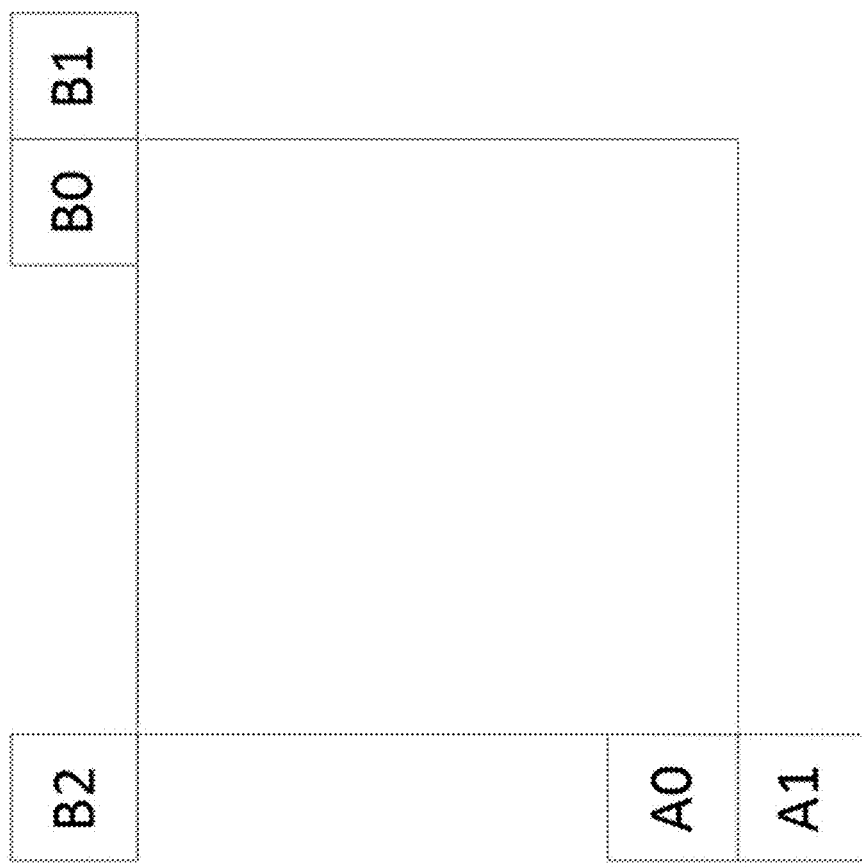
FIG. 19 shows an example of a motion vector prediction (MVP) for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 19.

Figure 21A:
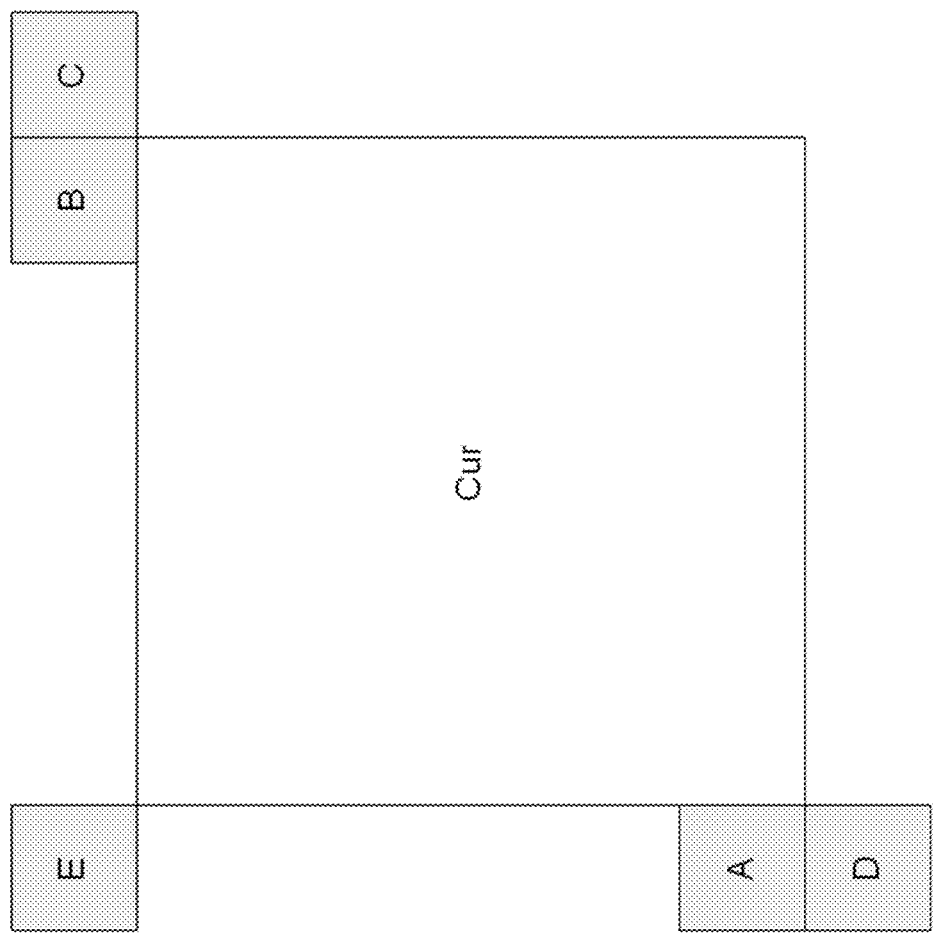
FIGS. 21A and 21B show examples of candidates for AF_MERGE.
Figure 21B:
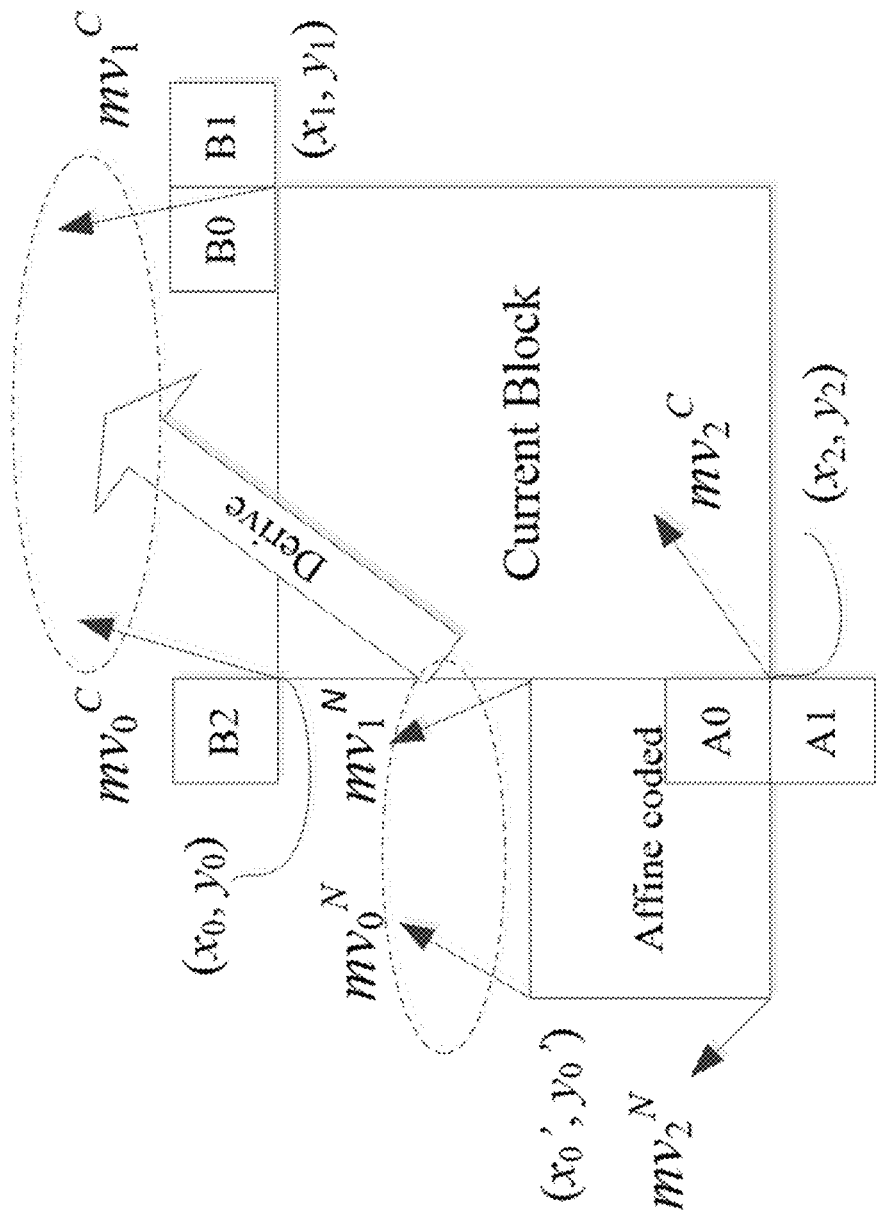

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 21B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

(2) Constructed Affine Motion Predictors

Figure 20:
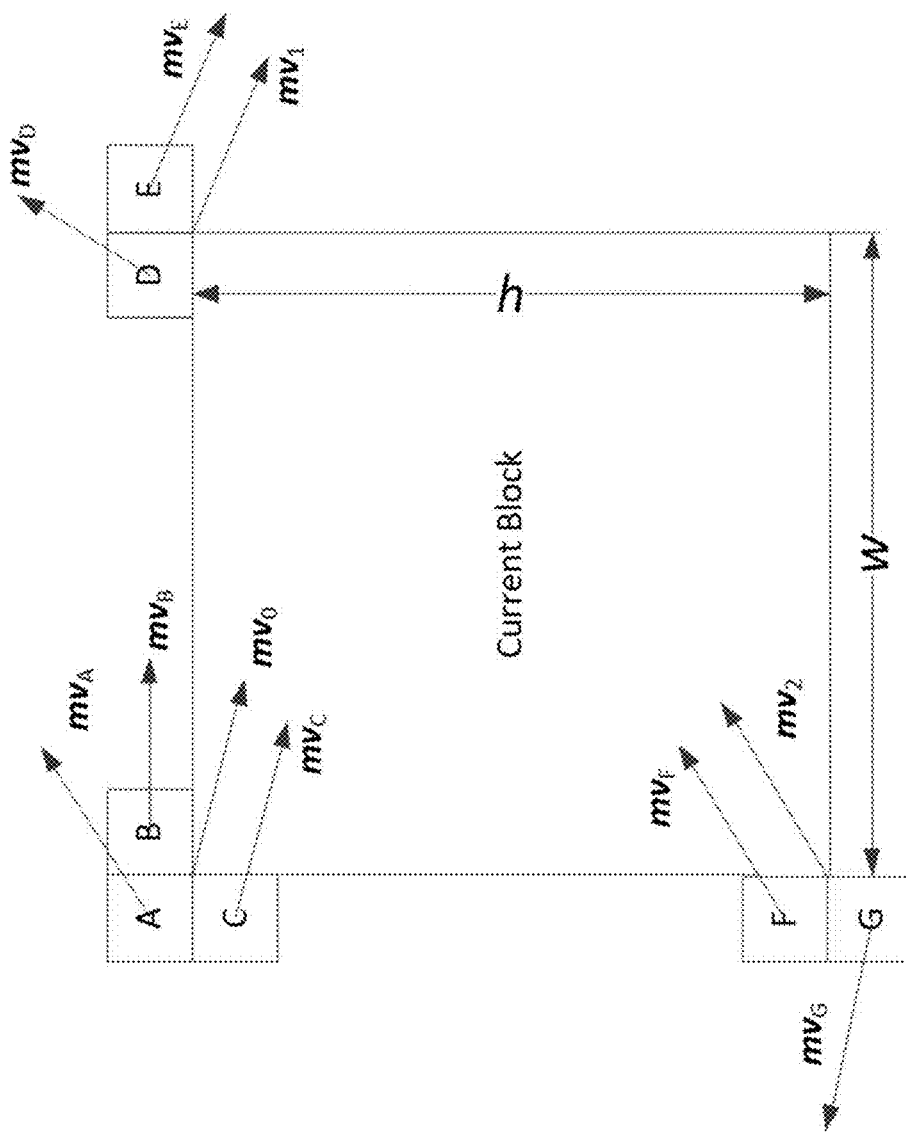
FIG. 20 shows an example of an MVP for AF_INTER for constructed affine candidates.

A constructed affine motion predictor consists of control-point motion vectors (CPMVs) that are derived from neighboring inter coded blocks, as shown in FIG. 20 that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

1) Normal AMVP motion predictors

The following applies until the number of affine motion predictors reaches the maximum.

1) Derive an affine motion predictor by setting all CPMVs equal to $\overline{mv}_2$ if available.
2) Derive an affine motion predictor by setting all CPMVs equal to $\overline{mv}_1$ if available.
3) Derive an affine motion predictor by setting all CPMVs equal to $\overline{mv}_0$ if available.
4) Derive an affine motion predictor by setting all CPMVs equal to HEVC TMVP if available.
5) Derive an affine motion predictor by setting all CPMVs to zero MV.

Note that $\overline{mv}_i$ is already derived in constructed affine motion predictor.

Figure 18A:
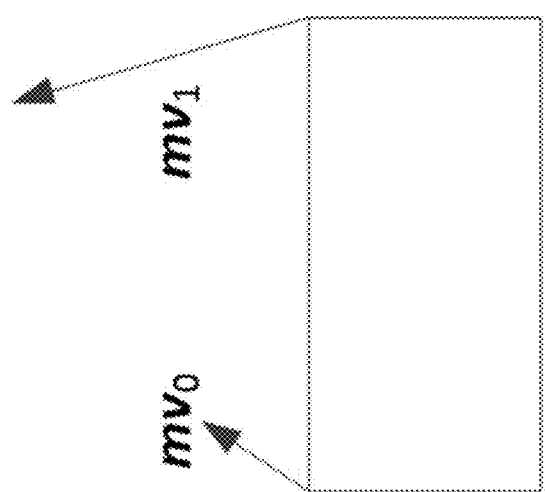
FIGS. 18A and 18B show an example of the 4-parameter affine model and the 6-parameter affine model, respectively.
Figure 18B:
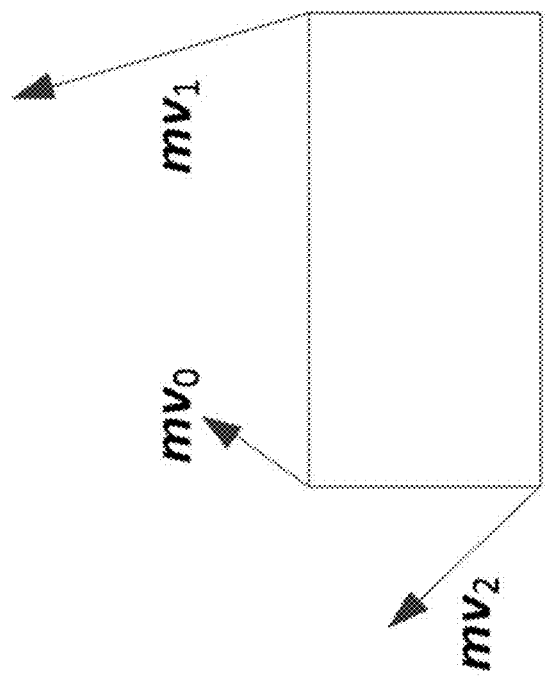

In AF_INTER mode, when 4/6-parameter affine mode is used, 2/3 control points are required, and therefore 2/3 MVD needs to be coded for these control points, as shown in FIGS. 18A and 18B. In JVET-K0337, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 18B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

1.5.2.1. AF_MERGE Mode

When a CU is applied in AF_MERGE mode, it gets the first block coded with affine mode from the valid neighbour reconstructed blocks. And the selection order for the candidate block is from left, above, above right, left bottom to above left as shown in FIG. 21A (denoted by A, B, C, D, E in order). For example, if the neighbour left bottom block is coded in affine mode as denoted by A0 in FIG. 21B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores $mv_0$, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU $mv_0^C$, $mv_1^C$ and $mv_2^C$ are derived, according to the simplified affine motion model Equation (1) and (2), the MVF of the current CU is generated. In order to identify whether the current CU is coded with AF_MERGE mode, an affine flag is signalled in the bitstream when there is at least one neighbour block is coded in affine mode.

In JVET-L0142 and JVET-L0632, an affine merge candidate list is constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

Figure 22:
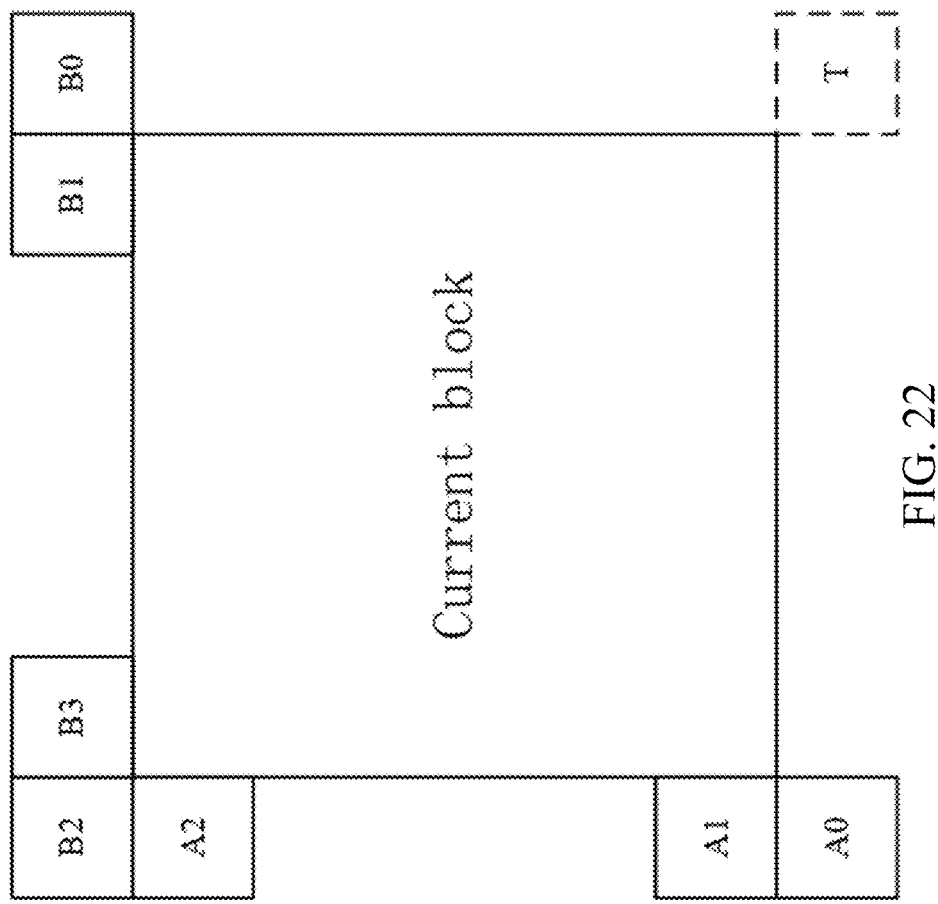
FIG. 22 shows an example of candidate positions for affine merge mode.

If the number of candidates in affine merge candidate list is less than MaxNumAffineCand (e.g., 5), constructed affine candidates are inserted into the candidate list. Constructed affine candidate means the candidate is constructed by combining the neighbor motion information of each control point.

a) The motion information for the control points is derived firstly from the specified spatial neighbors and temporal neighbor shown in FIG. 22 CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.
For CP3, the checking priority is A1→A0.
For CP4, T is used.

b) Secondly, the combinations of controls points are used to construct an affine merge candidate.

I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

II. Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

III. The combinations of constructed affine candidates are inserted into to candidate list as following order: {CP1, CP2, CP3}, {CP1, CP2, CP4}, {CP1, CP3, CP4}, {CP2, CP3, CP4}, {CP1, CP2}, {CP1, CP3} i. For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

3) Padding with Zero Motion Vectors

If the number of candidates in affine merge candidate list is less than 5, zero motion vectors with zero reference indices are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

2. Drawbacks of Existing Implementations

When applied in VVC, ARC may have the following problems:

1. It is still unclear how to signal information related to ARC.
2. It is still unclear how to apply affine/TMVP or ATMVP when the reference picture, collocated picture and the current picture do not have the same resolution.
3. The design for down-sampling or up-sampling filter for ARC may be better designed.

3. Example Methods for Adaptive Resolution Conversion

The detailed inventions below should be considered as examples to explain general concepts. These inventions should not be interpreted in a narrow way. Furthermore, these inventions can be combined in any manner.

In the following discussion, SatShift(x, n) is defined as $$SatShift(x, n) = \begin{cases} (x + offsset0) \gg n & \text{if } x \geq 0 \\ -((-x + \text{offset1}) \gg n) & \text{if } x < 0 \end{cases}$$

Shift(x, n) is defined as Shift(x, n)=(x+offset0)>>n.

In one example, offset0 and/or offset1 are set to (1<<n)>>1 or (1<<(n−1)). In another example, offset0 and/or offset1 are set to 0.

In another example, offset0=offset1=((1<<n)>>1)−1 or ((1<<(n−1)))−1.

Clip3(min, max, x) is defined as $$Clip3(Min, Max, x) = \begin{cases} Min & \text{if } x < Min \\ Max & \text{if } x > Max \\ x & \text{Otherwise} \end{cases}$$

Floor(x) is defined as the largest integer less than or equal to x.

Ceil(x) the smallest integer greater than or equal to x.

Log 2(x) is defined as the base-2 logarithm of x.

Signaling for ARC

1. It is proposed that the picture dimension information (width and/or height) related to ARC may be signaled in a video unit other than DPS, VPS, SPS, PPS, APS, picture header, slice header, tile group header.
   a. In one example, the picture dimension information related to ARC may be signaled in a Supplemental Enhancement Information (SEI) message.
   b. In one example, the picture dimension information related to ARC may be signaled in an individual video unit for ARC. For example, the video unit may be named as Resolution Parameter Set (RPS), or Conversion Parameter Set (CPS), or any other names.
      i. In one example, there may be more than one combination of width and height are signaled in an individual video unit for ARC, such as RPS or CPS to be named.
2. It is proposed that the picture dimension (width or height) may be signaled not as 0-th order Exponential Golomb code.
   a. In one example, it may be coded with fixed-length code or unary code.
   b. In one example, it may be coded with K-th (K>0) Exponential Golomb code.
   c. The dimension may be signaled in a video unit, such as DPS, VPS, SPS, PPS, APS, picture header, slice header, tile group header etc., or in an individual video unit for ARC such as RPS or CPS to be named.
3. It is proposed to signal the resolution ratios instead of signaling multiple resolution.
   a. In one example, indications of one base resolution may be signaled. In addition, indications of the allowed ratio combinations (such as horizontal ratio, vertical ratio) may be further signaled.
   b. In one example, an index of the indications of the allowed ratio combination may be signaled in PPS to indicate the actual resolution for one picture.

4. It is proposed that when more than one combination of picture width and height are signaled in a single video unit, such as DPS, VPS, SPS, PPS, APS, picture header, slice header, tile group header etc., or in an individual video unit for ARC such as RPS or CPS to be named, it is disallowed that the width and height in a first combination are both equal to the width and height in a second combination.
5. It is proposed that signaled dimensions (width W and height H) must be in a constrain.
   a. For example, W should satisfy TW_min<=W<=TW_max.
   b. For example, H should satisfy TH_min<=H<=TH_max.
   c. In one example, W−TW_min−B may be signaled, where B is a fixed value such as 0.
   d. In one example, H−TH_min−B may be signaled, where B is a fixed value such as 0.
   e. In one example, TW_max−W−B may be signaled, where B is a fixed value such as 0.
   f. In one example, TH_max−H−B may be signaled, where B is a fixed value such as 0.
   g. In one example, TW_min and/or TH_min may be signaled.
   h. In one example, TW_max and/or TH_max may be signaled.
6. It is proposed that the signaled dimensions (width W and height H) must be in a form of W=w*X and H=h*Y, where X and Y are predefined integers, e.g. X=Y=4.
   a. In one example, w and h are signaled. W and H are derived from w and h.
7. It is proposed that the picture dimension information (width and/or height) may be coded in a predictive way.
   a. In one example, the difference between a first width (W1) and a second width (W2), i.e. W2−W1, may be signaled.
      i. Alternatively, W2−W1−B may be signaled, where B is a fixed value such as 1.
      ii. In one example, the W2 should be larger than W1.
      iii. In one example, the difference may be coded with unary code, or truncated unary code, or fixed length code, or fixed length coding.
   b. In one example, the difference between a first height (H1) and a second height (H2), i.e. H2−H1, may be signaled.
      i. Alternatively, H2−H1−B may be signaled, where B is a fixed value such as 1.
      ii. In one example, the H2 should be larger than H1.
      iii. In one example, the difference may be coded with unary code, or truncated unary code, or fixed length code, or fixed length coding.
   c. In one example, the ratio between a first width (W1) and a second width (W2), i.e. W2/W1, may be signaled. For example, F is signaled if W2=F*W1. In another example, F is signaled if W2=Shift(F*W1, P), where P is a number representing precision, e.g. P=10.
      i. Alternatively, F may be equal to (W2*P+W1/2)/W1, where P is a number representing precision, e.g. P=10.
      ii. Alternatively, F−B may be signaled, where B is a fixed value such as 1.
      iii. In one example, the W2 should be larger than W1.
      iv. In one example, F may be coded with unary code, or truncated unary code, or fixed length code, or fixed length coding.
   d. In one example, the ratio between a first height (H1) and a second height (H2), i.e. H2/H1, may be signaled. For example, F is signaled if H2=F*H1. In another example, F is signaled if H2=Shift(F*H1, P), where P is a number representing precision, e.g. P=10.
      i. Alternatively, F may be equal to (H2*P+H1/2)/H1, where P is a number representing precision, e.g. P=10.
      ii. Alternatively, F−B may be signaled, where B is a fixed value such as 1.
      iii. In one example, the H2 should be larger than H1.
      iv. In one example, the difference may be coded with unary code, or truncated unary code, or fixed length code, or fixed length coding.
   e. In one example, W2/W1 must be equal to H2/H1, and only W2/W1 or H2/H1 should be signaled.
8. It is proposed that when signaling a different resolution/a resolution ratio, the following additional syntax elements may be further signaled.
   a. The syntax element may be the indication of CTU size.
   b. The syntax element may be the indication of minimum coding unit size.
   c. The syntax element may be the indication of maximum and/or minimum transform block size.
   d. The syntax element may be the indication of maximum depth of Quad-tree, and/or binary tree/ternary tree.
   e. In one example, the additional syntax elements may be binding with specific picture resolution.

Reference Picture List

9. A conformance bitstream shall satisfy that reference pictures in different resolution from the current picture shall be assigned with larger reference indices compared to those with the same resolution.
   a. Alternatively, before decoding one picture/slice/tile/tile group, the reference picture list may be reordered that for a reference picture list, the reference pictures in different resolution from the current picture shall be assigned with larger reference indices compared to those with the same resolution.

Motion Prediction from Temporal Blocks (e.g., TMVP and ATMVP) with ARC

10. Suppose there are two blocks, A and B. If block A's reference picture is a reference picture with the same resolution as the current block, and block B's reference picture is a reference picture with a different resolution as the current block, it is proposed to disallow using block B's motion information to predict block A.
    a. If block A's reference picture is a reference picture with a different resolution as current block, and block B's reference picture is a reference picture with same resolution as the current block, it is proposed to disallow using block B's motion information to predict block A.
11. It is proposed to disallow prediction from a block in a reference picture which is with different resolution as the current picture.
12. It is proposed that a reference picture cannot be the collocated reference picture if its width is different from the width of the current picture or its height is different from the height of the current picture.
    b. Alternatively, a reference picture cannot be the collocated reference picture if its width is different from the width of the current picture and its height is different from the height of the current picture.

Figure 23:
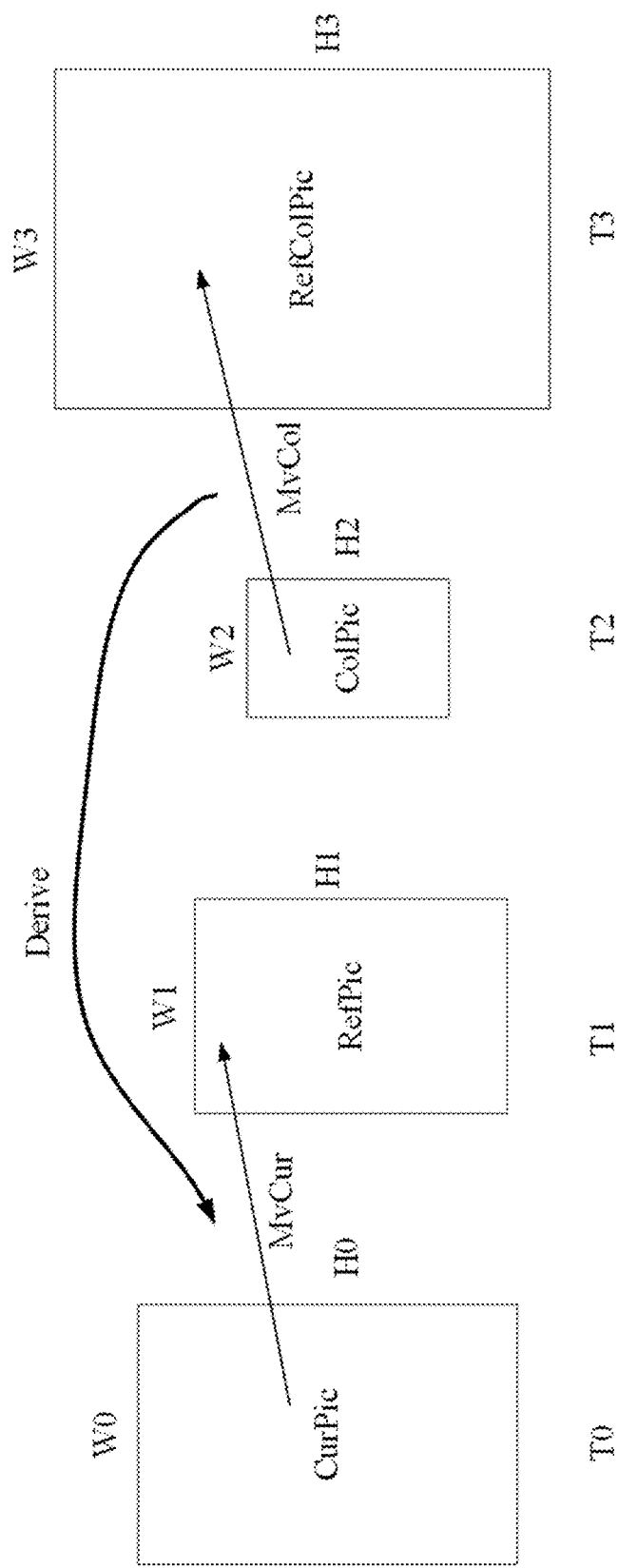
FIG. 23 shows an example of deriving TMVP/ATMVP with ARC.

13. How to find the collocated block in TMVP/ATMVP or collocated sub-block in ATMVP may depend on whether the collocated reference picture and the current picture have the same picture width and height.
    a. In one example, suppose the current picture dimensions are W0*H0, and the collocated reference picture dimensions are W1*H1, then the position and/or dimensions of the collocated block may depend on W0, H0, W1 and H1.
        i. In one example, suppose the top-left coordinate of the current block or sub-block is (x, y), then the collocated block or sub-block may be derived as a block covering a position (x', y') in the collocated reference picture, where (x', y') may be calculated as x'=Rx*(x+offsetX)+offsetX' and y'=Ry*(y+offsetY)+offsetY'. offsetX' and offsetY' are values such as 0.
            1) In one example, suppose the dimensions for the current block or current sub-block is w*h, (offsetX, offsetY) may be equal to (x+w, y+h).
                a) In an alternative example, (offsetX, offsetY) may be equal to (x+w/2, y+h/2).
                b) In an alternative example, (offsetX, offsetY) may be equal to (x+w/2−1, y+h/2−1).
                c) In an alternative example, (offsetX, offsetY) may be equal to (0, 0).
            2) In one example, Rx=W1/W0.
            3) In one example, Ry=H1/H0.
            4) In one alternative example, x'=Shift(Rx*(x+offsetX), P), where P is a value representing the precision, such as 10.
                a) Rx may be derived as Rx=(W1*P+offset)/W0, where offset is an integer such as 0 or W0/2.
            5) In one alternative example, y'=Shift(Ry*(y+offsetY), P), where P is a value representing the precision, such as 10.
                a) Ry may be derived as Ry=(H1*P+offset)/H0, where offset is an integer such as 0 or H0/2.
14. In addition to up-sampling or down-sampling the reference samples in reference pictures with a different resolution from the current picture, it is proposed to further up-sampling or down-sampling the motion information/code information and up-sampled or down-sampled information may be utilized for coding following blocks in other frames.
15. It is proposed that if the width or the height of the collocated reference picture is different from the width or the height of the current picture, the buffer storing MVs of the collocated may be up-sampled or down-sampled.
    b. In one example, the up-sampled or down-sampled MV buffer and the MV buffer before up-sampling or down-sampling may be both stored.
        i. Alternatively, the MV buffer before up-sampling or down-sampling may be removed.
    c. In one example, multiple MVs in the up-sampled MV buffer are copied from a one MV in the MV buffer before up-sampling.
        i. For example, the multiple MVs in the up-sampled MV buffer may be in a region corresponding to the region where the MV is in the MV buffer before up-sampling.
    d. In one example, one MV in the down-sampled MV buffer may be picked from one of multiple MVs in the MV buffer before down-sampling.
        i. For example, the one MV in the down-sampled MV buffer may be in a region corresponding to the region where the multiple MVs are in the MV buffer before down-sampling.
16. It is proposed that the derivation of temporal MV in ATMVP may depend on the dimensions W0*H0 of the current picture and the dimensions W1*H1 of the collocated picture.
    c. For example, the temporal MV denoted as tMV may be converted to tMV' if the dimensions of the collocated picture and the dimensions of the current picture are not the same.
        i. For example, suppose tMV=(tMVx, tMVy), tMV'=(tMVx', tMVy'), then tMVx' may be calculated as tMVx'=Rx*tMVx+offsetx and tMVy' may be calculated as tMVy'=Ry*tMVy+offsety. offsetx and offsety are values such as 0.
            1) In one example, Rx=W1/W0.
            2) In one example, Ry=H1/H0.
            3) In one alternative example, tMVx'=Shift(Rx*(tMVx+offsetX), P) or SatShift(Rx*(tMVx+offsetX), P), where P is a value representing the precision, such as 10.
                a) Rx may be derived as Rx=(W1*P+offset)/W0, where offset is an integer such as 0 or W0/2.
            4) In one alternative example, tMVy'=Shift(Ry*(tMVy+offsetY), P) or SatShift(Ry*(tMVy+offsetY), P), where P is a value representing the precision, such as 10.
                a) Ry may be derived as Ry=(H1*P+offset)/H0, where offset is an integer such as 0 or H0/2.
17. It is proposed that the derivation of MV Prediction (MVP) for the current block or the current sub-block in TMVP/ATMVP may depend on the dimensions of the current picture, and/or the dimensions of the reference picture referred to by the MVP, and/or the dimensions of the collocated picture, and/or the dimensions of the reference picture of the collocated picture, which is referred to by the collocated MV. The collocated MV denotes the MV found in the collocated block. FIG. 23 shows an example, where the current picture (CurPic), the reference picture referred to by the MVP (RefPic), the collocated picture (ColPic) and the reference picture of the collocated picture, which is referred to by the collocated MV (RefColPic) are at time (or with POC) T0, T1, T2, T3, respectively. And their dimensions are W0*H0, W1*H1, W2*H2 and W3*H3, respectively. The MVP of the current block/sub-block is denoted as MvCur=(MvCurX, MvCurY) and the collocated MV is denoted as MvCol (MvColX, MvColY).
    d. MvCurX may be calculated as MvCurX=Rx*MvColX+offsetx and MvCurY may be calculated as MvCurY=Ry*MvColY+offsety. offsetx and offsety are values such as 0.
    e. In one example, Rx=W0/W2.
    f. In one example, Ry=H0/H2.
    g. In one alternative example, MvCurX=Shift(Rx*(MvColX+offsetX), P) or MvCurX=SatShift(Rx*(MvColX+offsetX), P), where P is a value representing the precision, such as 10.
        i. Rx may be derived as Rx=(W0*P+offset)/W2, where offset is an integer such as 0 or W2/2.
    h. In one alternative example, MvCurY=Shift(Ry*(MvColY+offsetY), P) or MvCurY=SatShift(Ry*

(MvColY+offsetY), P), where P is a value representing the precision, such as 10.
  i. Ry may be derived as Ry=(H0*P+offset)/H2, where offset is an integer such as 0 or H2/2.
  i. In one example, (W3, H3) must be equal to (W2, H2). Otherwise, MvCol may be considered as unavailable.
  j. In one example, (W0, H0) must be equal to (W1, H1), Otherwise, MVCur may be considered as unavailable.

Interpolation and Scaling in ARC

18. It is proposed that one or multiple down-sampling or up-sampling filtering methods for ARC may be signaled in a video unit, such as in DPS, VPS, SPS, PPS, APS, picture header, slice header, tile group header etc., or in an individual video unit for ARC such as RPS or CPS to be named.
19. In the approach of JVET-N0279, hori_scale_fp and/or vert_scale_fp may be signaled in a video unit, such as in DPS, VPS, SPS, PPS, APS, picture header, slice header, tile group header etc., or in an individual video unit for ARC such as RPS or CPS to be named.
20. It is proposed that any division operations in a scaling approach in RAC, such as the derivation of hori_scale_fp and/or vert_scale_fp or the derivation of Rx and/or Ry in bullet 8-bullet 11, may be replaced or approximated by one or multiple operations, in which one or multiple tables may be used. For example, the methods disclosed in P1905289301 may be used to replace or approximate the division operations.

The examples described above may be incorporated in the context of the methods described below, e.g., methods 2400, 2410, 2420, 2430, 2440, 2450, 2460, 2470, 2480 and 2490, which may be implemented at a video decoder or a video encoder.

Figure 24A:
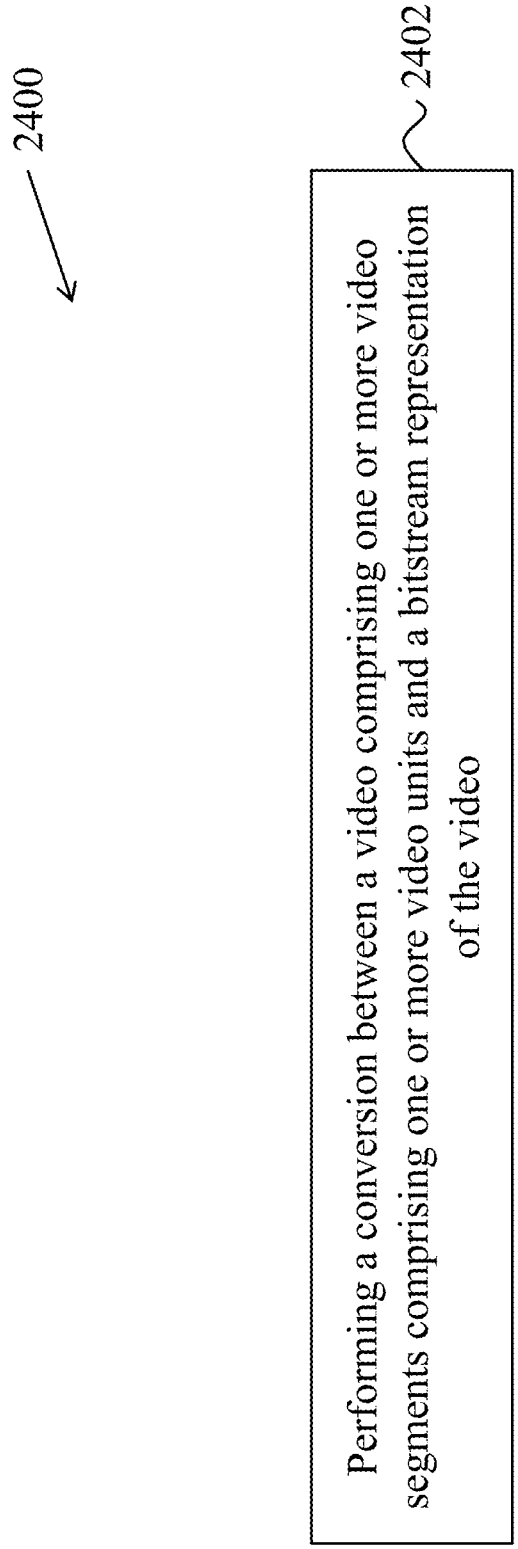

FIG. 24A shows a flowchart of an exemplary method for video processing. The method 2400 includes, at step 2402, performing a conversion between a video comprising one or more video segments comprising one or more video units and a bitstream representation of the video. In some embodiments, the bitstream representation conforms to a format rule and comprises information related to an adaptive resolution conversion (ARC) process, the format rule specifies the applicability of the ARC process to a video segment, an indication that the one or more video units of the video segment are coded with different resolutions is included in the bitstream representation in a syntax structure that is different from a header syntax structure, a decoder parameter set (DPS), a video parameter set (VPS), a picture parameter set (PPS), a sequence parameter set (SPS) and an adaptation parameter set (APS).

In some embodiments, the bitstream representation conforms to a format rule and comprises information related to an adaptive resolution conversion (ARC) process, a dimension of the one or more video units that is coded with an exponential-Golomb code of order K is signaled in the bitstream representation, K is a positive integer, the format rule specifies the applicability of the ARC process to a video segment, and an indication that the one or more video units of the video segment are coded with different resolutions is included in the bitstream representation in a syntax structure.

In some embodiments, the bitstream representation conforms to a format rule and comprises information related to an adaptive resolution conversion (ARC) process, a height (H) and a width (W) are signaled in the bitstream representation, H and W are positive integers and are constrained, the format rule specifies the applicability of an adaptive resolution conversion (ARC) process to a video segment, and an indication that the one or more video units of the video segment are coded with different resolutions is included in the bitstream representation in a syntax structure.

FIG. 24B shows a flowchart of an exemplary method for video processing. The method 2410 includes, at step 2412, determining that (a) a resolution of a first reference picture of a first temporally neighboring block of a current video block of a video is identical to a resolution of the current picture, and (b) a resolution of a second reference picture of a second temporally neighboring block of the current video block is different from the resolution of the current picture.

The method 2410 includes, at step 2414, performing a conversion between the current video block and a bitstream representation of the video by disabling, due to the determining, use of motion information of the second temporally neighboring block in a prediction of the first temporally neighboring block.

FIG. 24C shows a flowchart of an exemplary method for video processing. The method 2420 includes, at step 2422, determining that (a) a resolution of a first reference picture of a first temporally neighboring block of a current video block of a video is different from a resolution of the current picture, and (b) a resolution of a second reference picture of a second temporally neighboring block of the current video block is identical to the resolution of the current picture.

The method 2420 includes, at step 2424, performing a conversion between the current video block and a bitstream representation of the video by disabling, due to the determining, use of motion information of the second temporally neighboring block in a prediction of the first temporally neighboring block.

Figure 24D:
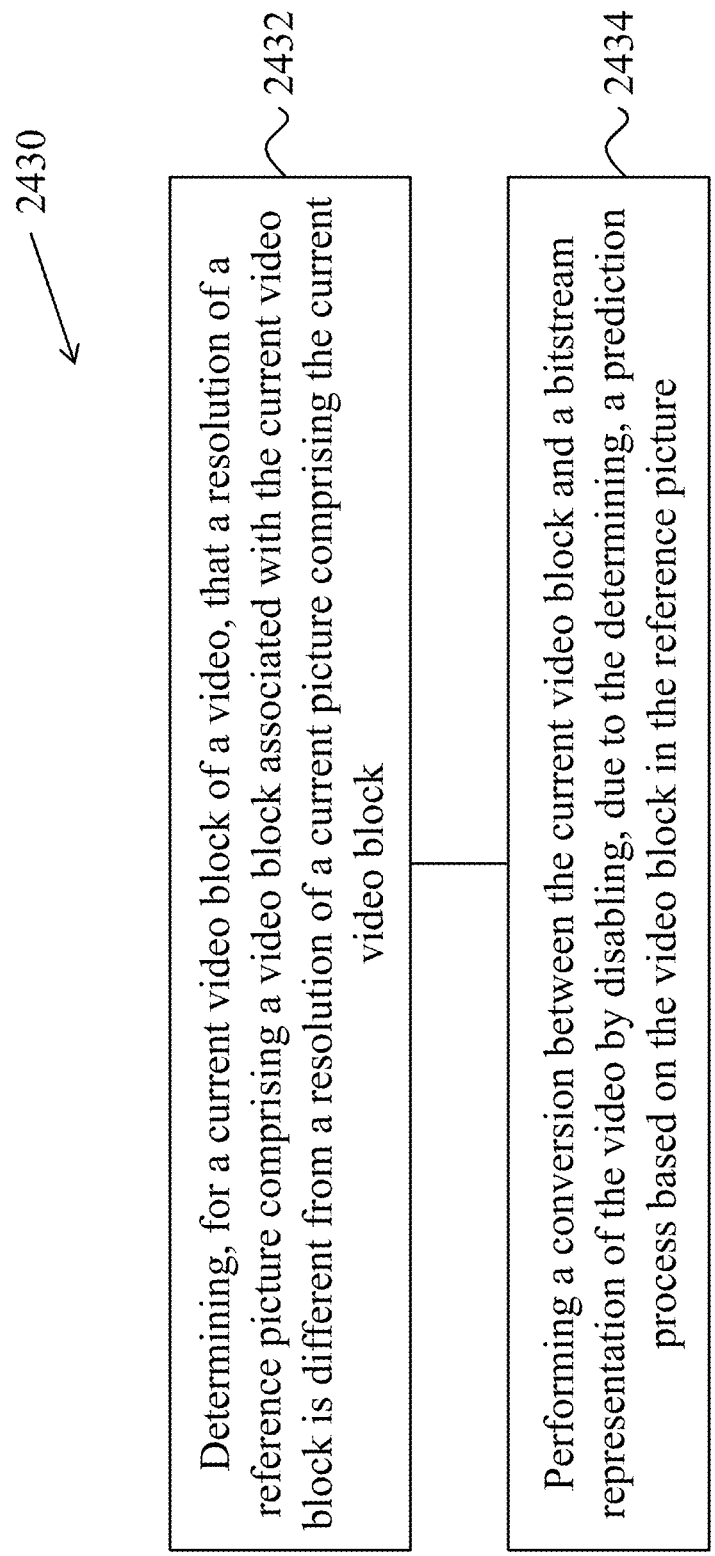

FIG. 24D shows a flowchart of an exemplary method for video processing. The method 2430 includes, at step 2432, determining, for a current video block of a video, that a resolution of a reference picture comprising a video block associated with the current video block is different from a resolution of a current picture comprising the current video block.

The method 2430 includes, at step 2434, performing a conversion between the current video block and a bitstream representation of the video by disabling, due to the determining, a prediction process based on the video block in the reference picture.

Figure 24E:
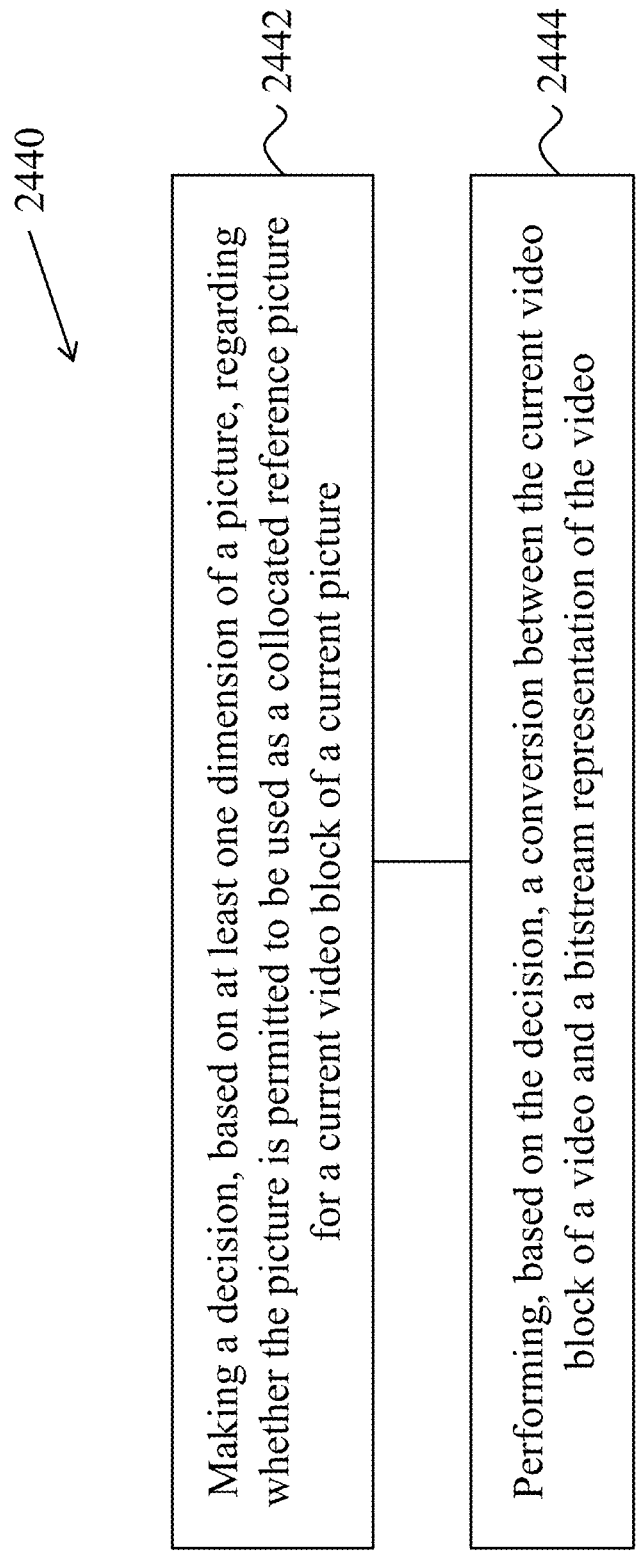

FIG. 24E shows a flowchart of an exemplary method for video processing. The method 2440 includes, at step 2442, making a decision, based on at least one dimension of a picture, regarding whether the picture is permitted to be used as a collocated reference picture for a current video block of a current picture.

The method 2440 includes, at step 2444, performing, based on the decision, a conversion between the current video block of a video and a bitstream representation of the video.

FIG. 24F shows a flowchart of an exemplary method for video processing. The method 2450 includes, at step 2452, identifying, for a prediction of a current video block of a video, a collocated block based on a determination that a dimension of a collocated reference picture comprising the collocated block is identical to a dimension of a current picture comprising the current video block.

The method 2450 includes, at step 2454, performing, using the collocated block, a conversion between the current video block and a bitstream representation of the video.

Figure 24G:
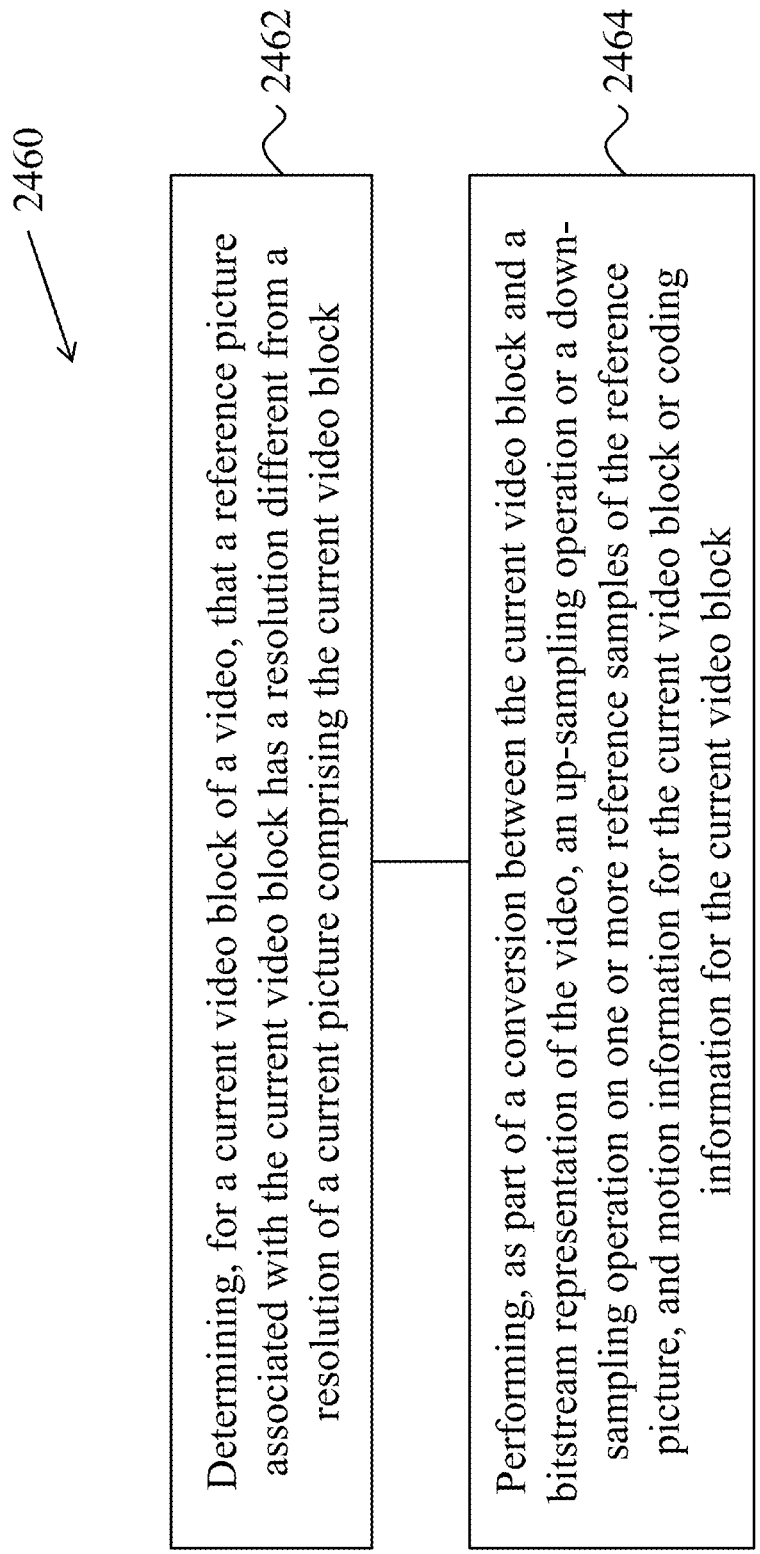

FIG. 24G shows a flowchart of an exemplary method for video processing. The method 2460 includes, at step 2462, determining, for a current video block of a video, that a reference picture associated with the current video block has a resolution different from a resolution of a current picture comprising the current video block.

The method 2460 includes, at step 2464, performing, as part of a conversion between the current video block and a bitstream representation of the video, an up-sampling operation or a down-sampling operation on one or more reference samples of the reference picture, and motion information for the current video block or coding information for the current video block.

Figure 24H:
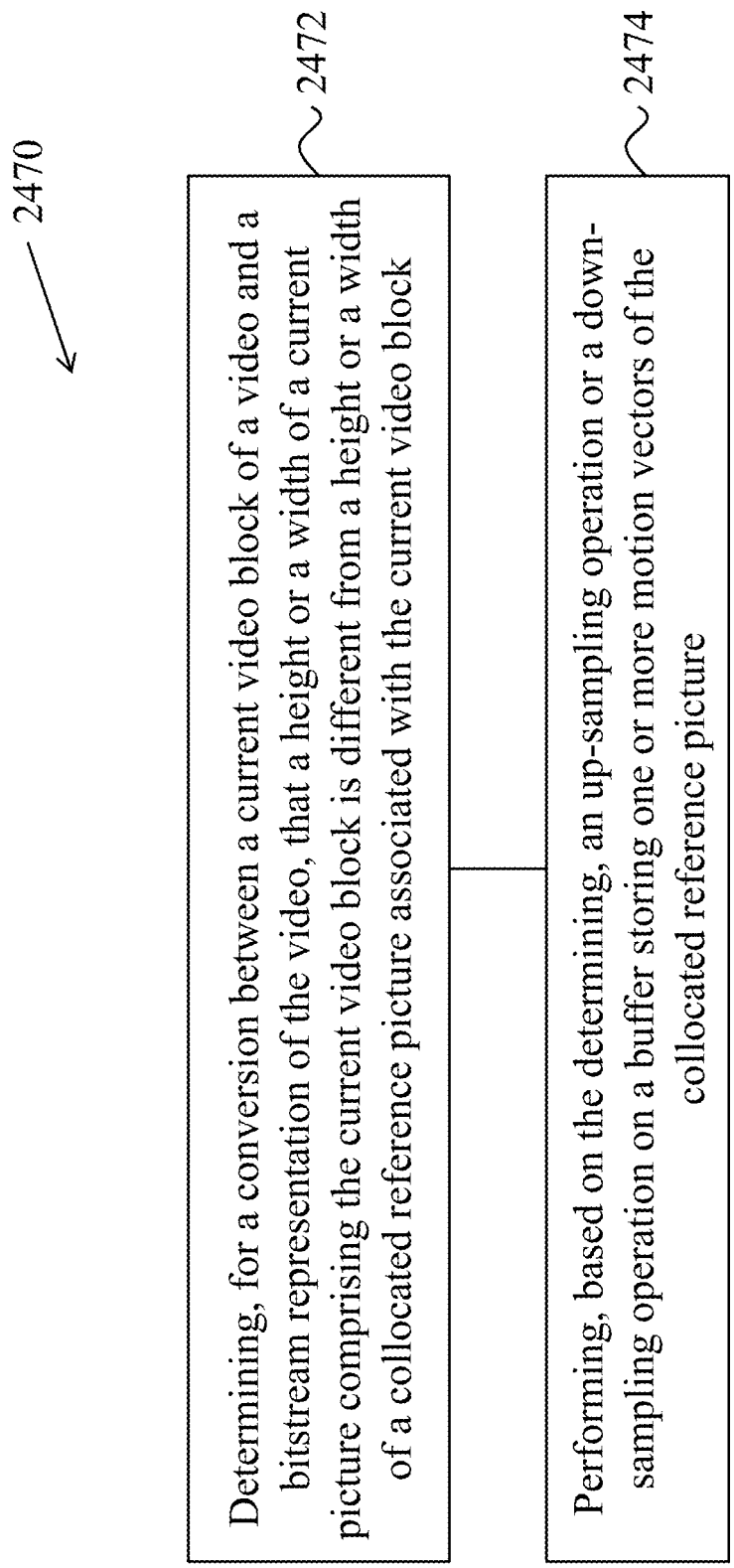

FIG. 24H shows a flowchart of an exemplary method for video processing. The method 2470 includes, at step 2472, determining, for a conversion between a current video block of a video and a bitstream representation of the video, that a height or a width of a current picture comprising the current video block is different from a height or a width of a collocated reference picture associated with the current video block.

The method 2470 includes, at step 2474, performing, based on the determining, an up-sampling operation or a down-sampling operation on a buffer storing one or more motion vectors of the collocated reference picture.

Figure 24I:
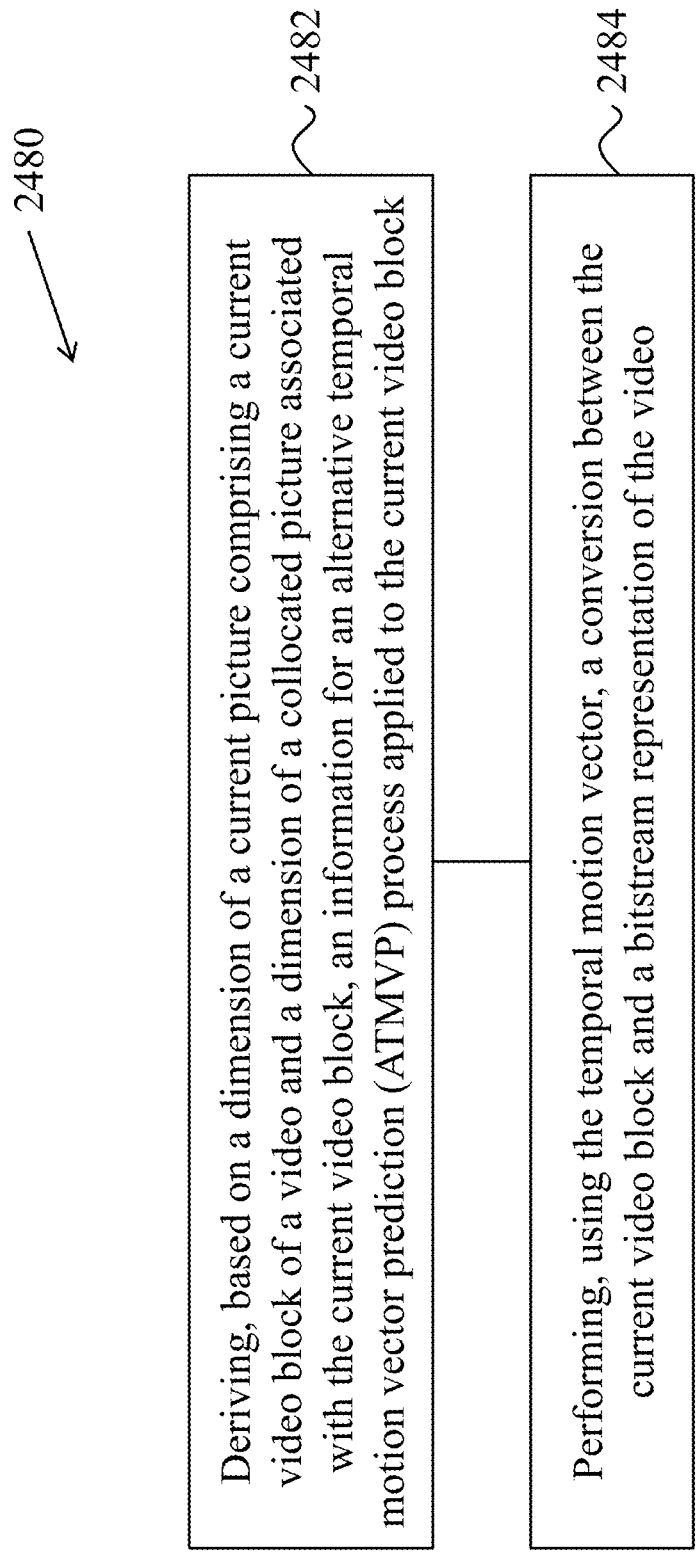

FIG. 24I shows a flowchart of an exemplary method for video processing. The method 2480 includes, at step 2482, deriving, based on a dimension of a current picture comprising a current video block of a video and a dimension of a collocated picture associated with the current video block, an information for an alternative temporal motion vector prediction (ATMVP) process applied to the current video block.

The method 2480 includes, at step 2484, performing, using the temporal motion vector, a conversion between the current video block and a bitstream representation of the video.

Figure 24J:
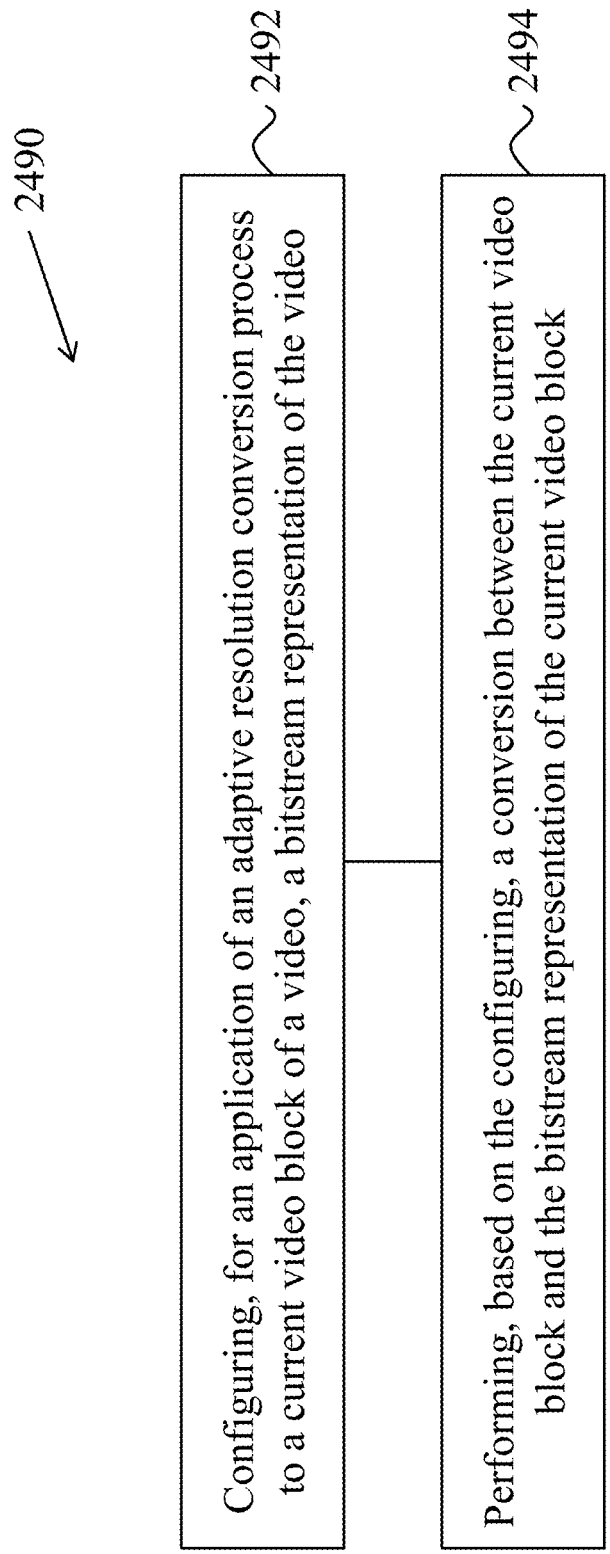

FIG. 24J shows a flowchart of an exemplary method for video processing. The method 2490 includes, at step 2492, configuring, for an application of an adaptive resolution conversion (ARC) process to a current video block of a video, a bitstream representation of the video. In some embodiments, information related to the ARC process is signaled in the bitstream representation, a current picture comprising the current video block has a first resolution, and the ARC process comprises resampling a portion of the current video block at a second resolution different from the first resolution.

The method 2490 includes, at step 2494, performing, based on the configuring, a conversion between the current video block and the bitstream representation of the current video block.

4. Example Implementations of the Disclosed Technology

Figure 25:
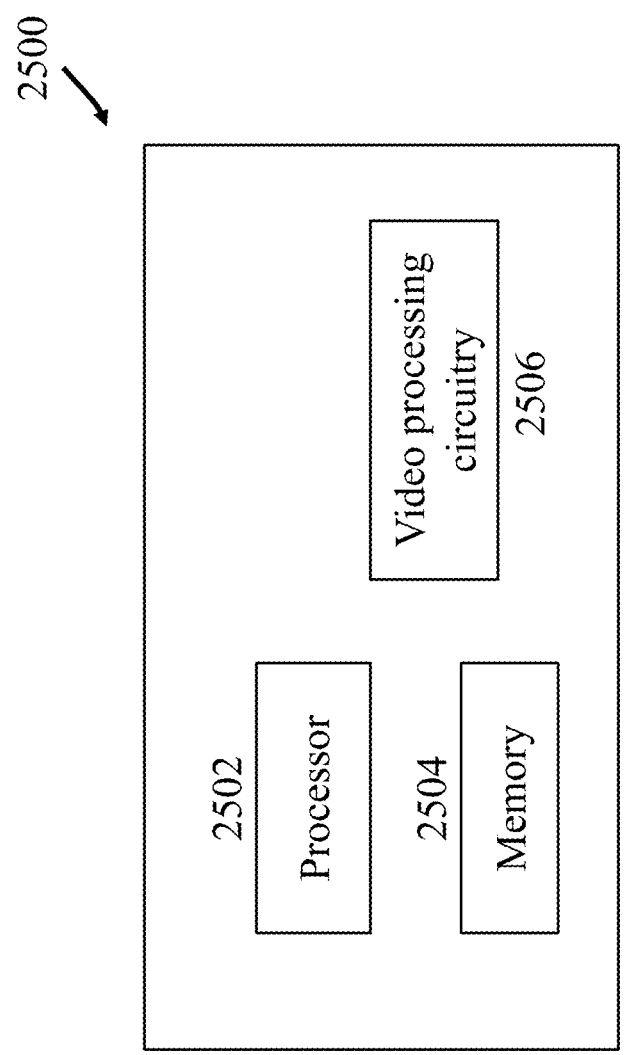
FIG. 25 is a block diagram of an example of a hardware platform for implementing a visual media decoding or a visual media encoding technique described in the present document.

FIG. 25 is a block diagram of a video processing apparatus 2500. The apparatus 2500 may be used to implement one or more of the methods described herein. The apparatus 2500 may be embodied in a smartphone, tablet, computer, Internet of Things (IoT) receiver, and so on. The apparatus 2500 may include one or more processors 2502, one or more memories 2504 and video processing hardware 2506. The processor(s) 2502 may be configured to implement one or more methods (including, but not limited to, methods 2400, 2410, 2420 and 2430) described in the present document. The memory (memories) 2504 may be used for storing data and code used for implementing the methods and techniques described herein. The video processing hardware 2506 may be used to implement, in hardware circuitry, some techniques described in the present document.

In some embodiments, the video coding methods may be implemented using an apparatus that is implemented on a hardware platform as described with respect to FIG. 25.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 26:
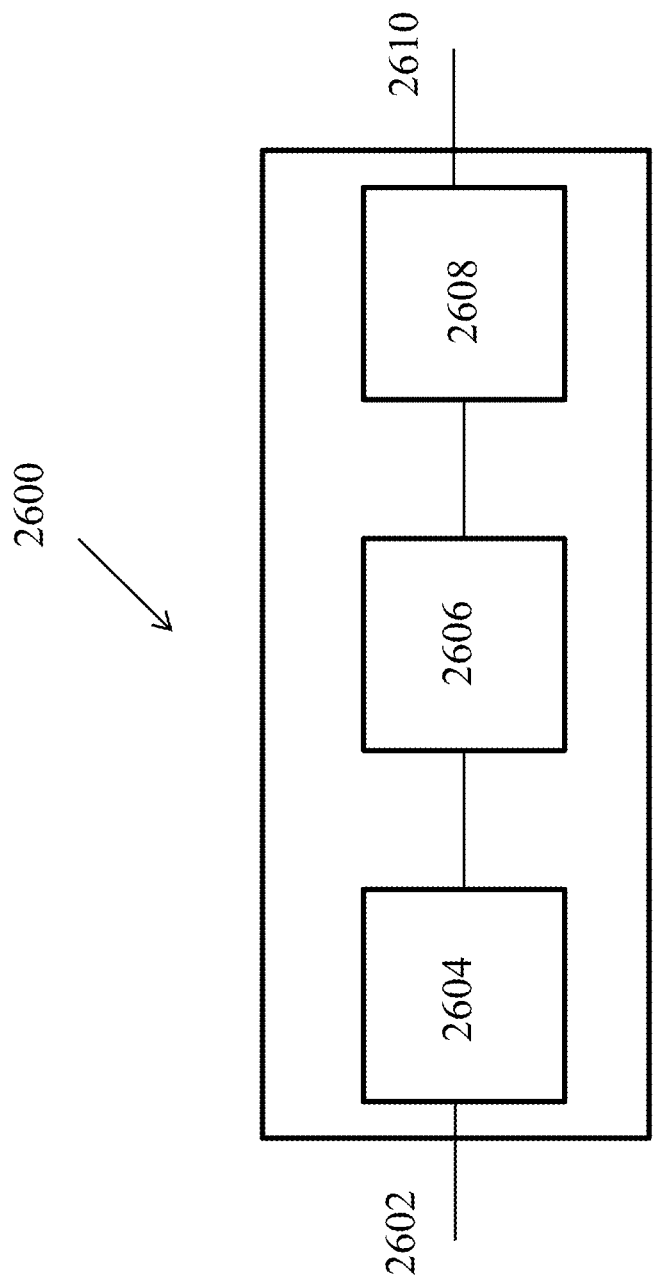
FIG. 26 is a block diagram of an example video processing system in which disclosed techniques may be implemented.

FIG. 26 is a block diagram showing an example video processing system 2600 in which various techniques disclosed herein may be implemented. Various implementations may include some or all of the components of the system 2600. The system 2600 may include input 2602 for receiving video content. The video content may be received in a raw or uncompressed format, e.g., 8 or 10 bit multi-component pixel values, or may be in a compressed or encoded format. The input 2602 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2600 may include a coding component 2604 that may implement the various coding or encoding methods described in the present document. The coding component 2604 may reduce the average bitrate of video from the input 2602 to the output of the coding component 2604 to produce a coded representation of the video. The coding techniques are therefore sometimes called video compression or video transcoding techniques. The output of the coding component 2604 may be either stored, or transmitted via a communication connected, as represented by the component 2606. The stored or communicated bitstream (or coded) representation of the video received at the input 2602 may be used by the component 2608 for generating pixel values or displayable video that is sent to a display interface 2610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the following technical solutions can be implemented:

A1. A method for video processing, comprising performing a conversion between a video comprising one or more video segments comprising one or more video units and a bitstream representation of the video, wherein the bitstream representation conforms to a format rule and comprises information related to an adaptive resolution conversion (ARC) process, wherein a dimension of the one or more video units that is coded with an exponential-Golomb code of order K is signaled in the bitstream representation, wherein K is a positive integer, wherein the format rule specifies the applicability of the ARC process to a video segment, and wherein an indication that the one or more video units of the video segment are coded with different resolutions is included in the bitstream representation in a syntax structure.

A2. The method of solution A1, wherein the dimension comprises at least one of a width of the video unit and a height of a video unit of the one or more video units.

A3. The method of solution A1, wherein the one or more video units comprises a picture.

A4. The method of solution A1, wherein the syntax structure is a decoder parameter set (DPS), a video parameter set (VPS), a sequence parameter set (SPS), a picture parameter set (PPS), an adaptive parameter set (APS), a picture header, a slice header, or a tile group header.

A5. The method of solution A1, wherein the syntax structure is a resolution parameter set (RPS) or a conversion parameter set (CPS).

A6. A method for video processing, comprising performing a conversion between a video comprising one or more video segments comprising one or more video units and a bitstream representation of the video, wherein the bitstream representation conforms to a format rule and comprises information related to an adaptive resolution conversion (ARC) process, wherein a height (H) and a width (W) of a video unit of the one or more video units are signaled in the bitstream representation, wherein H and W are positive integers and are constrained, wherein the format rule specifies the applicability of an adaptive resolution conversion (ARC) process to a video segment, and wherein an indication that the one or more video units of the video segment are coded with different resolutions is included in the bitstream representation in a syntax structure.

A7. The method of solution A6, wherein $W \leq TW_{max}$, and wherein $TW_{max}$ is a positive integer.

A8. The method of solution A7, wherein $TW_{max}$ is signaled in the bitstream representation.

A9. The method of solution A6, wherein $TW_{min} \leq W$, and wherein $TW_{min}$ is a positive integer.

A10. The method of solution A9, wherein $TW_{min}$ is signaled in the bitstream representation.

A11. The method of solution A6, wherein $H \leq TH_{max}$, and wherein $TH_{max}$ is a positive integer.

A12. The method of solution A11, wherein $TH_m$ is signaled in the bitstream representation.

A13. The method of solution A6, wherein $TH_{min} \leq H$, and wherein $TH_{min}$ is a positive integer.

A14. The method of solution A13, wherein $TH_{min}$ is signaled in the bitstream representation.

A15. The method of solution A6, wherein the height $H = h \times Y$ and the width $W = w \times X$, wherein w, h, X and Y are positive integers, and wherein w and h are signaled in the bitstream representation.

A16. The method of solution A15, wherein $X=Y=4$.

A17. The method of solution A15, wherein X and Y are predefined integers.

A18. The method of solution A6, wherein the one or more video units comprises a picture.

A19. A method for video processing, comprising performing a conversion between a video comprising one or more video segments comprising one or more video units and a bitstream representation of the video, wherein the bitstream representation conforms to a format rule and comprises information related to an adaptive resolution conversion (ARC) process, wherein the format rule specifies the applicability of the ARC process to a video segment, wherein an indication that the one or more video units of the video segment are coded with different resolutions is included in the bitstream representation in a syntax structure that is different from a header syntax structure, a decoder parameter set (DPS), a video parameter set (VPS), a picture parameter set (PPS), a sequence parameter set (SPS), and an adaptation parameter set (APS).

A20. The method of solution A19, wherein the information related to the ARC process comprises a height (H) or a width (W) of a picture comprising the one or more video units.

A21. The method of solution A19 or A20, wherein the information related to the ARC process is signaled in a Supplemental Enhancement Information (SEI) message.

A22. The method of solution A19 or A20, wherein the header syntax structure comprises a picture header, a slice header, or a tile group header.

A23. The method of solution A19 or A20, wherein the information related to the ARC process is signaled in a resolution parameter set (RPS) or a conversion parameter set (CPS).

A24. The method of solution A19, wherein the information related to the ARC process comprises a ratio of a height to a width of a picture comprising the one or more video units.

A25. The method of solution A19, wherein the information related to the ARC process comprises a plurality of ratios of different heights to different widths of a picture comprising the one or more video units.

A26. The method of solution A25, wherein an index corresponding to an allowed ratio of the plurality of ratios is signaled in a picture parameter set (PPS).

A27. The method of solution A25, wherein any one ratio of the plurality of ratios is different from any other ratio of the plurality of ratios.

A28. The method of solution A19, wherein the information comprises at least one of (i) a difference between a first width and a second width, (ii) a difference between a first height and a second height, (iii) a ratio between the first width and the second width, or (iv) a ratio between the first height and the second height.

A29. The method of solution A28, wherein the information is coded with a unary code, a truncated unary code or a fixed length code.

A30. The method of solution A19, wherein the bitstream representation further comprises at least one of a syntax element indicating a coding tree unit (CTU) size, a syntax element indicating the minimum coding unit (CU) size, a syntax element indicating a maximum or minimum transform block (TB) size, a syntax element indicating a maximum depth of a partitioning process that may be applied to the one or more video units, or a syntax element that is configured to bind with a specific picture resolution.

A31. The method of solution A19, wherein a first reference picture associated with a current picture comprising the one or more video units has a first resolution equal to a resolution of the current picture, wherein a second reference picture associated with the current picture has a second resolution greater than the resolution of the current picture, and wherein a reference index of the second reference picture is greater than a reference index of the first reference picture.

A32. The method of any of solutions A19 to A31, wherein the conversion generates the one or more video units from the bitstream representation.

A33. The method of any of solutions A19 to A31, wherein the conversion generates the bitstream representation from the one or more video units.

A34. An apparatus in a video system comprising a processor and a non-transitory memory with instructions thereon, wherein the instructions upon execution by the processor, cause the processor to implement the method in any one of solutions A19 to A33.

A35. A computer program product stored on a non-transitory computer readable media, the computer program product including program code for carrying out the method in any one of solutions A19 to A33.

In some embodiments, the following technical solutions can be implemented:

B1. A method for video processing, comprising determining that (a) a resolution of a first reference picture of a first temporally neighboring block of a current video block of a video is identical to a resolution of a current picture comprising the current video block, and (b) a resolution of a second reference picture of a second temporally neighboring block of the current video block is different from the resolution of the current picture; and performing a conversion between the current video block and a bitstream representation of the video by disabling, due to the determining, use of motion information of the second temporally neighboring block in a prediction of the first temporally neighboring block.

B2. A method for video processing, comprising determining that (a) a resolution of a first reference picture of a first temporally neighboring block of a current video block of a video is different from a resolution of a current picture comprising the current video block, and (b) a resolution of a second reference picture of a second temporally neighboring block of the current video block is identical to the resolution of the current picture; and performing a conversion between the current video block and a bitstream representation of the video by disabling, due to the determining, use of motion information of the second temporally neighboring block in a prediction of the first temporally neighboring block.

B3. A method for video processing, comprising determining, for a current video block of a video, that a resolution of a reference picture comprising a video block associated with the current video block is different from a resolution of a current picture comprising the current video block; and performing a conversion between the current video block and a bitstream representation of the video by disabling, due to the determining, a prediction process based on the video block in the reference picture.

B4. A method for video processing, comprising making a decision, based on at least one dimension of a picture, regarding whether the picture is permitted to be used as a collocated reference picture for a current video block of a current picture; and performing, based on the decision, a conversion between the current video block of a video and a bitstream representation of the video.

B5. The method of solution B4, wherein the at least one dimension of the reference picture is different from a corresponding dimension of a current picture comprising the current video block, and wherein the reference picture is not designated as the collocated reference picture.

B6. A method for video processing, comprising identifying, for a prediction of a current video block of a video, a collocated block based on a determination that a dimension of a collocated reference picture comprising the collocated block is identical to a dimension of a current picture comprising the current video block; and performing, using the collocated block, a conversion between the current video block and a bitstream representation of the video.

B7. The method of solution B6, wherein the prediction comprises a temporal motion vector prediction (TMVP) process or an alternative temporal motion vector prediction (ATMVP) process.

B8. The method of solution B7, wherein the current picture has dimensions W0×H0, wherein the collocated reference picture has dimensions W1×H1, wherein a position or a size of the collocated block is based on at least one of W0, H0, W1 or H1, and wherein W0, H0, W1 and H1 are positive integers.

B9. The method of solution B8, wherein a derivation of a temporal motion vector in the ATMVP process is based on at least one of W0, H0, W1 or H1.

B10. The method of solution B8, wherein a derivation of a motion vector prediction for the current video block is based on at least one of W0, H0, W1 or H1.

B11. A method for video processing, comprising determining, for a current video block of a video, that a reference picture associated with the current video block has a resolution different from a resolution of a current picture comprising the current video block; and performing, as part of a conversion between the current video block and a bitstream representation of the video, an up-sampling operation or a down-sampling operation on one or more reference samples of the reference picture, and motion information for the current video block or coding information for the current video block.

B12. The method of solution B11, further comprising using information related to the up-sampling operation or the down-sampling operation for coding a subsequent video block in a frame different from a current frame comprising the current video block.

B13. A method for video processing, comprising determining, for a conversion between a current video block of a video and a bitstream representation of the video, that a height or a width of a current picture comprising the current video block is different from a height or a width of a collocated reference picture associated with the current video block; and performing, based on the determining, an up-sampling operation or a down-sampling operation on a buffer storing one or more motion vectors of the collocated reference picture.

B14. A method for video processing, comprising deriving, based on a dimension of a current picture comprising a current video block of a video and a dimension of a collocated picture associated with the current video block, an information for an alternative temporal motion vector prediction (ATMVP) process applied to the current video block; and performing, using the temporal motion vector, a conversion between the current video block and a bitstream representation of the video.

B15. The method of solution B14, wherein the information comprises a temporal motion vector.

B16. The method of solution B14, wherein the information comprises a motion vector prediction (MVP) for the current video block, and wherein the deriving is further based on a dimension of a reference picture referred to by the MVP.

B17. A method for video processing, comprising configuring, for an application of an adaptive resolution conversion (ARC) process to a current video block of a video, a bitstream representation of the video, wherein information related to the ARC process is signaled in the bitstream representation, wherein a current picture comprising the current video block has a first resolution, and wherein the ARC process comprises resampling a portion of the current video block at a second resolution different from the first resolution; and performing, based on the configuring, a conversion between the current video block and the bitstream representation of the current video block.

B18. The method of solution B17, wherein the information related to the ARC process comprises parameters for one or more up-sampling or down-sampling filtering methods.

B19. The method of solution B17, wherein the information related to the ARC process comprises a horizontal scaling factor or a vertical scaling factor for scaling a reference picture to enable a resolution change within a coded video sequence.

B20. The method of solution B18 or B19, wherein the information is signaled in a decoder parameter set (DPS), a video parameter set (VPS), a sequence parameter set (SPS), a picture parameter set (PPS), an adaptive parameter set (APS), a picture header, a slice header, a tile group header or an individual video unit.

B21. The method of solution B20, wherein the individual video unit is a resolution parameter set (RPS) or a conversion parameter set (CPS).

B22. The method of solution B19, wherein deriving the horizontal scaling factor or the vertical scaling factor comprises a division operation that is implemented using one or more tables.

B23. The method of any of solutions B1 to B22, wherein the conversion generates the current video block from the bitstream representation.

B24. The method of any of solutions B1 to B22, wherein the conversion generates the bitstream representation from the current video block.

B25. An apparatus in a video system comprising a processor and a non-transitory memory with instructions thereon, wherein the instructions upon execution by the processor, cause the processor to implement the method in any one of solutions B1 to B24.

B26. A computer program product stored on a non-transitory computer readable media, the computer program product including program code for carrying out the method in any one of solutions B1 to B24.

In some embodiments, the following technical solutions can be implemented:

C1. A method for video processing, comprising configuring, for an application of an adaptive resolution conversion (ARC) process to a current video block, a bitstream representation of the current video block, wherein information related to the ARC process is signaled in the bitstream representation, wherein the current video block has a first resolution, and wherein the ARC process comprises resampling a portion of the current video block at a second resolution different from the first resolution; and performing, based on the configuring, a conversion between the current video block and the bitstream representation of the current video block.

C2. The method of solution C1, wherein the information related to the ARC process comprises a height (H) or a width (W) of a picture comprising the current video block.

C3. The method of solution C1 or 2, wherein the information related to the ARC process is signaled in a Supplemental Enhancement Information (SEI) message that is different from a decoder parameter set (DPS), a video parameter set (VPS), a sequence parameter set (SPS), a picture parameter set (PPS), an adaptive parameter set (APS), a picture header, a slice header and a tile group header.

C4. The method of solution C1 or 2, wherein the information related to the ARC process is signaled in an individual video unit.

C5. The method of solution C4, wherein the individual video unit is a resolution parameter set (RPS) or a conversion parameter set (CPS).

C6. The method of any of solutions C1 to C5, wherein the information related to the ARC process is coded with a fixed-length code or a unary code.

C7. The method of any of solutions C1 to C5, wherein the information related to the ARC process is coded with an exponential-Golomb code of order K, wherein K is an integer greater than zero.

C8. The method of solution C1 or C2, wherein the information related to the ARC process is signaled in a decoder parameter set (DPS), a video parameter set (VPS), a sequence parameter set (SPS), a picture parameter set (PPS), an adaptive parameter set (APS), a picture header, a slice header or a tile group header.

C9. The method of solution C1, wherein the information related to the ARC process comprises a ratio of a height to a width of a picture comprising the current video block.

C10. The method of solution C1, wherein the information related to the ARC process comprises a plurality of ratios of different heights to different widths of a picture comprising the current video block.

C11. The method of solution C10, wherein an index corresponding to an allowed ratio of the plurality of ratios is signaled in a picture parameter set (PPS).

C12. The method of solution C10, wherein any one ratio of the plurality of ratios is different from any other ratio of the plurality of ratios.

C13. The method of solution C2, wherein $TW_{min} \leq W \leq TW_{max}$, and wherein $TW_{min}$ and $TW_{max}$ are positive integers.

C14. The method of solution C13, wherein $TW_{min}$ and $TW_{max}$ are signaled in the bitstream representation of the current video block.

C15. The method of solution C2, wherein $TH_{min} \leq H \leq TH_{max}$, and wherein $TH_{min}$ and $TH_m$ are positive integers.

C16. The method of solution C13, wherein $TH_{min}$ and $TH_{max}$ are signaled in the bitstream representation of the current video block.

C17. The method of solution C1, wherein a picture comprising the current video block has a height $H = h \times Y$ and a width $W = w \times X$, wherein w, h, W, H, X and Y are positive integers, wherein X and Y are predefined integers, and wherein the information related to the ARC process comprises w and h.

C18. The method of solution C17, wherein X=Y=4.

C19. The method of solution C1, wherein the information related to the ARC process comprises at least one of (i) a difference between a first width and a second width, (ii) a difference between a first height and a second height, (iii) a ratio between the first width and the second width, or (iv) a ratio between the first height and the second height.

C20. The method of solution C19, wherein the information is coded with a unary code, a truncated unary code or a fixed length code.

C21. The method of solution C1, wherein the bitstream representation further comprises at least one of a syntax element indicating a coding tree unit (CTU) size, a syntax element indicating the minimum coding unit (CU) size, a syntax element indicating a maximum or minimum transform block (TB) size, a syntax element indicating a maximum depth of a partitioning process that may be applied to the current video block, or a syntax element that is configured to bind with a specific picture resolution.

C22. A method for video processing, comprising making a decision, for a prediction of a current video block, regarding the selective use of a reference picture of a temporally neighboring block of the current video block; and performing, based on the decision and a reference picture of the current video block, a conversion between the current video block and a bitstream representation of the current video block.

C23. The method of solution C22, wherein a resolution of the reference picture of the current video block is identical to a resolution of the current video block, wherein a resolution of the reference picture of the temporally neighboring block is different from the resolution of the current video block, and wherein the prediction of the current video block does not use motion information associated with the temporally neighboring block.

C24. The method of solution C22, wherein a resolution of the reference picture of the current video block is different from a resolution of the current video block, wherein a resolution of the reference picture of the temporally neighboring block is different from the resolution of the current video block, and wherein the prediction of the current video block does not use motion information associated with the temporally neighboring block.

C25. A method for video processing, comprising making a decision, based on at least one dimension of a reference picture of a current video block, regarding the designation of the reference picture as a collocated reference picture; and performing, based on the decision, a conversion between the current video block and a bitstream representation of the current video block.

C26. The method of solution C25, wherein the at least one dimension of the reference picture is different from a corresponding dimension of a current picture comprising the current video block, and wherein the reference picture is not designated at the collocated reference picture.

C27. A method for video processing, comprising identifying, for a prediction of a current video block, a collocated block based on a comparison of a dimension of a collocated reference picture associated with the collocated block and a dimension of a current picture comprising the current video block; and performing, based on the identifying, the prediction of the current video block.

C28. The method of solution C27, wherein the prediction comprises a temporal motion vector prediction process or an alternative temporal motion vector prediction (ATMVP) process.

C29. The method of solution C27 or C28, wherein the current picture has dimensions W0×H0, wherein the collocated reference picture has dimensions W1×H1, and wherein a position or a size of the collocated block is based on at least one of W0, H0, W1 or H1.

C30. The method of solution C29, wherein a derivation of a temporal motion vector in the ATMVP process is based on at least one of W0, H0, W1 or H1.

C31. The method of solution C29, wherein a derivation of a motion vector prediction for the current video block is based on at least one of W0, H0, W1 or H1.

C32. The method of solution C1, wherein the information related to the ARC process comprises parameters for one or more up-sampling or down-sampling filtering methods.

C33. The method of solution C1, wherein the information related to the ARC process comprises a horizontal scaling factor or a vertical scaling factor for scaling a reference picture to enable a resolution change within a coded video sequence (CVS).

C34. The method of solution C32 or C33, wherein the information is signaled in a decoder parameter set (DPS), a video parameter set (VPS), a sequence parameter set (SPS), a picture parameter set (PPS), an adaptive parameter set (APS), a picture header, a slice header, a tile group header or an individual video unit.

C35. The method of solution C34, wherein the individual video unit is a resolution parameter set (RPS) or a conversion parameter set (CPS).

C36. An apparatus in a video system comprising a processor and a non-transitory memory with instructions thereon, wherein the instructions upon execution by the processor, cause the processor to implement the method in any one of solutions C1 to C35.

C37. A computer program product stored on a non-transitory computer readable media, the computer program product including program code for carrying out the method in any one of solutions C1 to C35.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
determining, for a conversion between a visual media data of a video and a bitstream of the video, a first information related to a first coding mode for the visual media data; and
performing the conversion at least based on the first coding mode,
wherein the first coding mode comprises deriving prediction samples based on one or more reference pictures which have one or more different resolutions from that of a current picture including the visual media data,
wherein a resolution of the current picture is indicated by the first information, wherein the first information indicates at least one of a width W of the current picture and a height H of the current picture, wherein the width W is an integer multiple of a first value, and the height H is an integer multiple of a second value,
wherein the first value and the second value are respectively based on at least one predefined value,
wherein enabling or disabling of a temporal motion vector prediction or a subblock-based temporal motion vector prediction for the visual media data is based on an enablement of the first coding mode, and
wherein, when the first coding mode is enabled, the temporal motion vector prediction and the subblock-based temporal motion vector prediction are disabled for the visual media data.

2. The method of claim 1, wherein the first information is included in the bitstream in a sequence parameter set (SPS).

3. The method of claim 1, wherein the first information is included in the bitstream in a picture parameter set (PPS).

4. The method of claim 1, wherein the width W is less than or equal to a maximum value TW_max and is greater than or equal to a minimum value TW_min, and the height H is less than or equal to a maximum value TH_max and is greater than or equal to a minimum value TH_min.

5. The method of claim 4, wherein the maximum value TW_max and/or the maximum value TH_max are included in the bitstream.

6. The method of claim 1, wherein the at least one predefined value is a positive integer.

7. The method of claim 1, wherein the conversion comprises encoding the visual media data into the bitstream.

8. The method of claim 1, wherein the conversion comprises decoding the visual media data from the bitstream.

9. An apparatus for processing video data comprising a processor and a non-transitory memory with instructions thereon, wherein the instructions upon execution by the processor, cause the processor to:

determine, for a conversion between a visual media data of a video and a bitstream of the video, a first information related to a first coding mode for the visual media data; and perform the conversion at least based on the first coding mode, wherein the first coding mode comprises deriving prediction samples based on one or more reference pictures which have one or more different resolutions from that of a current picture including the visual media data, wherein a resolution of the current picture is indicated by the first information, wherein the first information indicates at least one of a width W of the current picture and a height H of the current picture, wherein the width W is an integer multiple of a first value, and the height H is an integer multiple of a second value, wherein the first value and the second value are respectively based on at least one predefined value, wherein enabling or disabling of a temporal motion vector prediction or a subblock-based temporal motion vector prediction for the visual media data is based on an enablement of the first coding mode, and wherein, when the first coding mode is enabled, the temporal motion vector prediction and the subblock-based temporal motion vector prediction are disabled for the visual media data.

10. The apparatus of claim 9, wherein the first information is included in the bitstream in a sequence parameter set (SPS).

11. The apparatus of claim 9, wherein the first information is included in the bitstream in a picture parameter set (PPS).

12. The apparatus of claim 9, wherein the width W is less than or equal to a maximum value TW_max and is greater than or equal to a minimum value TW_min, and the height H is less than or equal to a maximum value TH_max and is greater than or equal to a minimum value TH_min.

13. The apparatus of claim 12, wherein the maximum value TW_max and/or the maximum value TH_max are included in the bitstream.

14. The apparatus of claim 9, wherein the at least one predefined value is a positive integer.

15. A non-transitory computer-readable storage medium storing instructions that cause a processor to:

determine, for a conversion between a visual media data of a video and a bitstream of the video, a first information related to a first coding mode for the visual media data; and perform the conversion at least based on the first coding mode, wherein the first coding mode comprises deriving prediction samples based on one or more reference pictures which have one or more different resolutions from that of a current picture including the visual media data, wherein a resolution of the current picture is indicated by the first information, wherein the first information indicates at least one of a width W of the current picture and a height H of the current picture, wherein the width W is an integer multiple of a first value, and the height H is an integer multiple of a second value, wherein the first value and the second value are respectively based on at least one predefined value, wherein enabling or disabling of a temporal motion vector prediction or a subblock-based temporal motion vector prediction for the visual media data is based on an enablement of the first coding mode, and wherein, when the first coding mode is enabled, the temporal motion vector prediction and the subblock-based temporal motion vector prediction are disabled for the visual media data.

16. The non-transitory computer-readable storage medium of claim 15, wherein the first information is included in the bitstream in a sequence parameter set (SPS).

17. The non-transitory computer-readable storage medium of claim 15, wherein the first information is included in the bitstream in a picture parameter set (PPS).

18. A non-transitory computer-readable recording medium storing a bitstream which is generated by a method performed by a video processing apparatus, wherein the method comprises:

determining a first information related to a first coding mode for a visual media data of a video; and generating the bitstream from the visual media data at least based on the first coding mode, wherein the first coding mode comprises deriving prediction samples based on one or more reference pictures which have one or more different resolutions from that of a current picture including the visual media data, wherein a resolution of the current picture is indicated by the first information, wherein the first information indicates at least one of a width W of the current picture and a height H of the current picture, wherein the width W is an integer multiple of a first value, and the height H is an integer multiple of a second value, wherein the first value and the second value are respectively based on at least one predefined value, wherein enabling or disabling of a temporal motion vector prediction or a subblock-based temporal motion vector prediction for the visual media data is based on an enablement of the first coding mode, and wherein, when the first coding mode is enabled, the temporal motion vector prediction and the subblock-based temporal motion vector prediction are disabled for the visual media data.

19. The non-transitory computer-readable recording medium of claim 18, wherein the first information is included in the bitstream in a sequence parameter set (SPS).

20. The non-transitory computer-readable recording medium of claim 18, wherein the first information is included in the bitstream in a picture parameter set (PPS).

* * * * *